(12) United States Patent
Iwamura

(10) Patent No.: US 7,072,488 B2
(45) Date of Patent: Jul. 4, 2006

(54) DATA PROCESSING METHOD AND APPARATUS

(75) Inventor: Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 542 days.

(21) Appl. No.: 10/188,870

(22) Filed: Jul. 5, 2002

(65) Prior Publication Data
US 2003/0012406 A1    Jan. 16, 2003

(30) Foreign Application Priority Data

| Jul. 11, 2001 | (JP) | ............................. 2001-211185 |
| Jul. 11, 2001 | (JP) | ............................. 2001-211186 |
| Sep. 19, 2001 | (JP) | ............................. 2001-285683 |
| Dec. 27, 2001 | (JP) | ............................. 2001-397873 |

(51) Int. Cl.
*G06K 9/00* (2006.01)

(52) U.S. Cl. .................................................... 382/100

(58) Field of Classification Search ................ 382/100; 348/473; 380/203
See application file for complete search history.

(56) References Cited

U.S. PATENT DOCUMENTS

| 5,499,294 | A | 3/1996 | Friedman |
| 5,600,720 | A | 2/1997 | Iwamura et al. ................ 380/1 |
| 5,636,292 | A | 6/1997 | Rhoads ........................ 382/232 |
| 5,666,419 | A | 9/1997 | Yamamoto et al. ........... 380/28 |
| 5,937,395 | A | 8/1999 | Iwamura ..................... 705/30 |
| 6,088,454 | A | 7/2000 | Nagashima et al. .......... 380/49 |
| 6,332,031 | B1 * | 12/2001 | Rhoads et al. .............. 382/100 |
| 6,389,152 | B1 * | 5/2002 | Nakamura et al. .......... 382/100 |
| 6,425,081 | B1 | 7/2002 | Iwamura ..................... 713/176 |
| 6,577,748 | B1 * | 6/2003 | Chang ........................ 382/100 |
| 6,633,652 | B1 * | 10/2003 | Donescu ..................... 382/100 |
| 6,636,615 | B1 * | 10/2003 | Rhoads et al. .............. 382/100 |
| 6,898,297 | B1 * | 5/2005 | Katsura et al. ............. 382/100 |
| 2001/0016049 | A1 * | 8/2001 | Nguyen ..................... 382/100 |
| 2001/0028715 | A1 * | 10/2001 | Watanabe ................... 380/203 |
| 2001/0046307 | A1 * | 11/2001 | Wong ........................ 382/100 |
| 2002/0027612 | A1 * | 3/2002 | Brill et al. .................. 348/473 |

(Continued)

FOREIGN PATENT DOCUMENTS

| JP | 11-355547 | 12/1999 |
| JP | 2001-24876 | 1/2001 |

*Primary Examiner*—Kanjibhai Patel
*Assistant Examiner*—O'Neal R. Mistry
(74) *Attorney, Agent, or Firm*—Fitzpatrick, Cella, Harper & Scinto

(57) ABSTRACT

An encrypted image C(i, j) is generated by exclusively ORing pseudo random number values, which are generated using a key $k_0$ as a key, and respective bits, except for the LSBs, of B pixel data at respective pixel positions (i, j) of digital image data I(i, j). First check bits B(i, j) corresponding to the pixel positions of pixels are generated based on the image C(i, j) and a conversion table. A digitally watermarked image I'(i, j) is obtained by embedding the first check bits in the LSBs of the corresponding pixel data of the digital image data. Check bits U(i, j) are obtained by encrypting pixel data by exclusively ORing respective bits, except for the LSBs, of B pixel data at positions (i, j) of the image I'(i, j) and the pseudo random numbers. If each check bit U(i, j) matches the LSB of the corresponding B pixel data, it is determined that the corresponding pixel is free from tampering.

43 Claims, 51 Drawing Sheets

U.S. PATENT DOCUMENTS

2002/0106103 A1* 8/2002 Jones et al. .................. 382/100
2002/0191810 A1* 12/2002 Fudge et al. ................ 382/100
2003/0011684 A1* 1/2003 Narayanaswami
et al. ..................... 348/207.99
2003/0128861 A1* 7/2003 Rhoads ....................... 382/100

* cited by examiner

F I G. 12
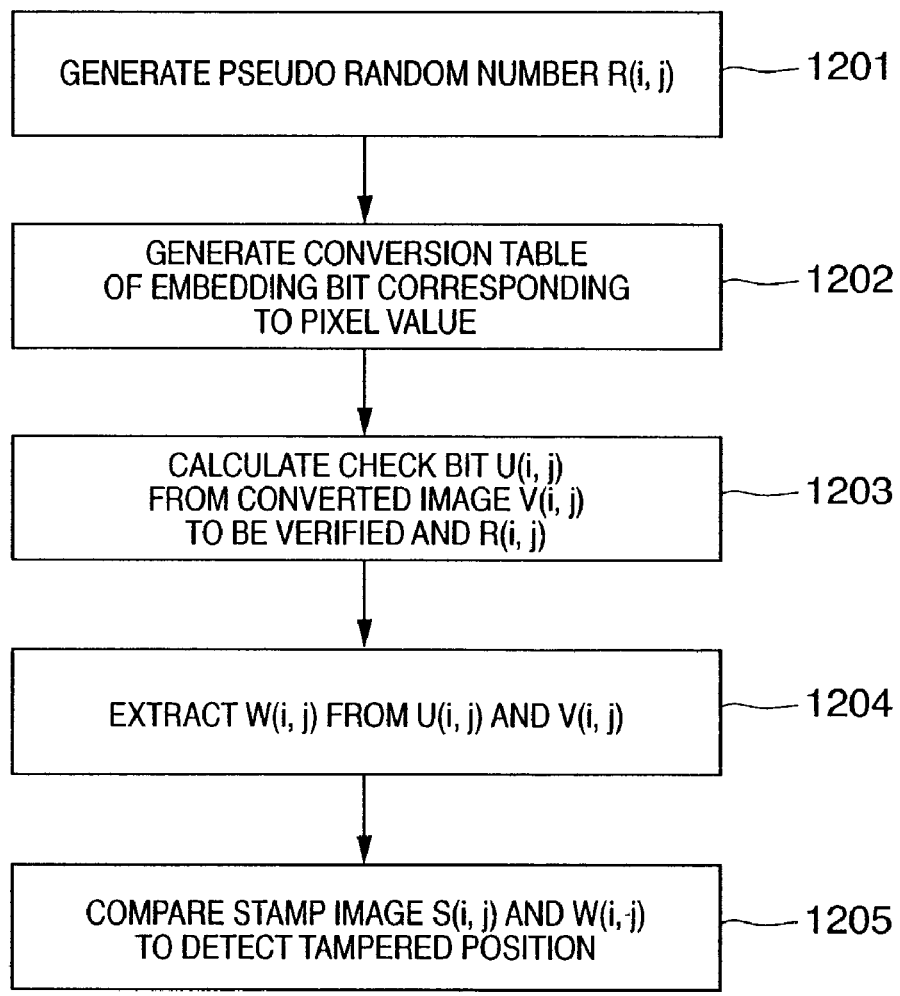

F I G. 19
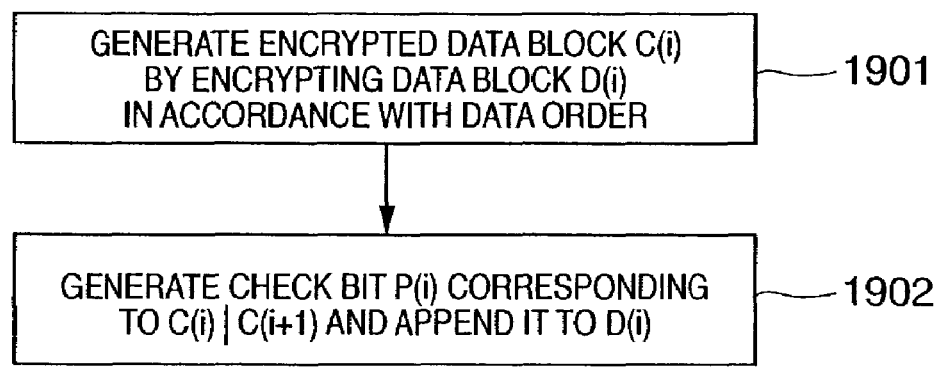

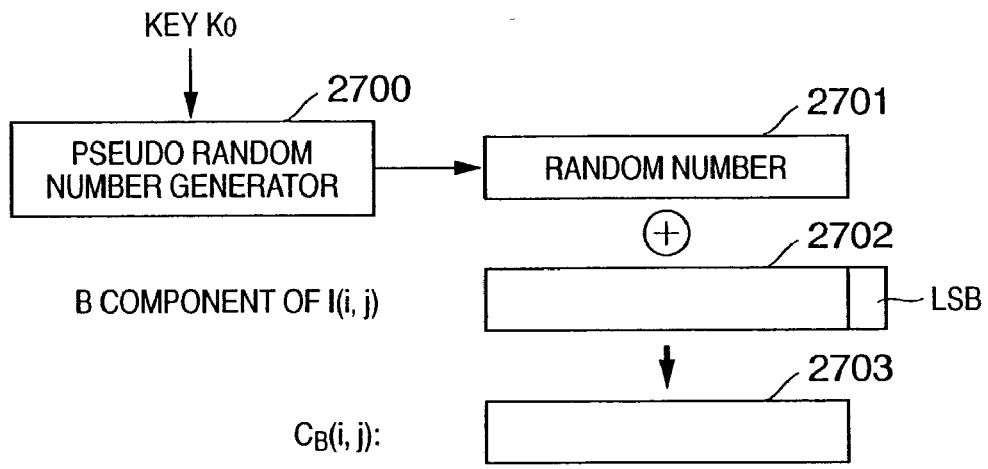
F I G. 27A
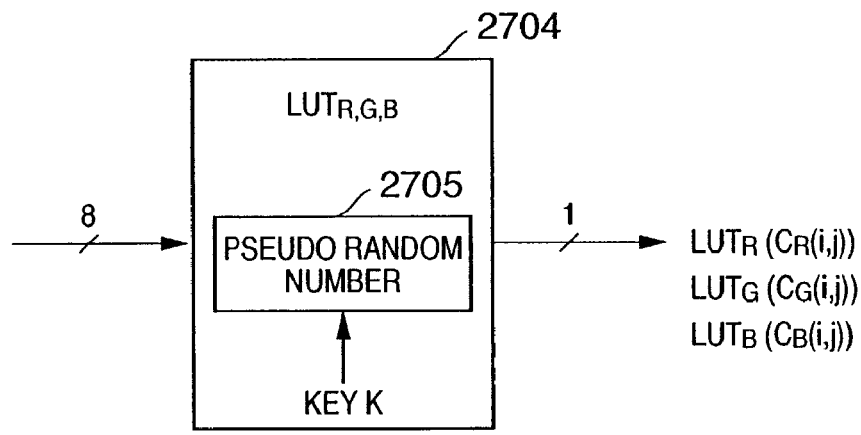
F I G. 27B
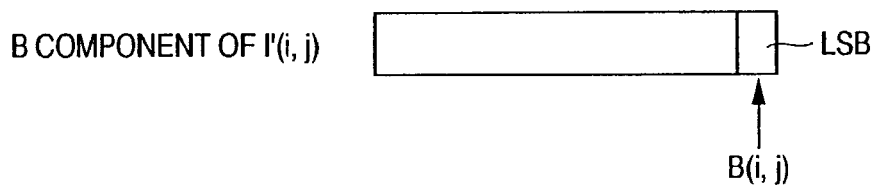
F I G. 27C

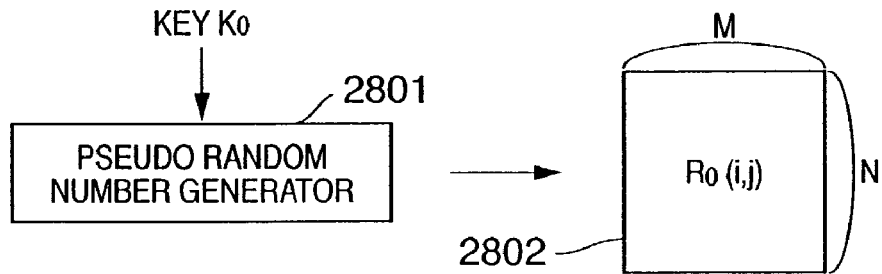
F I G. 28A
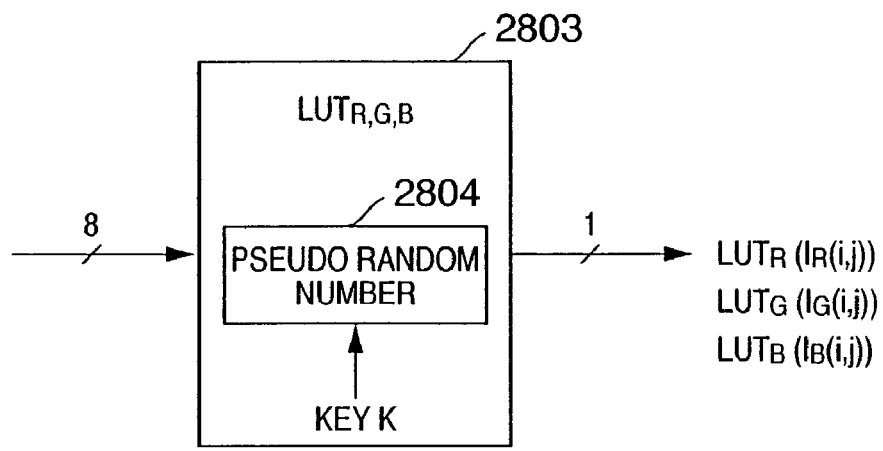
F I G. 28B
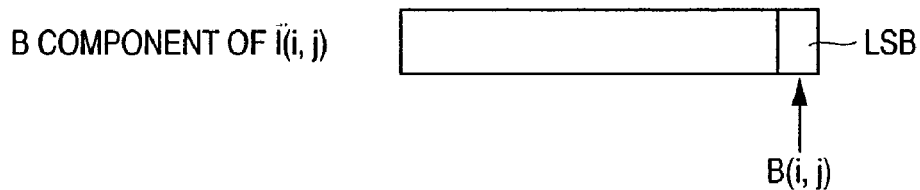
F I G. 28C

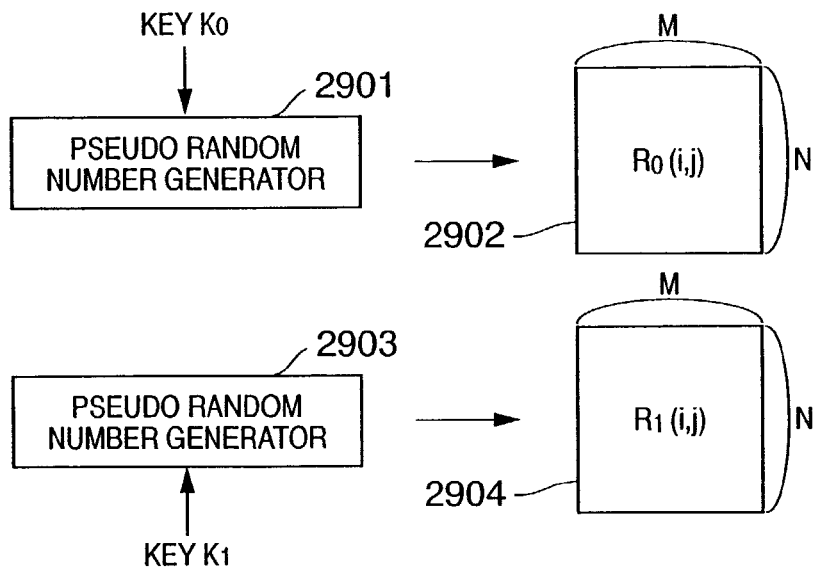
F I G. 29A
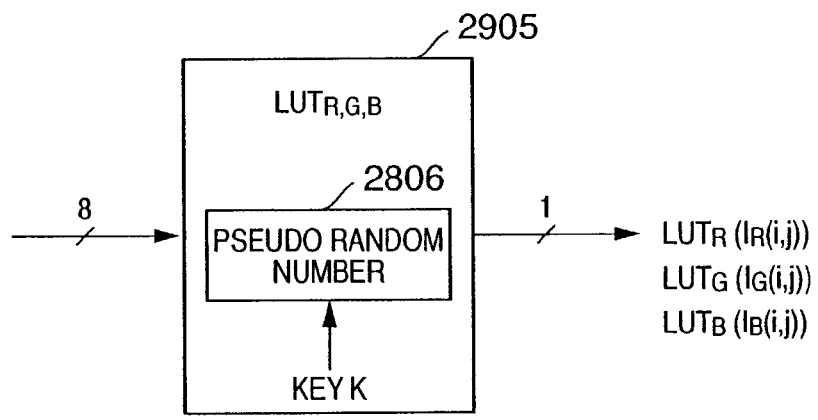
F I G. 29B
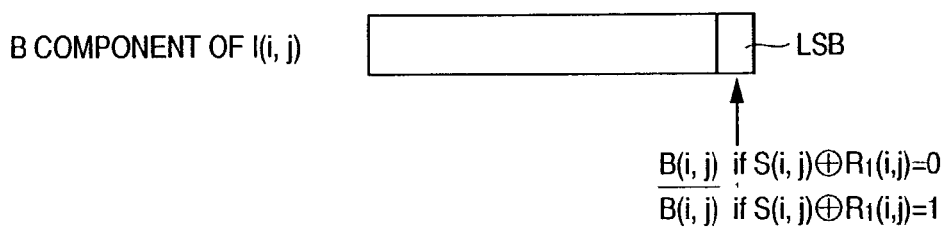
F I G. 29C

DATA PROCESSING METHOD AND APPARATUS

FIELD OF THE INVENTION

The present invention relates to processing of digital data and, more particularly, to a data processing method and apparatus for detecting a tampered position of digital data such as digital image data.

BACKGROUND OF THE INVENTION

In recent years, as computers and the Internet have prevailed, it has become popular to digitize information and use it as a digital image in place of conventional silver halide photos and paper documents. Furthermore, along with the remarkable advance of image processing techniques, a digital image can be readily edited or tampered with using, e.g., a photo retouch tool or the like. For this reason, the originality of a digital image is lower than that of conventional silver halide photos and paper documents, and the digital image is weak as an evidence. Conventionally, photo images are used as evidence photos in insurance companies or as records of progresses of construction sites in construction companies. Hence, the admissibility of such photo images, i.e., the originality plays an important role. However, the loss of admissibility of photos as evidence due to their digitization poses a serious problem.

In general, the originality of a digital image is guaranteed by generating a digital signature using public key cryptography in a Hash value of a digital image, as disclosed in U.S. Pat. No. 5,499,294. This method can detect the presence/absence of tampering but cannot detect a tampered position.

By contrast, in another method, a specific pattern is embedded in the entire image as a digital watermark, and when that image is tampered with or edited, the embedded pattern is destroyed, thereby detecting a tampered position. As an example of such method, a specific image called a stamp image is embedded in the LSB of each pixel data of image data. For example, Japanese Patent Laid-Open No. 2001-24876 has proposed a method of specifying the embedded position of a stamp image in an image using a pseudo random number generated based on secret key information.

The security of such conventional detection method of a tampered position using a digital watermark is based on the condition that its algorithm or embedded pattern is secret. Therefore, if the algorithm or embedded pattern is known to a third party, even when a digital image has been tampered with, the digital image can be forged or falsified to hide such tampering. That is, in the method of embedding a stamp image in the LSBs, a person who knows its algorithm extracts and saves the stamp image in the LSBs, tampers with the image, and reads out and embeds again the saved stamp image in the LSBs of the tampered image data, thus getting away with forgery without ever being detected of tampering.

The method of determining the embedded position of a stamp image using a pseudo random number, as disclosed in Japanese Patent Laid-Open No. 2001-24876, can assure higher security than the aforementioned method that embeds a stamp image in the LSBs, since the embedded position depends on the pseudo random number. However, once the embedded position of the stamp image is known to a third party by calculating, e.g., the difference between an original image and digitally watermarked image, similar forgery is achieved.

In general, the security of digital watermarking is premised on that its algorithm is secret, and none of methods are secure after their algorithms are known to a third party.

The conventional detection method of a tampered position using a digital watermark detects a tampered position by always embedding a stamp image. For this reason, the stamp image must be saved on the side where that image is received and used. Since such stamp image requires a large data size unlike key information, a large memory size is required, resulting in poor efficiency. On the other hand, once the stamp image is known to a third party, an image is readily forged. Hence, a method that does not use any stamp image is demanded.

Furthermore, no conventional method has been proposed that can be securely used when a plurality of different images which have undergone an embedding process using an identical key and identical stamp image are cut and pasted. For example, an attack that decomposes a plurality of different images each having the same size into blocks each having the same size, and composites a single image by replacing blocks at identical positions will be examined. At this time, if respective images use an identical key and identical stamp image, tampering cannot be detected, and this attack succeeds. Against such attach, an embedding process using different keys or different stamp images for respective images may be used. However, use of different keys or different stamp images for respective images impairs the operability of a digital watermarking application. If an image which is suspected of tampering is found, a key or stamp image used to process that image must be specified first. When an image to be verified is largely tampered with and the original image is hard to estimate, or when images processed using different keys are compounded, it is difficult to specify an original image. That is, the key or stamp image to be used cannot often be determined.

SUMMARY OF THE INVENTION

The present invention has been made in consideration of the aforementioned prior art, and has as its object to provide a data processing method and apparatus, which can embed data that can reliably specify a tampered position, even when the algorithm or embedded pattern of digital watermarking is known to a third party.

It is another object of the present invention to provide a data processing method and apparatus, which can detect a tampered position in digital data by saving only key information without using any stamp image.

It is still another object of the present invention to provide a data processing method and apparatus, which can obviate the need for saving any stamp image, and can reliably detect a tampered position in given data, even when different data undergo an embedding process using an identical key.

It is still another object of the present invention to provide a data processing method and apparatus, which can obviate the need for saving any stamp image, and can detect a shift for several patterns and an inserted or deleted image.

In order to attain the above described objects, the data processing apparatus of the present invention comprising, check bit generation means for generating first check bits corresponding to pixel positions of pixels on the basis of pseudo random number values corresponding to the pixel positions, and of pixel data of digital image data; and multiplexing means for multiplexing the first check bits in corresponding pixel data of the digital image data.

In order to attain the above described objects, the data processing apparatus of the present invention comprising, a data processing apparatus comprising: demultiplexing means for demultiplexing first check bits multiplexed in digital image data; check bit generation means for generating second check bits corresponding to pixel positions of pixels on the basis of pseudo random number values corresponding to the pixel positions, and of respective image data of the digital image data; and comparison means for comparing the first and second check bits.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 12 is a schematic flow chart for explaining a process for extracting an embedded image and specifying a tampered position in the fifth embodiment;

FIG. 19 is a flow chart for explaining a process for embedding a check bit in a data block in the ninth embodiment of the present invention;

FIGS. 27A to 27C are schematic views for explaining the image embedding process according to the first embodiment of the present invention;

FIGS. 28A to 28C are schematic views for explaining the image embedding process according to the second embodiment of the present invention;

FIGS. 29A to 29C are schematic views for explaining the image embedding process according to the sixth embodiment of the present invention;

DETAILED DESCRIPTION OF THE PREFERRED EMBODIMENTS

Preferred embodiments of the present invention will be described in detail hereinafter with reference to the accompanying drawings.

[First Embodiment]

Figure 1:
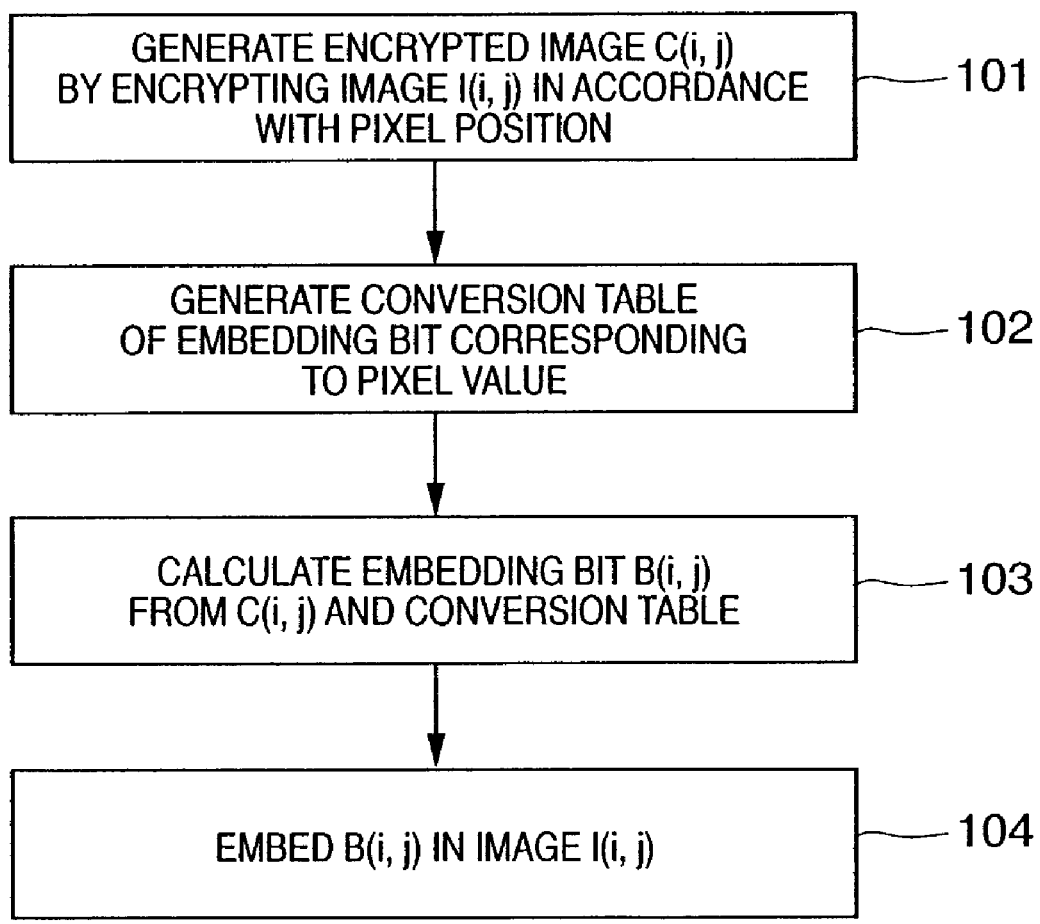
FIG. 1 is a schematic flow chart for explaining an outline of an image embedding process according to the first embodiment of the present invention.

FIG. 1 is a schematic flow chart for explaining an image embedding process according to the first embodiment of the present invention.

In FIG. 1, assume that an original image $I(i, j)$ is an M×N multi-valued image (in which one pixel is expressed by 8 bits), and $I_R(i, j)$, $I_G(i, j)$, and $I_B(i, j)$ respectively represent images obtained by decomposing the original image I into R, G, and B components. Also, in the following description, $\odot$ indicates EXOR (exclusive OR). Note that processes 103 and 104 in FIG. 1 are repeated for respective pixels from i=0 and j=0 to i=M and j=N.

<Embedding Process (FIG. 1)>

In process 101, pixel data of the image $I(i, j)$ are encrypted in accordance with their pixel positions by generating pseudo random numbers using a key $k_o$ as an initial value, and exclusively ORing respective bits except for the LSBs of B (blue) components at positions (i, j) of the original image $I(i, j)$ and these pseudo random numbers. $C(i, j)$ represents the image encrypted in this way, and $C_R(i, j)$, $C_G(i, j)$, and $C_B(i, j)$ respectively represent images obtained by decomposing that image into R, G, and B color components.

In process 102, pseudo random numbers are generated using a key k as an initial value to generate three 8-bit input/1-bit output lookup tables $LUT_R(\ )$, $LUT_G(\ )$, and $LUT_B(\ )$. These tables are generated by assigning the generated pseudo random numbers bit by bit in the order of addresses of each table.

In process 103, each embedding bit $B(i, j)=LUT_R(C_R(i, j))\odot LUT_G(C_G(i, j))\odot LUT_B(C_B(i, j))$ is calculated. Note that $LUT_R(C_R(i, j))$ indicates 1-bit data output from the lookup table $LUT_R(\ )$ when an R component $C_R(i, j)$ (8-bit data) of the encrypted image $C(i, j)$ is input. The same applies to other color components.

In process 104, the embedding bits $B(i, j)$ are embedded in the LSBs of the B (blue) component of pixel data at the positions (i, j) of the original image $I(i, j)$.

A digitally watermarked image $I'(i, j)$ obtained by the embedding process shown in FIG. 1 is an image obtained by changing the LSBs of the B components of the original image $I(i, j)$ in process 104. The reason why a digitally watermarked image is formed by changing only the LSBs of B components is to implement the embedding process for pixel data of color components, image quality deterioration of which is hardest to recognize in consideration of the visual characteristics of a human being.

An outline of this process will be described below with reference to FIGS. 27A to 27C.

Referring to FIG. 27A, reference numeral 2700 denotes a pseudo random number generator for generating a random number 2701 using the key $k_0$ as an initial value. Reference numeral 2702 denotes pixel data which is located at the position (i, j) of the original image $I(i, j)$ (including $I_R(i, j)$, $I_G(i, j)$, $I_B(i, j)$). The EXOR of a value except for the LSB of a B component $I_B(i, j)$ 2702 of that pixel data and the pseudo random number is calculated, and is used as pixel data $C_B(i, j)$ 2703 of the B component of the encrypted image $C(i, j)$. R component $C_R(i, j)$ of the encrypted image $C(i, j)$ is obtained by EXOR of the pseudo random number 2701 and $I_R(i, j)$, and G component $C_G(i, j)$ of the encrypted image $C(i, j)$ is obtained by EXOR of the pseudo random number 2701 and $I_G(i, j)$.

Referring to FIG. 27B, reference numeral 2704 denotes lookup tables ($LUT_R(\ )$, $LUT_G(\ )$, $LUT_B(\ )$) corresponding to R, G, and B components. The values of these tables 2704 are pseudo random numbers generated by a pseudo random number generator 2705 which generates a random number using the key k as an initial value. These tables respectively receive pixel data $C_R(i, j)$, $C_G(i, j)$ (both 8 bits), and $C_B(i, j)$ (7 bits or 8 bits by inserting "0" in LSB) of respective color components of the encrypted image $C(i, j)$, and output corresponding 1-bit data ($LUT_R(C_R(i, j))$, $LUT_G(C_G(i, j))$, $LUT_B(C_B(i, j))$)

FIG. 27C shows B component data at the position (i, j) of the image $I'(i, j)$ obtained by embedding the aforementioned embedding bit $B(i, j)$ in the LSB of the B component of the original image $I(i, j)$.

A method of extracting the image embedded in this way will be explained below with reference to FIG. 2.

Figure 2:
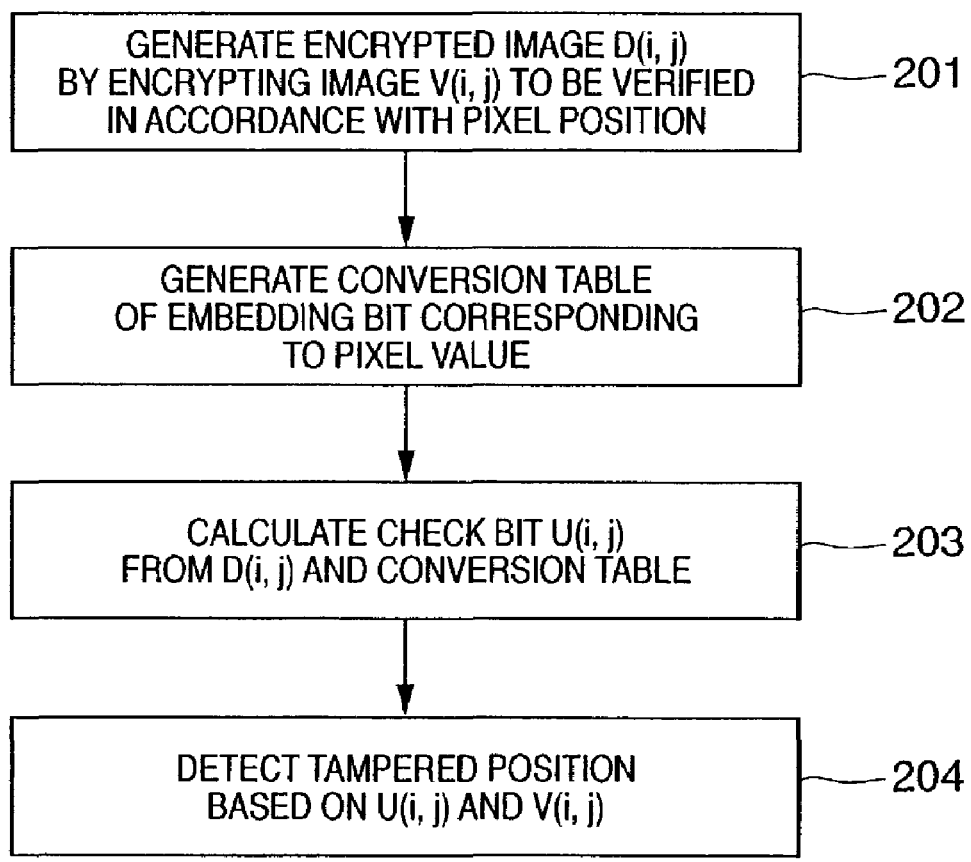
FIG. 2 is a schematic flow chart for explaining a process for extracting an embedded image and specifying a tampered position in the first embodiment.

FIG. 2 is a schematic flow chart for explaining an extraction process of an embedded image according to the first embodiment.

Assume that $V(i, j)$ represents an image to be verified, and $V_R(i, j)$, $V_G(i, j)$, and $V_B(i, j)$ represent images obtained by decomposing that image into R, G, and B components. Also, assume that a verifier possesses the keys $k_0$ and k used in the embedding process. Note that processes 203 and 204 in FIG. 2 are repeated for respective pixels from i=0 and j=0 to i=M and j=N.

<Extraction Process (FIG. 2)>

In process 201, pixel data of the image V(i, j) to be verified are encrypted in accordance with their pixel positions by generating pseudo random numbers using the key ko as an initial value, and exclusively ORing respective bits except for the LSBs of B (blue) components of pixel data at positions (i, j) of the image V(i, j) to be verified, and these pseudo random numbers. D(i, j) represents the image encrypted in this manner, and $D_R(i, j)$, $D_G(i, j)$, and $D_B(i, j)$ represent images obtained by decomposing that image into R, G, and B components.

In process 202, pseudo random numbers are generated using a key k as an initial value to generate three 8-bit input/1-bit output lookup tables $LUT_R( )$, $LUT_G( )$, and $LUT_B( )$, in the same manner as in the embedding process.

In process 203, each check bit $U(i, j)=LUT_R(D_R(i, j))\oplus LUT_G(D_G(i, j))\oplus LUT_B(D_B(i, j))$ is calculated. Note that $LUT_R(D_R(i, j))$ indicates 1-bit data output from the lookup table $LUT_R( )$ when an R component $D_R(i, j)$ (8-bit data) of the encrypted image D(i, j) is input. The same applies to other color components.

In process 204, if the check bit $U(i, j)=LSB_{BV}$, it is determined that the corresponding pixel data has not been tampered with; if the check bit $U(i, j)\neq LSB_{BV}$, it is determined that the corresponding pixel data has been tampered with, and its position is detected as a tampered position. Note that $LSB_{BV}$ is the LSB of the B (blue) component of the image V(i, j) to be verified. Note that an outline of this extraction process can be understood with reference to the aforementioned arrangement shown in FIGS. 27A to 27C, and its explanatory view will be omitted.

In the first embodiment, the tampered position is detected by generating a stream-encrypted image by exclusively ORing the original image I(i, j) or image V(i, j) to be verified, and pseudo random numbers generated using the key ko as an initial value. Hence, when the image V(i, j) to be verified has not been tampered with, this can be proved since the encrypted images C(i, j) and D(i, j) generated in the embedding and extraction processes are equal to each other.

If the pixel value at a position (m, n) of the image V(i, j) to be verified has been tampered with, encrypted images D(m, n) and C(m, n) in the extraction and embedding processes are different from each other, and the probability that a check bit U(m, n) generated from the image D(m, n) is different from an embedding bit B(m, n) generated from the encrypted image C(m, n) is ½. Hence, a tampered position can be detected as in the conventional method.

A case will be examined below wherein the extraction algorithm is known to an attacker, as a problem in the conventional method. In the method according to this embodiment, even when the extraction algorithm (including embedded positions) except for the keys $k_0$ and k is open to the public, since a pattern itself to be embedded is generated based on pseudo random numbers which depend on the pixel positions, the pattern to be embedded in the tampered image cannot be generated unless the attacker knows the keys $k_0$ and k.

A case will be examined below wherein the attacker has replaced pixels at positions (m, n) and (p, q). Assume that R(i, j) represents a pseudo random number at a position (i, j) (the pseudo random number R(i, j) is a multi-valued value as I(i, j)). In this case, an encrypted image at the position (m, n) is given by $D(m, n)=I(p, q)\oplus R(m, n)$, and an encrypted image used in the embedding process is given by $C(m, n)=I(m, n)\oplus R(m, n)$. If $I(p, q)\neq I(m, n)$, since D(m, n) and C(m, n) are different from each other, the probability that a check bit U(m, n) generated from the image D(m, n) is different from an embedding bit B(m, n) generated from the encrypted image C(m, n) is ½. Hence, the tampered position can be detected at the same probability as in other kinds of tampering.

Note that the first embodiment has been explained using the encryption method that generates pseudo random numbers in processes 101 and 201 in FIGS. 1 and 2, and exclusively ORs the original image and the pseudo random numbers. However, the present invention is not limited to such specific method, and any other methods may be used as long as each pixel can be independently encrypted. For example, each pixel may undergo known encryption such as DES cryptography or the like using the generated pseudo random number as a key.

In the first embodiment, the lookup tables which are generated based on pseudo random numbers using the key k as an initial value in processes 102 and 202 in FIGS. 1 and 2, may be open to the public. A conversion function from multi-valued data to binary data in these processes 102 and 202 need not be kept secret as long as it has unidirectionality and collision proof that disturbs deliberate output control like in a Hash function (to be described later). If a digitally watermarked image I'(i, j) free from tampering is acquired, and extraction process 204 in FIG. 2 is executed in a reverse order, a check bit U(i, j) can be detected from the LSB of a B (blue) component of I'(i, j). Such process cannot detect the encrypted image D(i, j) in process 201 in FIG. 2, but if process 202 uses conversion which does not have the above nature, manipulation of the embedding bit B(i, j) corresponding to a stamp image by manipulating I'(i, j) which forms D(i, j) can be prevented. As a result, a method other than the lookup tables can be implemented.

Furthermore, in embedding process 104 of the first embodiment, the embedding method in the B component of an image has been explained. However, the present invention is not limited to such specific method. For example, a method of inverting bits of pixel values of respective color components of I(i, j) in turn from the LSB by trial and error until B(i, j)=S(i, j) is obtained is available.

Figure 3:
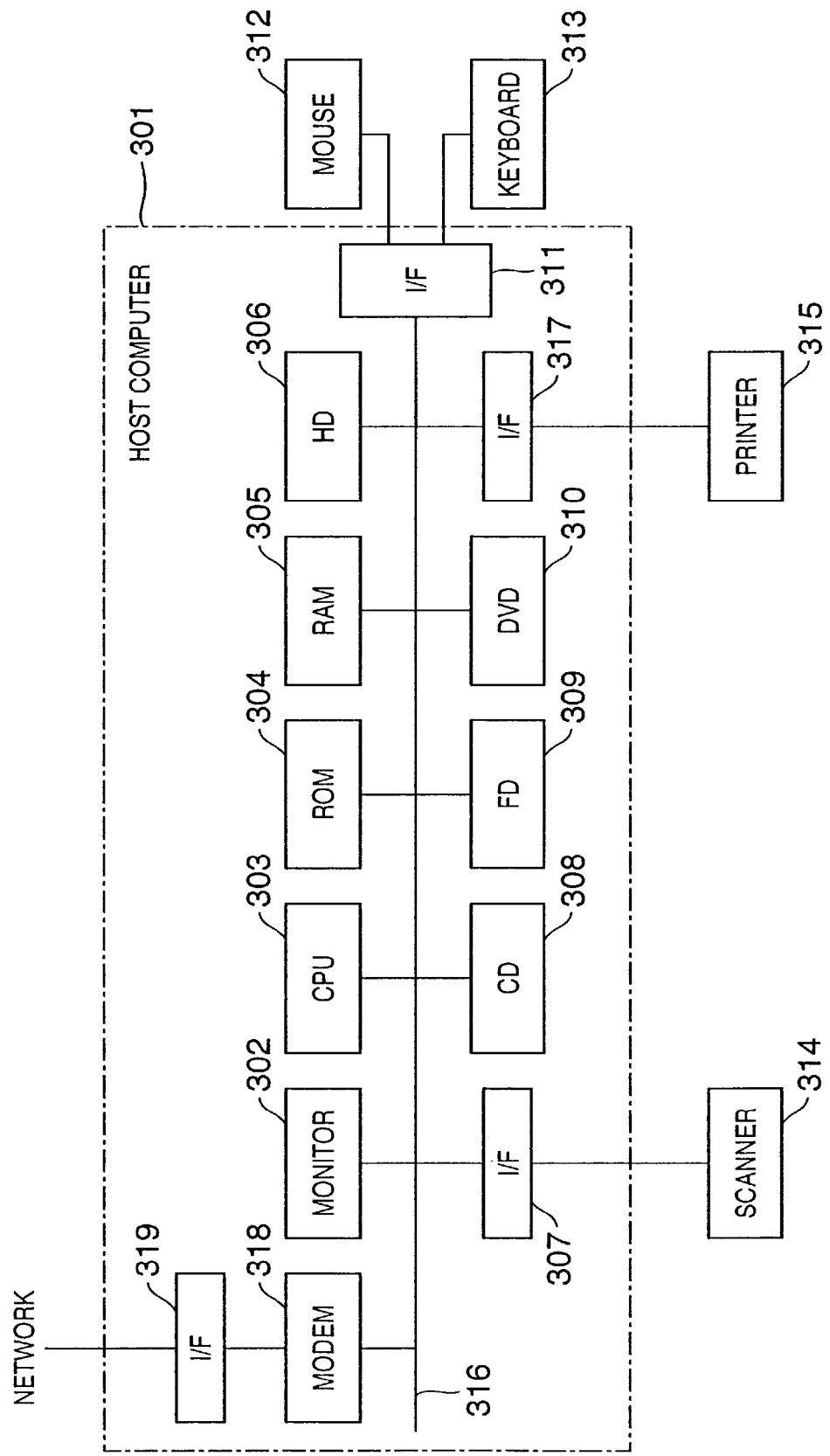
FIG. 3 is a block diagram showing the arrangement of an image processing apparatus according to an embodiment of the present invention.

The image embedding process and extraction process described above can be implemented using an image processing apparatus shown in FIG. 3.

FIG. 3 is a block diagram showing the arrangement of an image processing apparatus according to an embodiment of the present invention.

Referring to FIG. 3, a host computer 301 is, e.g., a generally prevalent personal computer, that can receive image data scanned by a scanner 314, and can edit and save that image data. Furthermore, the host computer 301 can make a printer 315 print the obtained image data. Various manual instructions from the user are input from a mouse 312 and keyboard 313. In this host computer 301, respective blocks (to be described below) are connected via a bus 316 to exchange various data.

In FIG. 3, reference numeral 302 denotes a display (monitor) such as a CRT, liquid crystal display, plasma display, or the like. Reference numeral 303 denotes a CPU which controls the operations of respective internal blocks or executes an internally stored program. Reference numeral 304 denotes a ROM which stores a specific image which is not permitted from being printed, and pre-stores a required image processing program, various data, and the like. Reference numeral 305 denotes a RAM which temporarily stores a program and data to be processed upon executing a process by the CPU 303. Reference numeral 306 denotes a hard disk (HD) which pre-stores a program and image data to be transferred to the RAM 305 or the like, and saves processed image data. Reference numeral 307 denotes a scanner interface which is connected to the scanner 314 for generating image data by scanning a document, film, or the like using a CCD, and receives image data obtained by the scanner 314. Reference numeral 308 denotes a CD drive which can load or write data from or on a CD (CD-R) as one of external storage media. Reference numeral 309 denotes an FD drive which loads or writes data from or on a floppy disk (FD) as in the CD drive 308. Reference numeral 310 denotes a DVD drive which can load or write data from or on a DVD as in the CD drive 308. When an image edit program or printer driver is stored in these CD, FD, DVD, or the like, such program is temporarily installed on the HD 306 and is transferred to and held by the RAM 305 as needed, and the CPU 303 can execute processes based on such program and the like. Reference numeral 311 denotes an interface (I/F) which is connected to the mouse 312 and keyboard 313 to receive an instruction input from the mouse 312 or keyboard 313. Reference numeral 318 denotes a modem which is connected to an external network via an interface (I/F) 319.

In the aforementioned arrangement, image data to be processed is input from a storage medium such as a CD-ROM, DVD, or the like, the scanner 314, or the network via the interface 319, and is temporarily held in the RAM 305. A program that implements the aforementioned process or a process to be described later) is read out from the HD 306, is stored in the RAM 305, and is executed in accordance with an instruction input from the keyboard 313, mouse 312, or the like, thus executing the process according to the first to 19th embodiments under the control of the CPU 303. An image in which a digital watermark or image is embedded is sent onto the network or is stored in a storage medium such as a CD, DVD, or the like. Also, by executing an embedded image extraction process for image data input from the network or the storage medium mentioned above, it can be detected if that image data has been illicitly tampered with. The detection result may be displayed on the monitor 302 to generate a warning for an operator, or may be printed by the printer 315.

As described above, according to the first embodiment, the image embedding and extraction methods which are secure even when the extraction algorithm and embedding algorithm except for a key are known to an attacker, as long as pseudo random numbers generated using the key as an initial value are secure can be implemented. Hence, this method is secure even when all algorithms except for the key are open to the public, as long as the pseudo random number generation method using the key as an initial value is secure. Since this method does not require any stamp image and the key need only be securely held, a large memory size is not required.

[Second Embodiment]

In the first embodiment, image data of an original image is directly encrypted in accordance with pixel positions. Alternatively, the second embodiment will explain a method of encrypting a bit to be embedded in accordance with the pixel position without directly encrypting an original image. Other preconditions are the same as those in the first embodiment described above. Note that processes 403 and 404, and 503 and 504 in FIGS. 4 and 5 are repeated for respective pixels from i=0 and j=0 to i=M and j=N.

<Embedding Process (FIG. 4)>

Figure 4:
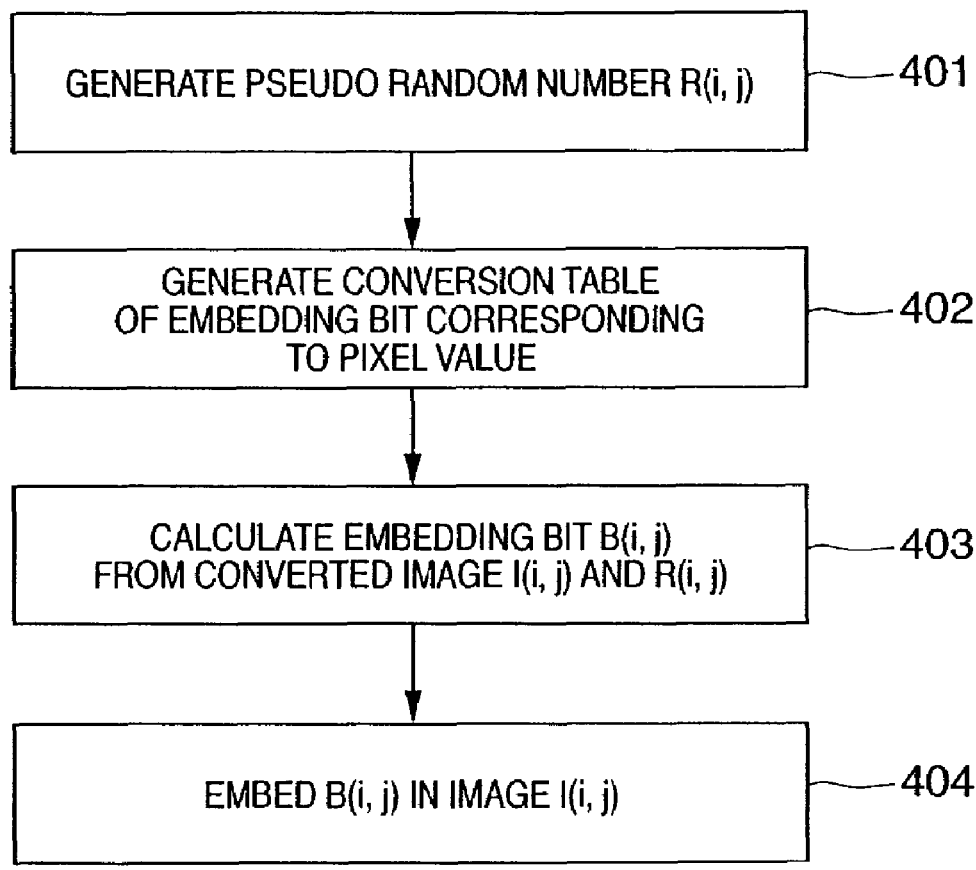
FIG. 4 is a schematic flow chart for explaining an outline of an image embedding process according to the second embodiment of the present invention.
Figure 5:
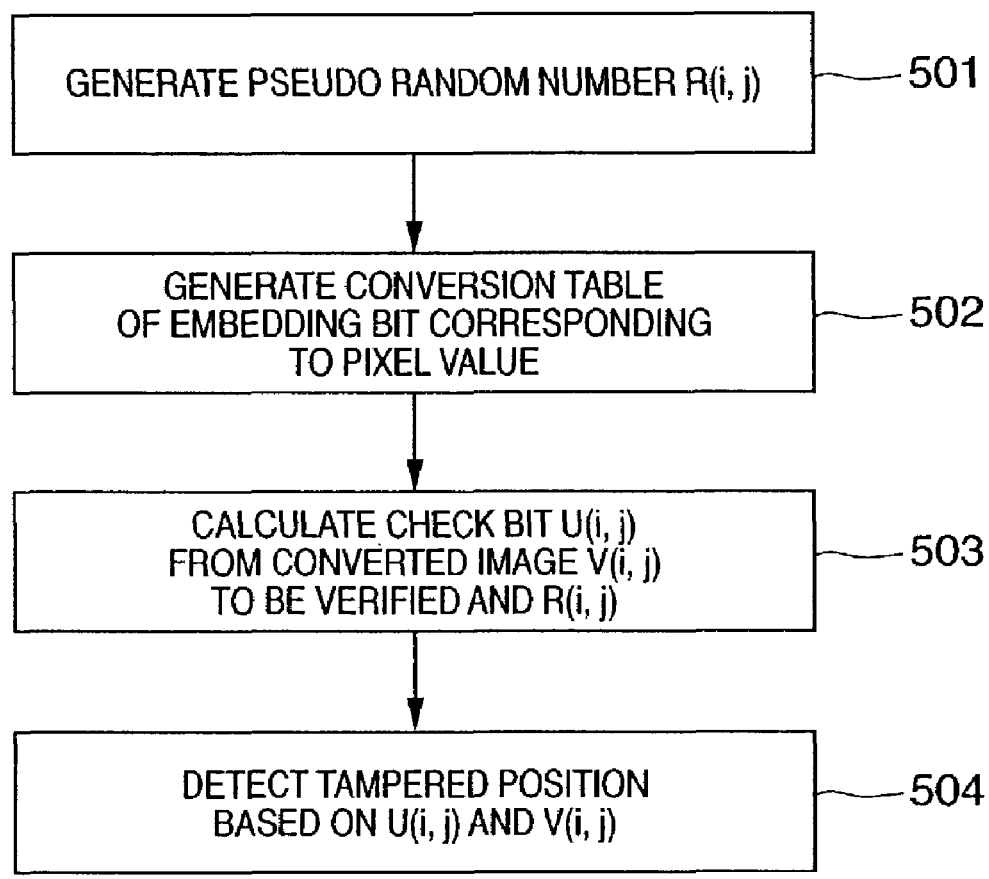
FIG. 5 is a schematic flow chart for explaining a process for extracting an embedded image and specifying a tampered position in the second embodiment.

FIG. 4 is a flow chart for explaining an image embedding process according to the second embodiment of the present invention.

In process 401, pseudo random numbers are generated using a key $k_o$ as an initial value to generate an M×N binary pseudo random number image $R_0(i, j)$.

In process 402, pseudo random numbers are generated using a key k as an initial value to generate three 8-bit input/1-bit output lookup tables $LUT_R( )$, $LUT_G( )$, and $LUT_B( )$. These tables are generated by assigning the generated pseudo random numbers bit by bit in the order of addresses of each table.

In process 403, each embedding bit $B(i, j)=LUT_R(I_R(i, j)) \oplus LUT_G(I_G(i, j)) \oplus LUT_B(I_B(i, j)) \oplus R_0(i, j)$ is calculated.

In process 404, the embedding bits $B(i, j)$ are embedded in the LSBs of a B component of the original image $I(i, j)$, thus obtaining a digitally watermarked image.

FIGS. 28A to 28C are views for explaining the image embedding process according to the second embodiment. In FIG. 28A, a pseudo random number generator 2801 generates M×N random numbers 2802 using the key $k_0$ as an initial value. In FIG. 28B, lookup tables 2803 ($LUT_R( )$, $LUT_G( )$, $LUT_B( )$) for respective color components are generated using random numbers generated by a pseudo random number generator 2804 that uses the key k as an initial value. These lookup tables respectively receive 8-bit data, and output 1-bit data ($LUT_R(I_R(i, j))$, $LUT_G(I_G(i, j))$, $LUT_B(I_B(i, j))$). In FIG. 28C, the aforementioned embedding bit $B(i, j)$ is inserted in the LSB of pixel data of the B component at a position (i, j) of the image $I(i, j)$, thus generating an embedded image.

<Extraction Process (FIG. 5)>

FIG. 5 is a flow chart for explaining an embedded image extraction process according to the second embodiment of the present invention.

In process 501, pseudo random numbers are generated using the key $k_o$ as an initial value to generate an M×N binary pseudo random number image $R_0(i, j)$.

In process 502, pseudo random numbers are generated using the key k as an initial value to generate three 8-bit input/1-bit output lookup tables $LUT_R( )$, $LUT_G( )$, and $LUT_B( )$, in the same manner as in the embedding process.

In process 503, each check bit $U(i, j)=LUT_R(V_R(i, j)) \oplus LUT_G(V_G(i, j)) \oplus LUT_B(V_B(i, j)) \oplus R_0(i, j)$ is calculated.

In process 504, if the check bit $U(i, j)=LSB_{BV}$, it is determined that the corresponding pixel data has not been tampered with; if the check bit $U(i, j) \neq LSB_{BV}$, it is determined that the corresponding pixel data has been tampered with, and the position (i, j) is detected as its tampered position. Note that $LSB_{BV}$ is the LSB of the B (blue) component of the image $V(i, j)$ to be verified.

The second embodiment is simpler than the first embodiment, since the number of pseudo random numbers to be generated in processes 401 and 501 is smaller than that in the first embodiment, and the need for the process for encrypting an image can be obviated. However, the problem of the conventional method is solved by directly adding pseudo random numbers corresponding to pixel positions in arithmetic operations of $B(i, j)$ and $U(i, j)$ in processes 403 and 503 in place of encrypting the original image $I(i, j)$ or image $V(i, j)$ to be verified for respective pixels. That is, the present invention includes all methods that can encrypt a digital watermark pattern to be embedded in accordance with pixel positions without directly encrypting an image in accordance with pixel positions.

Hence, when the image V(i, j) to be verified has not been tampered with, this can be proved since the embedding bit B(i, j) and check bit U(i, j) generated in the embedding and extraction processes are equal to each other. If the pixel value at a position (m, n) of the image V(i, j) to be verified has been tampered with, since elements of B(m, n) and U(m, n) except for R(m, n) are different from each other, the tampered position is detected at a probability of ½ as in the conventional method.

A case will be examined below wherein the extraction algorithm and stamp image are known to an attacker as a problem in the conventional method. Assume that the stamp image is a pattern of all "0"s for the sake of simplicity. In the method according to this embodiment, even when the extraction algorithm (including embedded positions) except for the keys $k_0$ and k, and stamp image are open to the public, since the pattern itself to be embedded is generated based on pseudo random numbers which depend on the pixel positions, the pattern to be embedded in the tampered image cannot be generated unless the attacker knows the keys $k_0$ and k.

A case will be examined below wherein the attacker has replaced pixels at positions (m, n) and (p, q). In this case, the check bit U(m, n) at the position (m, n) is given by $LUT_R(V_R(p, q)) \odot LUT_G(V_G(p, q)) \odot LUT_B(V_B(p, q)) \odot R_0(m, n)$, and the embedding bit used in the embedding process is given by $B(m, n) = LUT_R(V_R(m, n)) \odot LUT_G(V_G(m, n)) \odot LUT_B(V_B(m, n)) \odot R_0(m, n)$. Hence, the check bit U(m, n) is different from the embedding bit B(m, n) at a probability of ½. Therefore, the tampered position can be detected at the same probability as in other kinds of tampering.

In the second embodiment, processes 402 and 502 are not limited to processes using the lookup tables, but any other methods may be used as long as they can fixedly encrypt for respective pixels. For example, known cryptography such as DES cryptography or the like can be used for respective pixels using an identical key.

Furthermore, in embedding process 404 of this embodiment, the embedding method in the B component of an image has been explained. However, the present invention is not limited to such specific method. For example, a method of inverting bits of pixel values of respective color components of I(i, j) in turn from the LSB by trial and error until B(i, j)=S(i, j) is obtained is available.

[Third Embodiment]

In the first and second embodiments, highly secure tampered position detection methods have been explained taking an image as an example. However, the present invention is not limited to an image, and includes all methods that encrypt digital data, and append corresponding check information used to detect a tampered position.

Figure 6:
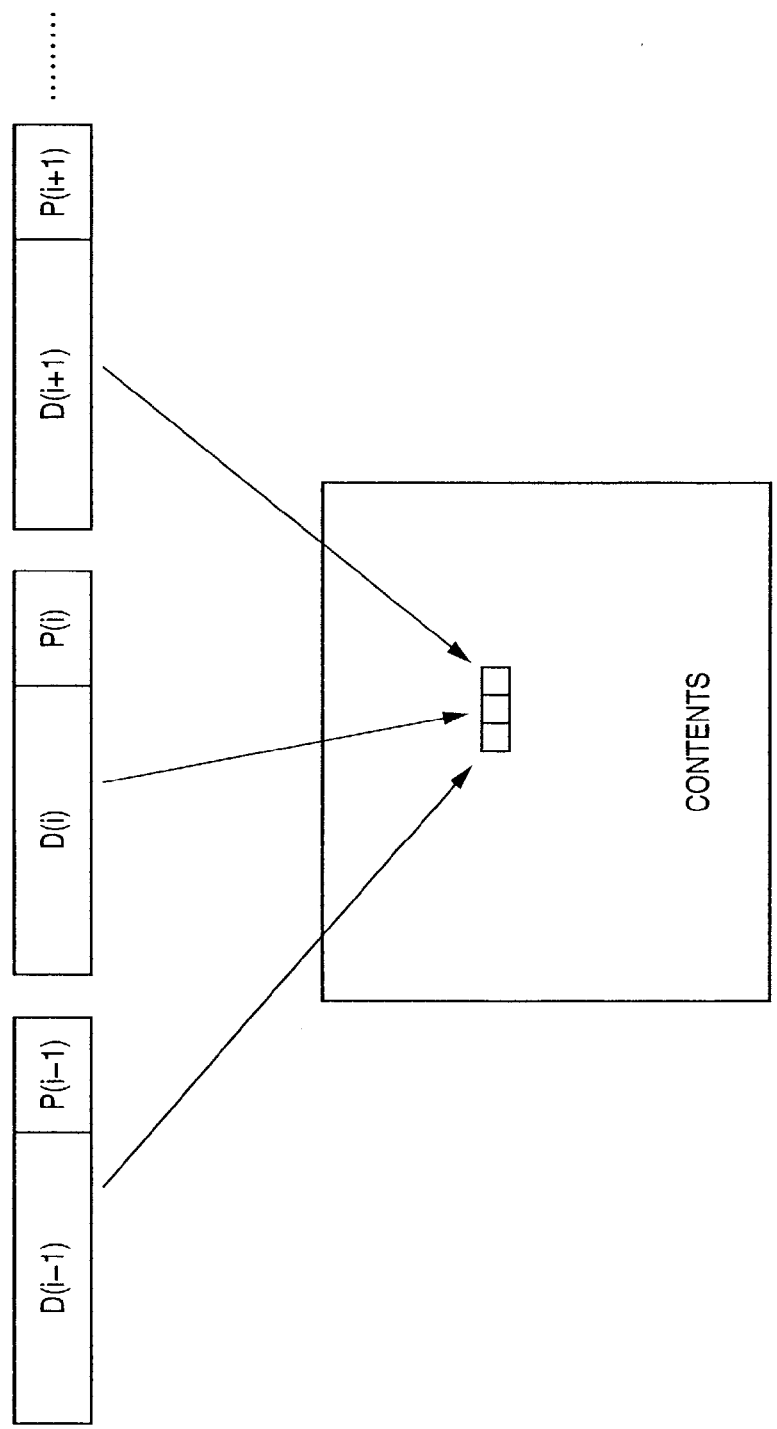
FIG. 6 is a view for explaining the format of data blocks according to the third embodiment of the present invention.

For example, a case will be examined below wherein one contents is expressed by a plurality of data blocks, as shown in FIG. 6. In case of normal tampering detection, a check bit for each data block can be appended using an error detection code or the like. At this time, if an error detection code used is special and secret, no problem is posed since an attacker can tamper a data block but cannot generate a corresponding check bit. However, if the error correction code used is open to the public, tampering of a data block cannot be found since the attacker can generate a check bit according to the tampered data. Even when the error correction code used is special and secret, replacement or the like of data blocks including check bits cannot be detected since error detection is made for each data block. Hence, the same problem as that for an image discussed in the first to third embodiments occurs.

Therefore, this problem can be solved by the following method which encrypts according to the order of data blocks, and generates check bits for the encrypted blocks.

Figure 7:
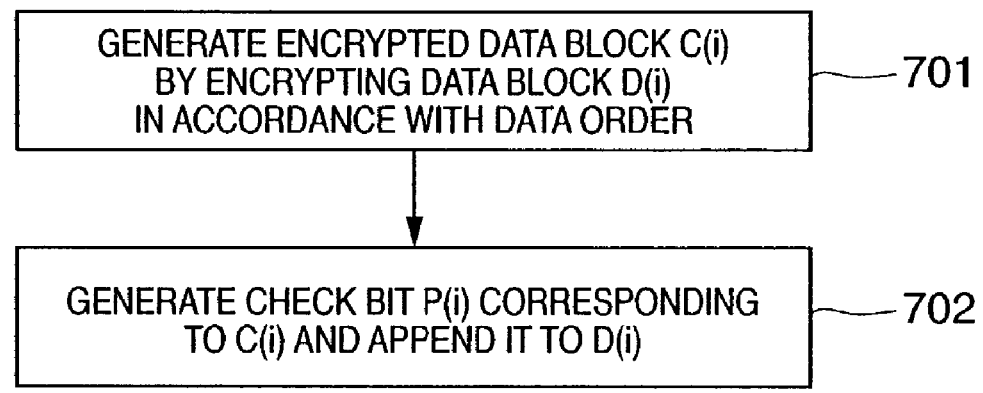
FIG. 7 is a flow chart for explaining a check bit embedding process in the third embodiment.

FIG. 7 is a flow chart for explaining a process for appending check bits to data blocks according to the third embodiment of the present invention.

<Sending Side (FIG. 7)>

In process 701, pseudo random numbers are generated using a key $k_0$ as an initial value, and are exclusively ORed with respective data blocks D(i) (i indicates the order) which form contents, thereby generating encrypted blocks C(i) according to the order of data blocks. In process 702, check bits P(i) corresponding to the encrypted data blocks C(i) are generated using a known error correction code, and are appended to the data blocks D(i).

Figure 8:
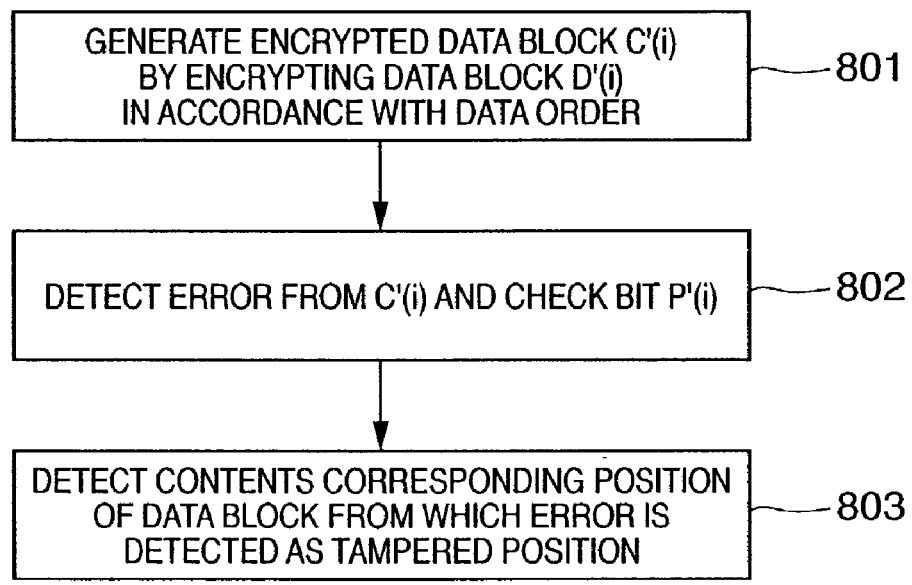
FIG. 8 is a schematic flow chart for explaining a process for extracting a check bit and specifying a tampered position in the third embodiment.

FIG. 8 is a flow chart for explaining a process for receiving the data blocks appended with the check bits and detecting tampering of each data block according to the third embodiment of the present invention.

<Receiving Side (FIG. 8)>

In process 801, pseudo random numbers are generated using the key $k_0$ as an initial value, and are exclusively ORed with respective data blocks D'(i) (i indicates the order), thereby generating encrypted data blocks C'(i) according to the order of the received data blocks D'(i).

In process 802, errors are detected from the encrypted data blocks C'(i) and received check bits P(i) using the known error detection code used on the sending side. In process 803, if any error is detected, the position of the contents corresponding to that data block is detected as a tampered position.

As an application example of contents which is formed by a plurality of data blocks, MIDI (Music Instrument Digital Interface) that has been prevalently used as music information to be delivered via the Internet or the like in recent years, SMF (Standard Midi File) as a standard format of a music play data file, and the like are available. Such music information is sent while being broken up into a plurality of blocks, and the receiving side combines the plurality of received blocks to form one music information. Hence, the method of this embodiment can be applied to detect a tampered block.

On the other hand, JPEG, MPEG, or the like is formed as a single data stream in appearance, but can be broken up into 8×8 pixel data blocks or data blocks for respective frames, and a series of these blocks form a single contents. FIG. 6 illustrates separate data blocks for the sake of simplicity. However, the present invention can be applied to a contents which looks like a single data stream but is formed by a plurality of data blocks in practice.

In the third embodiment, the check bits are constructed using an error correction code. However, since such check bits can be constructed using the aforementioned Hash function or the like, the present invention is not limited to such specific check bits. Furthermore, in this embodiment, the check bits are appended to data blocks. Alternatively, check bits may be embedded in data blocks using known digital watermarking that can be applied to the contents.

Note that the aforementioned Hash value is an output value of a Hash function h, which is a compression function that hardly causes collision. Note that collision is an event which yields $h(x_1)=h(x_2)$ for different $x_1$ and $x_2$. Also, the compression function is a function for converting a bit sequence having an arbitrary bit length into a bit sequence having a given length, and with this function, $x_1$ and $x_2$ which satisfy $h(x_1)=h(x_2)$ cannot be easily found. At this time, since x that satisfies y=h(x) cannot be easily found from arbitrary y, the Hash function is consequently a unidirectional function. As examples of the Hash function, MD (Message Digest) 5, SHA (Secure Hash Algorithm) 1, and the like are known.

[Fourth Embodiment]

Figure 9:
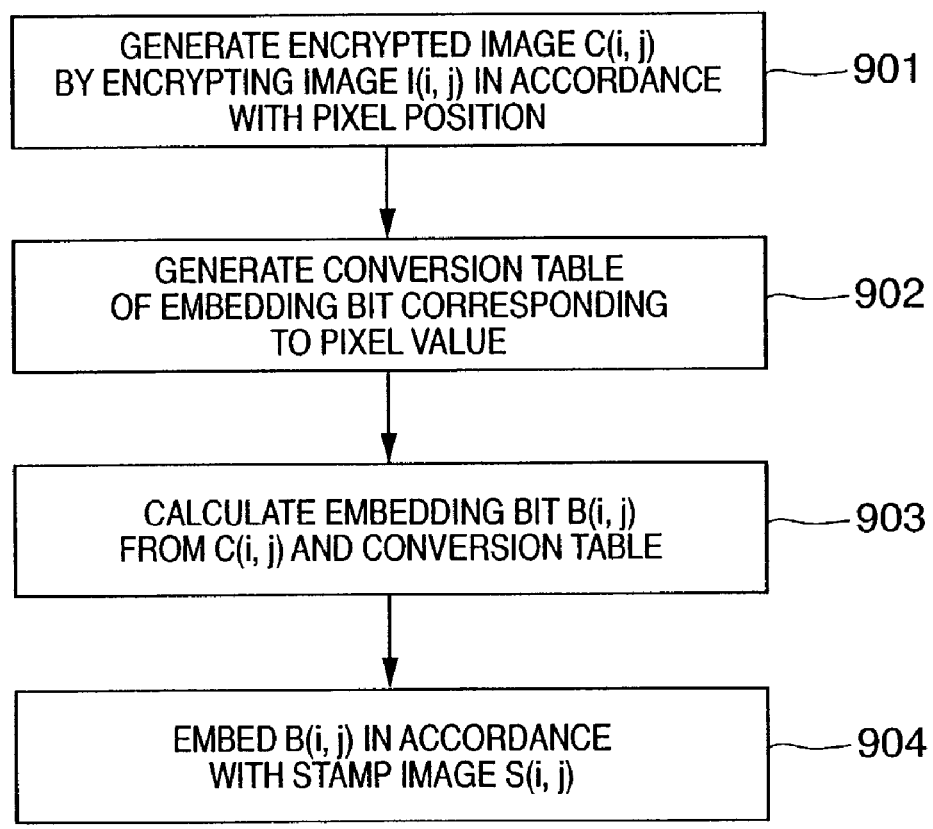
FIG. 9 is a schematic flow chart for explaining an outline of an image embedding process according to the fourth embodiment of the present invention.

In the fourth embodiment, assume that an original image I(i, j) is an M×N multi-valued image (in which one pixel is expressed by 8 bits), and $I_R$(i, j), $I_G$(i, j), and $I_B$(i, j) respectively represent images obtained by decomposing the original image I into R, G, and B components. Also, a predetermined binary image is called a stamp image, which is represented by S(i, j). Furthermore, ⊚ indicates EXOR (exclusive OR) as in the above embodiments. Note that processes 903 and 904 in FIG. 9 are repeated for respective pixels from i=0 and j=0 to i=M and j=N.

<Embedding Process (FIG. 9)>

In process 901, pixel data of image I(i, j) are encrypted in accordance with their pixel positions by generating pseudo random numbers using a key $k_o$ as an initial value, and exclusively ORing respective bits except for the LSBs of B (blue) components at positions (i, j) of the original image I(i, j) and these pseudo random numbers. C(i, j) represents the image encrypted in this way, and $C_R$(i, j), $C_G$(i, j), and $C_B$(i, j) respectively represent images obtained by decomposing that image into R, G, and B color components.

In process 902, pseudo random numbers are generated using a key k as an initial value to generate three 8-bit input/1-bit output lookup tables $LUT_R$( ), $LUT_G$( ), and $LUT_B$( ). These tables are generated by assigning the generated pseudo random numbers bit by bit in the order of addresses of each table.

In process 903, each embedding bit B(i, j)=$LUT_R$($C_R$(i, j))⊚$LUT_G$($C_G$(i, j))⊚$LUT_B$($C_B$(i, j)) is calculated.

In process 904, if the stamp image S(i, j)=0, $LSB_B$=B(i, j) is set; if the stamp image S(i, j)=1, $LSB_B$=B(i, j)⊚1 is set. Note that $LSB_B$ indicates the LSB of the B component of the original image I(i, j).

A digitally watermarked image I'(i, j) obtained by the embedding process shown in FIG. 9 is an image obtained by inserting embedding bits B(i, j) in the LSBs of the B components of the original image I(i, j) in process 904. The reason why a digitally watermarked image is formed by changing only the LSBs of B components is to embed data in pixel data of color components, image quality deterioration of which is hardest to recognize in consideration of the visual characteristics of a human being.

A method of extracting the embedded image will be explained below with reference to FIG. 10.

Figure 10:
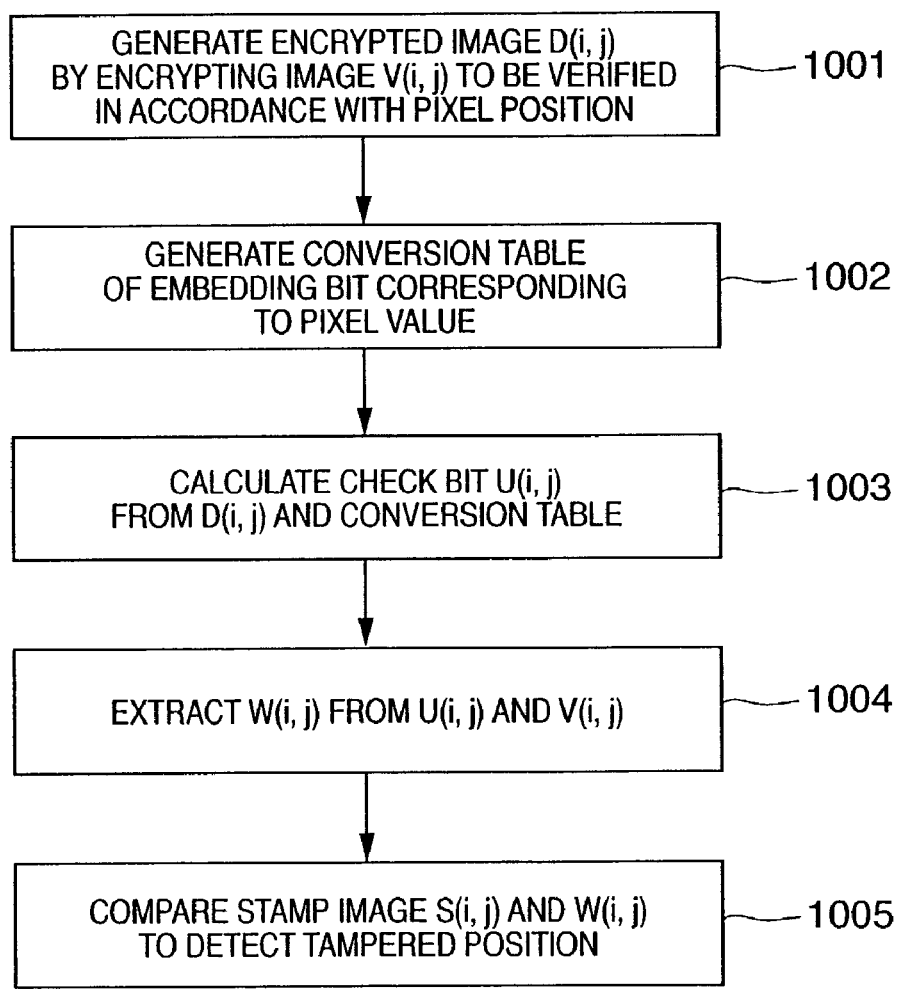
FIG. 10 is a schematic flow chart for explaining a process for extracting an embedded image and specifying a tampered position in the fourth embodiment.

FIG. 10 is a flow chart for explaining the embedded image extraction process according to the fourth embodiment.

Assume that V(i, j) represents an image to be verified, and $V_R$(i, j), $V_G$(i, j), and $V_B$(i, j) represent images obtained by decomposing that image into R, G, and B components. Also, assume that a verifier possesses the keys $k_0$ and k used in the embedding process, and the stamp image S(i, j). Note that processes 1003 to 1005 in FIG. 10 are repeated for respective pixels from i=0 and j=0 to i=M and j=N.

<Extraction Process (FIG. 10)>

In process 1001, pixel data of the image V(i, j) to be verified are encrypted in accordance with their pixel positions by generating pseudo random numbers using the key $k_0$ as an initial value, and exclusively ORing respective bits except for the LSBs of B (blue) components at positions (i, j) of the image V(i, j) to be verified, and these pseudo random numbers. D(i, j) represents the image encrypted in this manner, and $D_R$(i, j), $D_G$(i, j), and $D_B$(i, j) represent images obtained by decomposing that image D(i, j) into R, G, and B components.

In process 1002, pseudo random numbers are generated using a key k as an initial value to generate three 8-bit input/1-bit output lookup tables $LUT_R$( ), $LUT_G$( ), and $LUT_B$( ), in the same manner as in the embedding process.

In process 1003, each check bit U(i, j)=$LUT_R$($D_R$(i, j))⊚$LUT_G$($D_G$(i, j))⊚$LUT_B$($D_B$(i, j)) is calculated.

In process 1004, if the check bit U(i, j)=$LSB_B$, W(i, j)=0 is set; if the check bit U(i, j)≠$LSB_B$, W(i, j)=1 is set. Note that $LSB_B$ is the LSB of each B component of the image V(i, j) to be verified.

In process 1005, W(i, j) is compared with the stamp image S(i, j). If W(i, j)=S(i, j), it is determined that the corresponding pixel data has not been tampered with; if W(i, j)≠S(i, j), it is determined that the corresponding pixel data has been tampered with, and the position (i, j) is determined as its tampered position.

In the fourth embodiment, the tampered position is detected by exclusively ORing the original image I(i, j) or image V(i, j) to be verified, and pseudo random numbers generated using the key $k_0$ as an initial value. Hence, when the image V(i, j) to be verified has not been tampered with, this can be proved since the encrypted images C(i, j) and D(i, j) generated in the embedding and extraction processes are equal to each other. If the pixel value at a position (m, n) of the image V(i, j) to be verified has been tampered with, encrypted images D(m, n) and C(m, n) in the extraction and embedding processes are different from each other, and the probability that a check bit U(m, n) generated from the image D(m, n) is different from an embedding bit B(m, n) generated from the encrypted image C(m, n) is ½. Hence, the tampered position can be detected as in the conventional method.

A case will be examined below wherein the extraction algorithm and stamp image are known to an attacker, as a problem in the conventional method. In the method according to this embodiment, even when the extraction algorithm (including embedded positions) except for the keys $k_0$ and k and the stamp image are open to the public, since a pattern itself to be embedded is generated based on pseudo random numbers which depend on the pixel positions, the pattern to be embedded in the tampered image cannot be generated unless the attacker knows the keys $k_0$ and k.

A case will be examined below wherein the attacker has replaced pixels at positions (m, n) and (p, q). Assume that R(i, j) represents a pseudo random number at a position (i, j) (the pseudo random number R(i, j) is a multi-valued value as I(i, j)). In this case, an encrypted image at the position (m, n) is given by D(m, n)=I(p, q)⊚R(m, n), and an encrypted image used in the embedding process is given by C(m, n)=I(m, n)⊚R(m, n). If I(p, q)≠I(m, n), since D(m, n) and C(m, n) are different from each other, the probability that a check bit U(m, n) generated from the image D(m, n) is different from an embedding bit B(m, n) generated from the encrypted image C(m, n) is ½. Hence, the tampered position can be detected at the same probability as in other kinds of tampering.

Note that the fourth embodiment has been explained using the encryption method that generates pseudo random numbers in processes 901 and 1001 in FIGS. 9 and 10, and exclusively ORs the original image and the pseudo random numbers. However, the present invention is not limited to such specific method, and any other methods may be used as long as each pixel can be independently encrypted. For example, each pixel may undergo known encryption such as DES cryptography or the like using the generated pseudo random number as a key.

In the fourth embodiment, the lookup tables which are generated based on pseudo random numbers using the key k as an initial value in processes 902 and 1002 in FIGS. 9 and 10, may be open to the public. A conversion function from multi-valued data to binary data in these processes 902 and 1002 need not be kept secret as long as it has unidirectionality and collision proof that disturbs intentional output control like in a Hash function (to be described later). If the digitally watermarked image I'(i, j) free from tampering is acquired, and extraction processes 1005 to 1003 in FIG. 10 are executed in a reverse order, a check bit U(i, j) can be detected from the stamp image S(i, j) and the LSB of a B (blue) component of I'(i, j). Such process cannot detect the encrypted image D(i, j) in process 1001 in FIG. 10, but if process 1002 uses Hash conversion or the like which does not have the above nature, manipulation of the embedding bit B(i, j) corresponding to the stamp image by manipulating I'(i, j) which forms D(i, j) can be prevented. As a result, a method free from any restrictions, i.e., other method using no lookup table can be implemented.

Furthermore, in embedding process 904 of the fourth embodiment, the embedding method in the B component of an image has been explained. However, the present invention is not limited to such specific method. For example, a method of inverting bits of pixel values of respective color components of I(i, j) in turn from the LSB by trial and error until B(i, j)=S(i, j) is obtained is available.

The aforementioned image embedding process and extraction process can be implemented using the image processing apparatus shown in FIG. 3.

As described above, according to the fourth embodiment, image embedding and extraction methods which are secure even when the extraction algorithm and embedding algorithm except for a key, and the stamp image are known to an attacker as long as pseudo random numbers generated using a key as an initial value are secure can be implemented. Hence, this method is secure even when all algorithms except for the key are open to the public, as long as the pseudo random number generation method using the key as an initial value is secure.

[Fifth Embodiment]

In the fourth embodiment, image data of an original image is directly encrypted in accordance with the pixel positions. Alternatively, the fifth embodiment will explain a method of encrypting a bit to be embedded in accordance with a pixel position without directly encrypting an original image. Other preconditions are the same as those in the above embodiment described above. Note that processes 1103 and 1104, and 1203 to 1205 in FIGS. 11 and 12 are repeated for respective pixels from i=0 and j=0 to i=M and j=N.

<Embedding Process (FIG. 11)>

Figure 11:
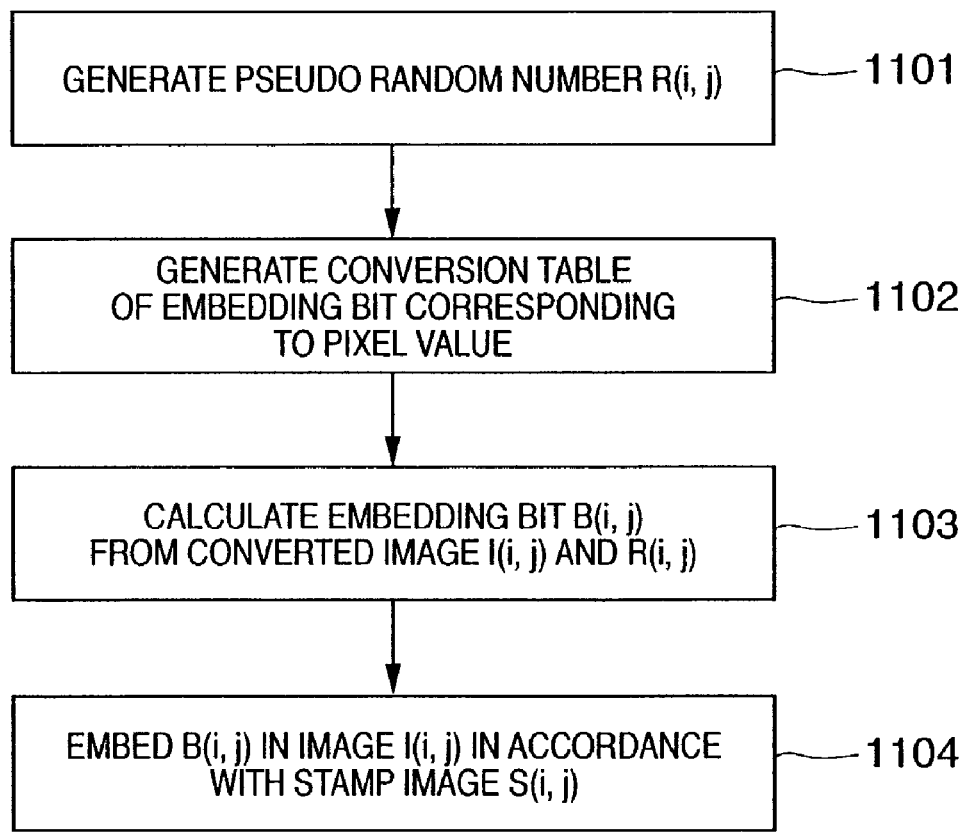
FIG. 11 is a schematic flow chart for explaining an outline of an image embedding process according to the fifth embodiment of the present invention.

FIG. 11 is a flow chart for explaining an image embedding process according to the fifth embodiment of the present invention.

In process 1101, pseudo random numbers are generated using a key $k_o$ as an initial value to generate an M×N binary pseudo random number image $R_0(i, j)$.

In process 1102, pseudo random numbers are generated using a key k as an initial value to generate three 8-bit input/1-bit output lookup tables $LUT_R( )$, $LUT_G( )$, and $LUT_B( )$. These tables are generated by assigning the generated pseudo random numbers bit by bit in the order of addresses of each table.

In process 1103, each embedding bit $B(i, j)=LUT_R(I_R(i, j))\odot LUT_G(I_G(i, j))\odot LUT_B(I_B(i, j))\odot R_0(i, j)$ is calculated.

In process 1104, if a stamp image S(i, j)=0, B(i, j) is inserted in the LSB ($LSB_B$) of a B component of the original image I(i, j) ($LSB_B$=B); if S(i, j)=1, $LSB_B$=B(i, j)⊙1 is set. In this manner, an image is embedded in the original image I(i, j).

<Extraction Process (FIG. 12)>

FIG. 12 is a flow chart for explaining an embedded image extraction process according to the fifth embodiment of the present invention.

In process 1201, pseudo random numbers are generated using the key $k_o$ as an initial value to generate an M×N binary pseudo random number image $R_0(i, j)$.

In process 1202, pseudo random numbers are generated using the key k as an initial value to generate three 8-bit input/1-bit output lookup tables $LUT_R( )$, $LUT_G( )$, and $LUT_B( )$, in the same manner as in the embedding process.

In process 1203, each check bit $U(i, j)=LUT_R(V_R(i, j))\odot LUT_G(V_G(i, j))\odot LUT_B(V_B(i, j))\odot R_0(i, j)$ is calculated.

In process 1204, if the check bit U(i, j)=$LSB_B$, W(i, j)=0 is set; if the check bit U(i, j)≠$LSB_B$, W(i, j)=1 is set. Note that $LSB_B$ indicates the LSB of the B component of the image V(i, j) to be verified. In process 1205, W(i, j) is compared with the stamp image S(i, j). If W(i, j)=S(i, j), it is determined that the corresponding pixel data has not been tampered with; if W(i, j)≠S(i, j), it is determined that the corresponding pixel data has been tampered with, and the position (i, j) is determined as its tampered position.

The fifth embodiment is simpler than the fourth embodiment, since the number of pseudo random numbers to be generated in processes 1101 and 1201 is smaller than that in the fourth embodiment, and the need for the process for encrypting an image can be obviated. However, the problem of the conventional method is solved by directly adding pseudo random numbers corresponding to pixel positions in arithmetic operations of the embedding bits B(i, j) and check bits U(i, j) in processes 1103 and 1203 in place of encrypting the original image I(i, j) or image V(i, j) to be verified for respective pixels. That is, the present invention includes all methods that can encrypt a digital watermark pattern to be embedded in accordance with the pixel positions without directly encrypting an image in accordance with pixel positions.

Hence, when the image V(i, j) to be verified has not been tampered with, it is proved since the embedding bit B(i, j) and check bit U(i, j) generated in the embedding and extraction processes are equal to each other. If the pixel value at a position (m, n) of the image V(i, j) to be verified has been tampered with, since elements of B(m, n) and U(m, n) except for R(m, n) are different from each other, a tampered position is detected at a probability of ½ as in the conventional method.

A case will be examined below wherein the extraction algorithm and stamp image are known to an attacker as a problem in the conventional method. Assume that the stamp image is a pattern of all "0"s for the sake of simplicity. In the method according to this embodiment, even when the extraction algorithm (including embedded positions) except for the keys ko and k, and stamp image are open to the public, since the pattern itself to be embedded is generated based on pseudo random numbers which depend on the pixel positions, the pattern to be embedded in the tampered image cannot be generated unless the attacker knows the keys $k_O$ and k.

A case will be examined below wherein the attacker has replaced pixels at positions (m, n) and (p, q). In this case, the check bit U(m, n) at the position (m, n) is given by $LUT_R(V_R(p, q)) \odot LUT_G(V_G(p, q)) \odot LUT_B(V_B(p, q)) \odot R_0(m, n)$, and the embedding bit used in the embedding process is given by $B(m, n)=LUT_R(V_R(m, n)) \odot LUT_G(V_G(m, n)) \odot LUT_B(V_B(m, n)) \odot R_0(m, n)$. Hence, U(m, n) and B(m, n) are different from each other at a probability of ½. Therefore, a tampered position can be detected at the same probability as in other kinds of tampering.

In the fifth embodiment, processes 1102 and 1202 are not limited to processes using the lookup tables, but any other methods may be used as long as they can fixedly encrypt for respective pixels. For example, known cryptography such as DES cryptography or the like can be used for respective pixels using an identical key.

Furthermore, in embedding process 1104 of the this embodiment, the embedding method in the B component of an image has been explained. However, the present invention is not limited to such specific method. For example, a method of inverting bits of pixel values of respective color components of I(i, j) in turn from the LSB by trial and error until B(i, j)=S(i, j) is obtained is available.

[Sixth Embodiment]

The sixth embodiment will explain a method of encrypting a stamp image in accordance with a pixel position. The preconditions of this embodiment are the same as those in the fourth embodiment. Note that processes 1303 to 1305, and 1403 to 1406 in FIGS. 13 and 14 are repeated for respective pixels from i=0 and j=0 to i=M and j=N.

<Embedding Process (FIG. 13)>

Figure 13:
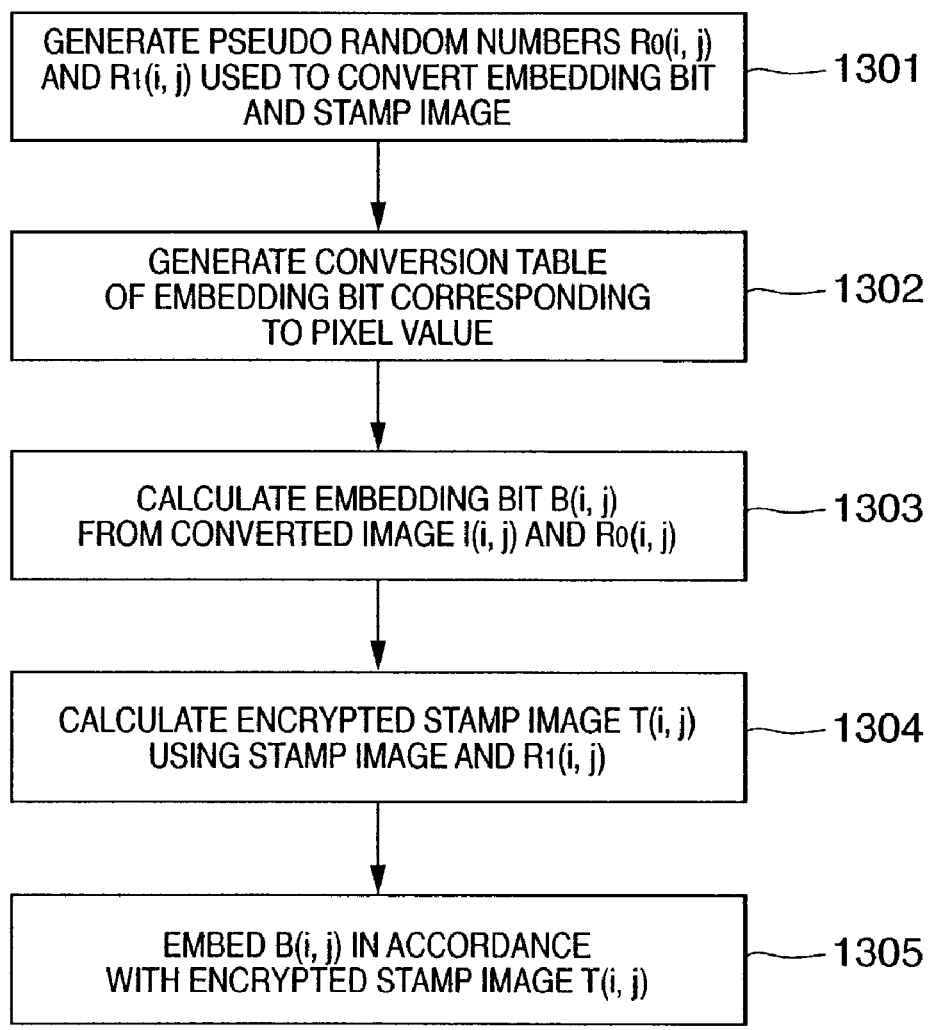
FIG. 13 is a schematic flow chart for explaining an outline of an image embedding process according to the sixth embodiment of the present invention.
Figure 14:
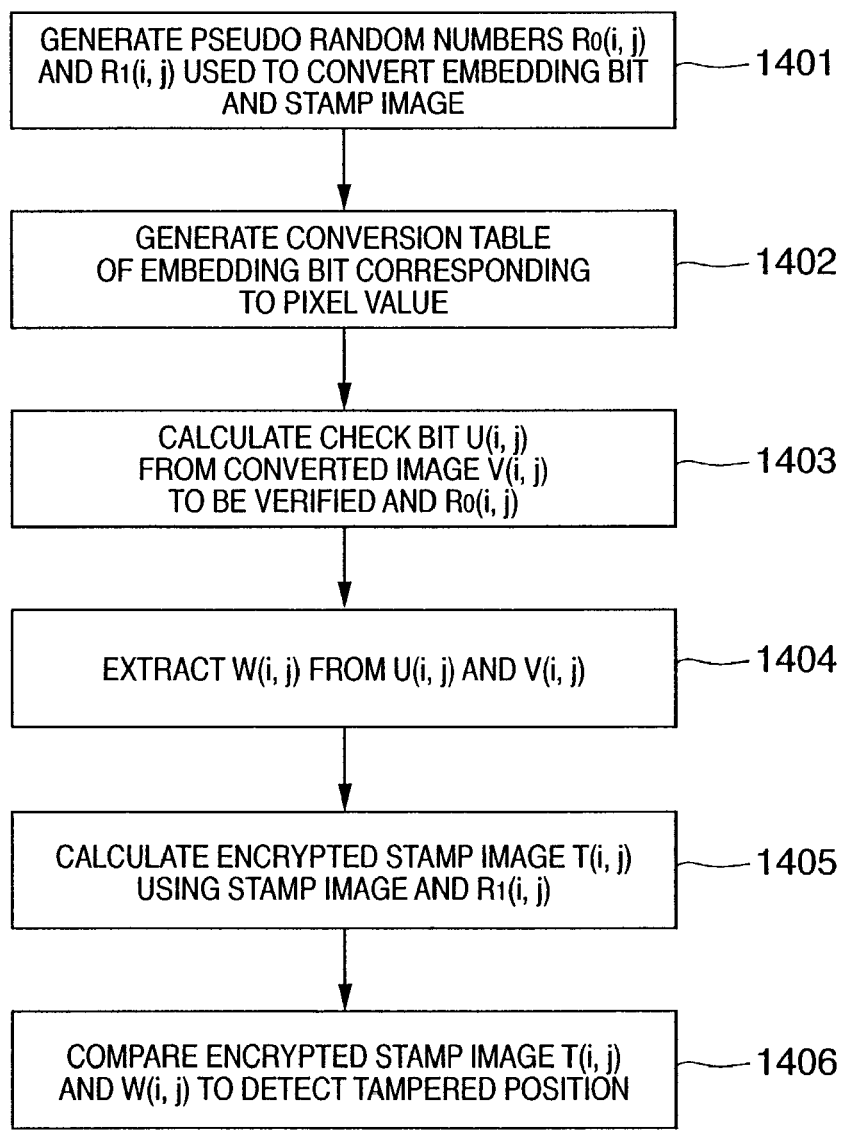
FIG. 14 is a schematic flow chart for explaining a process for extracting an embedded image and specifying a tampered position in the sixth embodiment.

FIG. 13 is a flow chart for explaining an image embedding process according to the sixth embodiment of the present invention.

In process 1301, pseudo random numbers are generated using keys $k_o$ and $k_1$ as initial values to generate M×N binary pseudo random number images $R_0(i, j)$ and $R_1(i, j)$.

In process 1302, pseudo random numbers are generated using a key k as an initial value to generate three 8-bit input/1-bit output lookup tables $LUT_R( )$, $LUT_G( )$, and $LUT_B( )$. These tables are generated by assigning the generated pseudo random numbers bit by bit in the order of addresses of each table.

In process 1303, each embedding bit $B(i, j)=LUT_R(I_R(i, j)) \odot LUT_G(I_G(i, j)) \odot LUT_B(I_B(i, j)) \odot R_0(i, j)$ is calculated.

In process 1304, an encrypted stamp image T(i, j) is calculated from a stamp image S(i, j) and the pseudo random number image $R_1(i, j)$ This image can be calculated by $T(i, j)=S(i, j) \odot R_1(i, j)$.

In process 1305, if the encrypted stamp image T(i, j)=0, the LSB ($LSB_B$) of each B component of the original image I(i, j) is set to be $LSB_B=B(i, j)$; if T(i, j)=1, $LSB_B=B(i, j) \odot 1$ is set.

FIGS. 29A to 29C show an outline of this process.

Referring to FIG. 29A, reference numeral 2901 denotes a pseudo random number generator for generating random numbers $R_0(i, j)$ 2902 using the key $k_0$ as an initial value; and numeral reference 2903 denotes a pseudo random number generator for generating random numbers $R_1(i, j)$ 2904 using the key $k_1$ as an initial value. Referring to FIG. 29B, reference numeral 2905 denotes lookup tables ($LUT_R( )$, $LUT_G( )$, $LUT_B( )$), each of which receives 8-bit data and outputs 1-bit data ($LUT_R(I_R(i, j))$, $LUT_G(I_G(i, j))$, $LUT_B(I_B(i, j))$) for each color component. FIG. 29C is a view for explaining a case wherein the check bit is embedded in the LSB of each B component of the original image I(i, j). If the EXOR of a pseudo random number $R_1(i, j)$ 2904 and stamp image S(i, j) corresponding to each pixel position is 0, the aforementioned embedding bit B(i, j) is inserted in the LSB of a B component of the original image I(i, j); if the EXOR of the pseudo random number $R_1(i, j)$ 2904 and stamp image S(i, j) is 1, the complement (inverted value) of the aforementioned embedding bit B(i, j) is inserted in the LSB of a B component of the original image I(i, j).

<Extraction Process (FIG. 14)>

FIG. 14 is a flow chart for explaining an embedded image extraction process according to the sixth embodiment of the present invention.

In process 1401, pseudo random numbers are generated using the keys $k_o$ and $k_1$ as initial values to generate M×N binary pseudo random number images $R_0(i, j)$ and $R_1(i, j)$.

In process 1402, pseudo random numbers are generated using the key k as an initial value to generate three 8-bit input/1-bit output lookup tables $LUT_R( )$, $LUT_G( )$, and $LUT_B( )$, in the same manner as in the embedding process.

In process 1403, each check bit $U(i, j)=LUT_R(V_R(i, j)) \odot LUT_G(V_G(i, j)) \odot LUT_B(V_B(i, j)) \odot R_0(i, j)$ is calculated.

In process 1404, if the check bit $U(i, j)=LSB_B$, W(i, j)=0 is set; if $U(i, j) \neq LSB_B$, W(i, j)=1 is set. Note that $LSB_B$ indicates the LSB of the B component of the image V(i, j) to be verified. In process 1405, an encrypted stamp image T(i, j) is calculated. This image can be calculated by $T(i, j)=S(i, j) \odot R_1(i, j)$.

In process 1406, W(i, j) is compared with the encrypted stamp image T(i, j). If W(i, j)=T(i, j), it is determined that the corresponding pixel data has not been tampered with; if W(i, j)≠T(i, j), it is determined that the corresponding pixel data has been tampered with, and the position (i, j) is determined as its tampered position.

In the sixth embodiment, pseudo random numbers are generated using $k_1$ as an initial value in processes 1301 and 1401, and the stamp image is encrypted in processes 1304 and 1405, compared to the fifth embodiment. Other processes are the same as those in the fifth embodiment, but the lookup tables can be open to the public since pseudo random numbers having the key $k_1$ as an initial value are generated. In the fifth embodiment, if the check bit U(i, j) is detected from the digitally watermarked image I(i, j) in processes 1204 and 1205, and the lookup tables are open to the public, $LUT_R(I'_R(i, j)) \odot LUT_G(I'_G(i, j)) \odot LUT_B(I'_B(i, j))$ can be analyzed from processes 1201 and 1202. Then, since pseudo random numbers R(i, j) using the key $k_0$ as an initial value are detected from the check bit U(i, j) and $LUT_R(V_R(i, j)) \odot LUT_G(V_G(i, j)) \odot LUT_B(V_B(i, j))$, the image can be forged. Hence, in the fifth embodiment, the lookup tables cannot be open to the public, but this problem is solved by encrypting the stamp image. Hence, various conversion methods independent from table lookup can be adopted.

The method according to the sixth embodiment is the same as the fifth embodiment if the encrypted stamp image is considered as a stamp image from the beginning. However, the encrypted stamp image must use an encryption system such as stream cipher based on the EXOR with the pseudo random number as in the sixth embodiment, which does not change the positional relationship of the stamp image, in place of an encryption method that changes the positional relationship of the stamp image.

[Seventh Embodiment]

Figure 15:
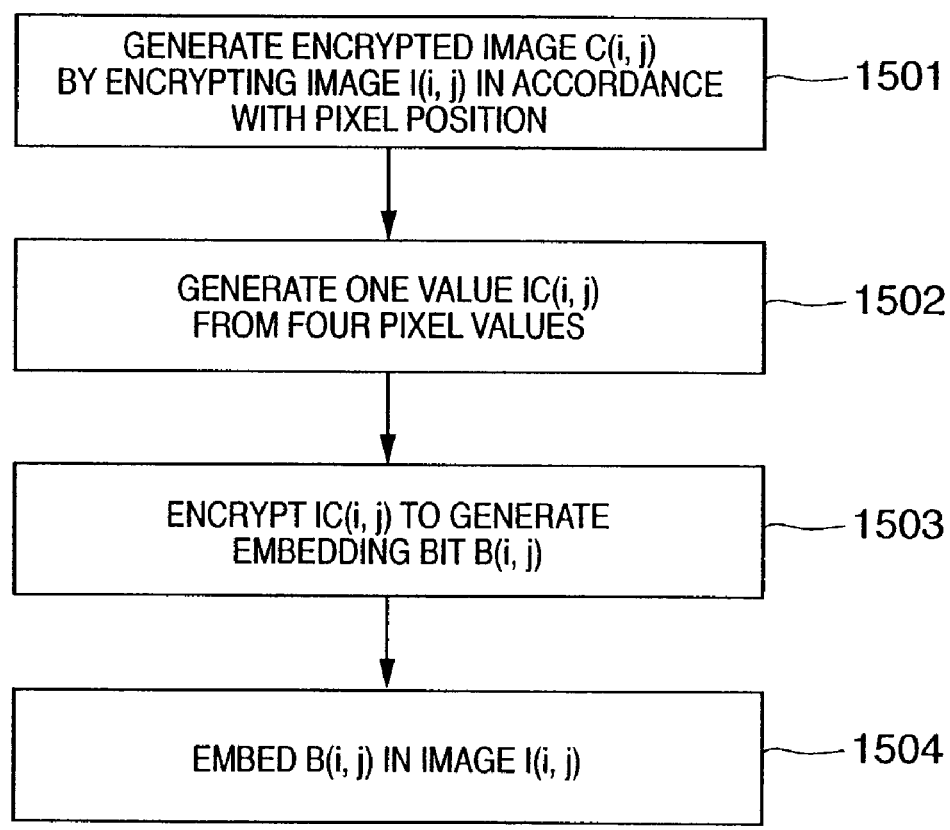
FIG. 15 is a schematic flow chart for explaining an outline of an image embedding process according to the seventh embodiment of the present invention.

FIG. 15 is a flow chart for explaining a digital watermark embedding process according to the seventh embodiment of the present invention.

In FIG. 15, assume that an original image I(i, j) is an M×N multi-valued image (in which one pixel is expressed by 8 bits), and $\odot$ indicates EXOR (exclusive OR). Note that processes 1503 and 1504 in FIG. 15 are repeated for respective pixels from i=0 and j=0 to i=M and j=N.

<Embedding Process (FIG. 15)>

In process 1501, an (M+1)×(N+1) pseudo random number image $R_0(i, j)$ is generated using a key $k_0$ as an initial value, and is exclusively ORed with bits except for the LSBs of the original image I(i, j) to encrypt pixel data of the original image I(i, j) in accordance with their pixel positions. Note that data of the original image I(i, j) corresponding to (M+1) and (N+1) are "0", and C(i, j) represents the encrypted image.

In process 1502, IC(i, j)=C(i, j)|C(i+1, j)|C(i, j+1)|C(i+1, j+1) is calculated on the basis of a pixel at a position (i, j) of the encrypted image C(i, j) and its surrounding pixels. A|B means that a bit sequence of B is successively set after that of A.

In process 1503, CC(i, j)=E_k(IC(i, j)) as encrypted data of IC(i, j) is calculated using a key k, and its LSB is determined to be an embedding bit B(i, j). Note that E_k( ) means an encryption function using k as a key.

In process 1504, the embedding bit B(i, j) is embedded in each LSB of the original image I(i, j), thus embedding a digital watermark.

A digitally watermarked image I'(i, j) obtained by the embedding process shown in FIG. 15 is an image obtained by changing the LSBs of the B components of the original image I(i, j) in process 1504. The reason why a digitally watermarked image is formed by changing only the LSBs of B components is to implement the embedding process, image quality deterioration of which is hardest to recognize, in consideration of the visual characteristics of a human being.

Figure 30A:
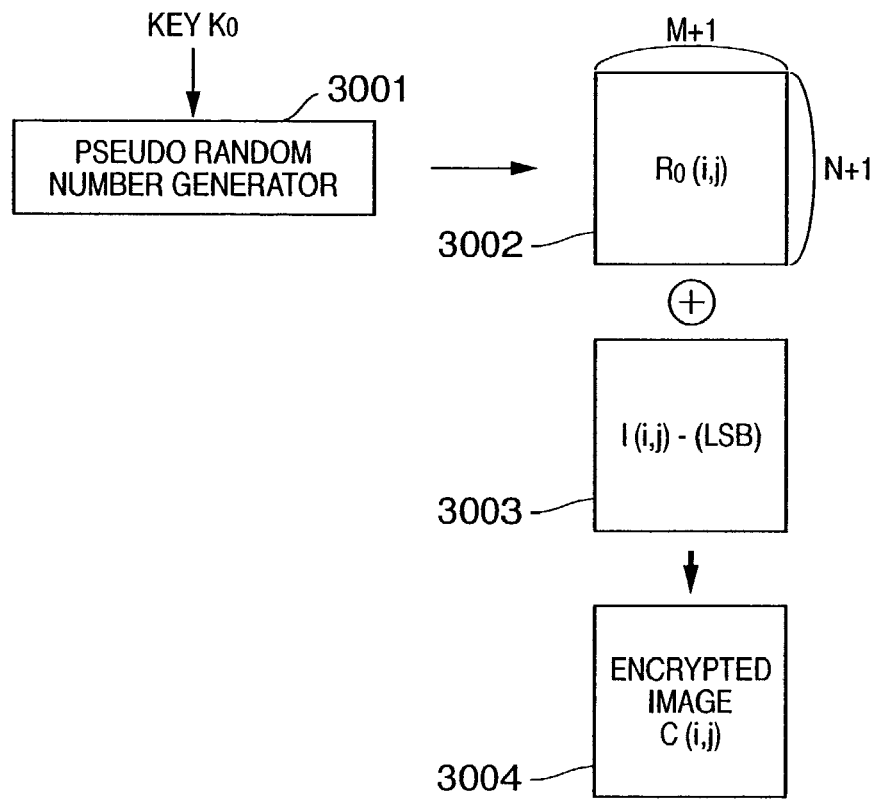
FIGS. 30A and 30B are schematic views for explaining the image embedding process according to the seventh embodiment of the present invention.
Figure 30B:
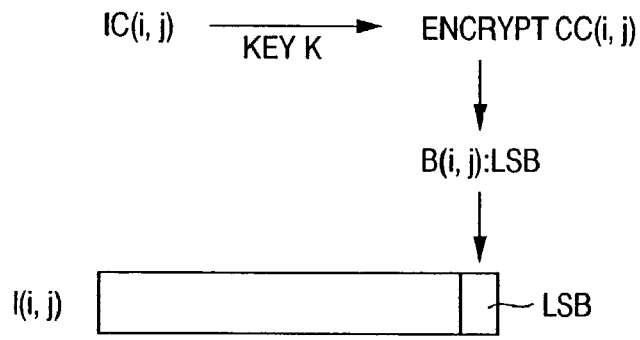

FIGS. 30A and 30B are views for explaining the image embedding process according to the seventh embodiment.

Referring to FIG. 30A, reference numeral 3001 denotes a pseudo random number generator for generating a pseudo random number $R_0(i, j)$ 3002 using the key $k_0$ as an initial value. This pseudo random number $R_0(i, j)$ 3002 is exclusively ORed with each pixel data of image data 3003 obtained by subtracting LSBs from respective pixel data of the original image I(i, j), and this result is used as encrypted image data C(i, j) 3004.

Referring to FIG. 30B, IC(i, j)=C(i, j)|C(i+1, j)|C(i, j+1)|C(i+1, j+1) is generated, and is encrypted using the key k to obtain CC(i, j). Each LSB of this CC(i, j) is represented by B(i, j), which is inserted in the LSB of each pixel data of the original image I(i, j).

An extraction method of extracting a watermark from the image embedded with the digital watermark will be explained below with reference to FIG. 16.

Figure 16:
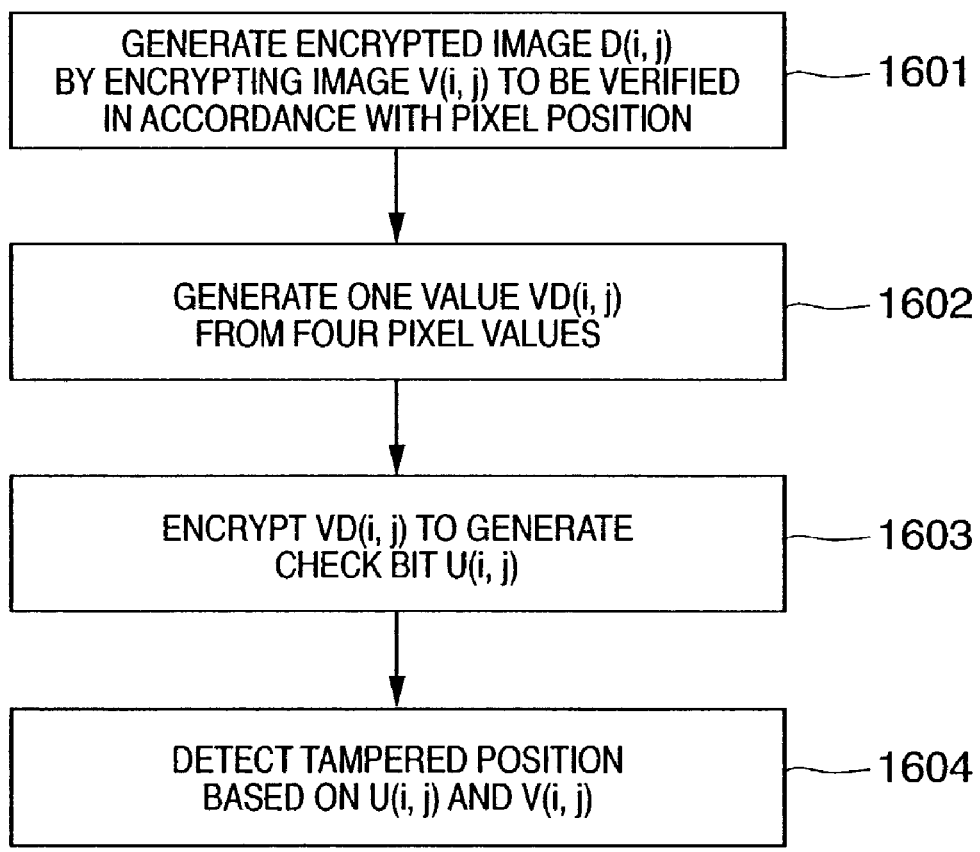
FIG. 16 is a schematic flow chart for explaining a process for extracting an embedded image and specifying a tampered position in the seventh embodiment.

FIG. 16 is a flow chart for explaining the digital watermark extraction process according to the seventh embodiment.

Assume that V(i, j) represents an image to be verified. Also, assume that a verifier possesses the keys $k_0$ and k used in the embedding process. Note that processes 1603 and 1604 in FIG. 16 are repeated for respective pixels from i=0 and j=0 to i=M and j=N.

<Extraction Process (FIG. 16)>

In process 1601, an (M+1)×(N+1) pseudo random number image $R_0(i, j)$ is generated using the key $k_0$ as an initial value, and is exclusively ORed with bits except for the LSBs of the image V(i, j) to be verified to encrypt pixel data of the image V(i, j) to be verified in accordance with their pixel positions. Note that data of the image V(i, j) to be verified corresponding to (M+1) and (N+1) are "0", and D(i, j) represents the encrypted image.

In process 1602, VD(i, j)=D(i, j)|D(i+1, j)|D(i, j+1)|D(i+1, j+1) is calculated on the basis of a pixel at a position (i, j) of the encrypted image D(i, j) and its surrounding pixels. A|B means that a bit sequence of B is successively set after that of A.

In process 1603, DD(i, j)=E_k(VD(i, j)) as encrypted data of VD(i, j) is calculated using the key k, and its LSB is determined to be a check bit U(i, j). Note that E_k( ) means an encryption function using k as a key.

In process 1604, if the check bit U(i, j)=$LSB_V$, it is determined that the corresponding pixel data has not been tampered with; if the check bit U(i, j)≠$LSB_V$, it is determined that the corresponding pixel data has been tampered with, and (i, j) is detected as its tampered position. Note that $LSB_V$ is the LSB of the image V(i, j) to be verified.

In the seventh embodiment, a tampered position is detected by generating a stream-encrypted image by exclusively ORing the original image I(i, j) or image V(i, j) to be verified, and pseudo random numbers generated using the key $k_0$ as an initial value. Hence, when the image V(i, j) to be verified has not been tampered with, this can be proved since the encrypted images C(i, j) and D(i, j) generated in the embedding and extraction processes are equal to each other. If the pixel value at a position (m, n) of the image V(i, j) to be verified has been tampered with, encrypted images D(m, n) and C(m, n) in the extraction and embedding processes are different from each other, and the probability that a check bit U(m, n) generated from the image D(m, n) is different from an embedding bit B(m, n) generated from the encrypted image C(m, n) is ½. Hence, the tampered position can be detected as in the conventional method.

A case will be examined below wherein the extraction algorithm is known to an attacker, as a problem in the conventional method. In the method according to this embodiment, even when the extraction algorithm (including embedded positions) except for the keys $k_0$ and k is open to the public, since a pattern itself to be embedded is generated based on pseudo random numbers which depend on the pixel positions, the pattern to be embedded in the tampered image cannot be generated unless the attacker knows the keys $k_0$ and k.

Assume that $V_1(i, j)$ and $V_2(i, j)$ respectively represent digitally watermarked images of images $I_1(i, j)$ and $I_2(i, j)$, and $D_1(i, j)$ and $D_2(i, j)$ respectively represent encrypted images of the images $I_1(i, j)$ and $I_2(i, j)$. A case will be examined below wherein the attacker has replaced a pixel at a position (m, n) of $V_1(i, j)$ by a pixel of the image $V_2(i, j)$ at the same position, as a conventional problem. In this case, VD(m, n) at the position (m, n) is given by $D_2(m, n)|D_1(m+1, n)|D_1(m, n+1)|D_1(m+1, n+1)$, and is different from IC(m, n)=$C_1(m, n)|C_1(m+1, n)|C_1(m, n+1)|C_1(m+1, n+1)$ at the embedded position. Hence, the probability that the LSB of DD(m, n) generated from VD(m, n) is different from CC(m, n) generated from IC(m, n) is ½, and its tampered position can be detected.

Note that the seventh embodiment has been explained using the encryption method that generates pseudo random numbers in processes 1501 and 1601 in FIGS. 15 and 16, and exclusively ORs the original image and the pseudo random numbers. However, the present invention is not limited to such specific method, and any other methods may be used as long as each pixel can be independently encrypted. For example, each pixel may undergo known encryption such as DES cryptography or the like using the generated pseudo random number as a key.

In the seventh embodiment, in processes 1502 and 1503, and 1602 and 1603 in FIGS. 15 and 16, four pixels are joined and are encrypted using k as a key, and its LSB is used as an embedding bit. However, the present invention includes all modifications to 1 bit (or several bits) influenced by four pixels, and is not limited to a specific series of four pixels, encryption method, and LSB. For example, the above process may also be implemented by preparing an 8-bit input/1-bit output lookup table for pixel conversion in advance based on pseudo random numbers or the like generated using the key k as an initial value, and calculating the EXOR of a value converted using that table for each pixel. Also, the encryption algorithm is not limited to the lookup table or known DES or AES, and need not be kept secret as long as it has unidirectionality and collision proof that disturbs intentional output control like in the aforementioned Hash function.

Furthermore, in embedding process 1504 of the seventh embodiment, the embedding method in the LSB of an image has been explained. However, the present invention is not limited to such specific method. Also, even when the image I(i, j) is a color image formed by R, G, and B components, the present invention can be applied, and the image may be decomposed into R, G, and B components to execute processes for each component, as described above.

The aforementioned image embedding process and extraction process can be implemented using the image processing apparatus shown in FIG. 3.

As described above, according to the seventh embodiment, the image embedding and extraction methods which are secure even when the extraction algorithm and embedding algorithm except for a key are known to an attacker, as long as pseudo random numbers generated using the key as an initial value are secure can be implemented. Hence, this method is secure even when all algorithms except for the key are open to the public, as long as the pseudo random number generation method using the key as an initial value is secure. Since this method does not require any stamp image and the key need only be securely held, a large memory size is not required. Furthermore, since each embedding bit is generated to be influenced by four pixels, replacement among different images using an identical key can be detected.

[Eighth Embodiment]

In the seventh embodiment, image data of an original image is directly encrypted in accordance with pixel positions. Alternatively, the eighth embodiment will explain a method of encrypting a bit to be embedded in accordance with the pixel position without directly encrypting an original image. Other preconditions are the same as those in the seventh embodiment described above. Note that processes 1703 and 1704, and 1803 and 1804 in FIGS. 17 and 18 are repeated for respective pixels from i=0 and j=0 to i=M and j=N.

<Embedding Process (FIG. 17)>

Figure 17:
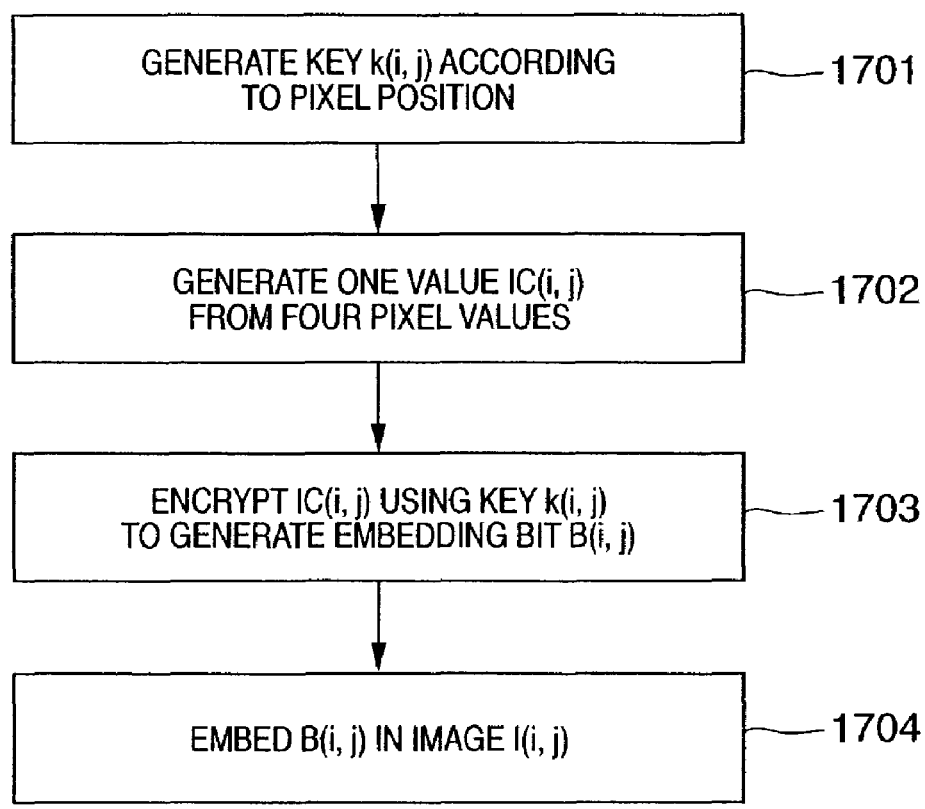
FIG. 17 is a schematic flow chart for explaining an outline of an image embedding process according to the eighth embodiment of the present invention.
Figure 18:
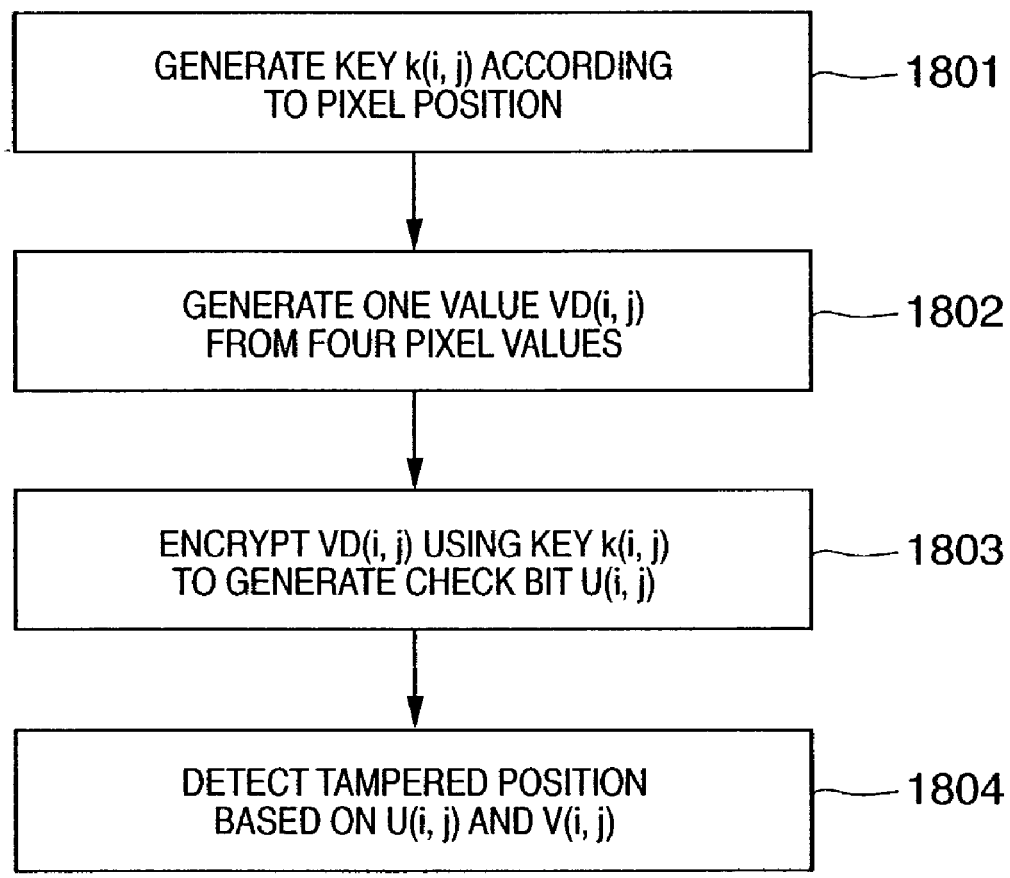
FIG. 18 is a schematic flow chart for explaining a process for extracting an embedded image and specifying a tampered position in the eighth embodiment.

FIG. 17 is a flow chart for explaining an image embedding process according to the eighth embodiment of the present invention.

In process 1701, pseudo random numbers are generated using a key $k_0$ as an initial value, and are segmented by an appropriate size to generate M×N keys k(i, j).

In process 1702, IC(i, j)=I(i, j)|I(i+1, j)|I(i, j+1)|I(i+1, j+1) is calculated on the basis of a pixel at a position (i, j) of the original image I(i, j) and its surrounding pixels. A|B means that a bit sequence of B is successively set after that of A.

In process 1703, CC(i, j)=E_k(IC(i, j)){IC(i, j)} as encrypted data of IC(i, j) is calculated using the key k(i, j), and its LSB is determined to be an embedding bit B(i, j). Note that E_k( ) means an encryption function using k as a key.

In process 1704, the embedding bit B(i, j) is embedded in each LSB of the original image I(i, j), thus embedding a digital watermark.

<Extraction Process (FIG. 18)>

FIG. 18 is a flow chart for explaining an image extraction process according to the eighth embodiment of the present invention.

In process 1801, pseudo random numbers are generated using a key $k_0$ as an initial value, and are segmented by an appropriate size to generate M×N keys k(i, j).

In process 1802, VD(i, j)=V(i, j)|V(i+1, j)|V(i, j+1)|V(i+1, j+1) is calculated on the basis of a pixel at a position (i, j) of the image V(i, j) to be verified and its surrounding pixels. A|B means that a bit sequence of B is successively set after that of A.

In process 1803, DD(i, j) E_k(i, j){IC(i, j)} as encrypted data of VD(i, j) is calculated using the key k(i, j), and its LSB is determined to be a check bit U(i, j). Note that E_k( ) means an encryption function using k as a key.

In process 1804, if the check bit U(i, j)=$LSB_V$, it is determined that the corresponding pixel data has not been tampered with; if the check bit U(i, j)≠$LSB_V$, it is determined that the corresponding pixel data has been tampered with, and (i, j) is detected as its tampered position. Note that $LSB_V$ is the LSB of the image V(i, j) to be verified.

The seventh embodiment is simpler than the sixth embodiment, since the number of pseudo random numbers to be generated in processes 1701 and 1801 is smaller than that in the sixth embodiment, and the need for the process for encrypting an image can be obviated. However, the problem of the conventional method is solved by making arithmetic operations of IC(i, j) and VD(i, j) in processes 1703 and 1803 in place of encrypting the original image I(i, j) or image V(i, j) to be verified. That is, the present invention includes all methods that can encrypt a digital watermark pattern to be embedded in accordance with the pixel positions without directly encrypting an image in accordance with pixel positions.

Hence, when the image V(i, j) to be verified has not been tampered with, this can be proved since the encrypted images CC(i, j) and DD(i, j) generated in the embedding and extraction processes are equal to each other. If the pixel value at a position (m, n) of the image V(i, j) to be verified has been tampered with, since elements of CC(m, n) and DD(m, n) are different from each other, the tampered position is detected at a probability of ½ as in the conventional method.

A case will be examined below wherein the extraction algorithm and stamp image are known to an attacker as a problem in the conventional method. Assume that the stamp image is a pattern of all "0"s for the sake of simplicity. In the method according to this embodiment, even when the extraction algorithm (including embedded positions) except for the keys ko and k, and stamp image are open to the public, since the pattern itself to be embedded is generated based on pseudo random numbers which depend on the pixel positions, the pattern to be embedded in the tampered image cannot be generated unless the attacker knows the keys $k_0$ and k.

Assume that $V_1(i, j)$ and $V_2(i, j)$ respectively represent digitally watermarked images of original images $I_1(i, j)$ and $I_2(i, j)$, and $C_1(i, j)$ and $C_2(i, j)$ respectively represent encrypted images of the original images $I_1(i, j)$ and $I_2(i, j)$. A case will be examined below wherein the attacker has replaced a pixel at a position (m, n) of the digitally watermarked image $V_1(i, j)$ by a pixel of the digitally watermarked image $V_2(i, j)$ at the same position, as a conventional problem. In this case, VD(m, n) at the position (m, n) is given by $V_2(m, n)|V_1(m+1, n)|V_1(m, n+1)|V_1(m+1, n+1)$, and is different from IC(m, n)=$I_1(m, n)|I_1(m+1, n)|I_1(m, n+1)|I_1(m+1, n+1)$ in the embedding process. Hence, the probability that the LSB of DD(m, n) generated from VD(m, n) is different from CC(m, n) generated from IC(m, n) is ½, and its tampered position can be detected.

In the eighth embodiment, the processes in processes 1702 and 1802 are not particularly limited as long as they can encrypt according to the pixel positions. For example, cryptography such as DES cryptography using an identical key may be used for respective pixels.

Furthermore, in embedding process 1704 of the eighth embodiment, the embedding method in the B component of an original image has been explained. However, the present invention is not limited to such specific method. For example, a method of inverting bits of pixel values of respective color components of I(i, j) in turn from the LSB by trial and error until B(i, j)=S(i, j) is obtained is available.

Also, the pixel value at a position corresponding to (M+1, N+1) is set to be "0" for the sake of simplicity, but may be a value generated from a pseudo random number using $k_0$ as an initial value.

[Ninth Embodiment]

In the above embodiments, highly secure tampered position detection methods have been explained taking an image as an example. However, the present invention is not limited to an image, and includes all methods that encrypt digital data, and append corresponding check information used to detect a tampered position.

For example, a case will be examined below wherein a contents is expressed by a plurality of data blocks, as shown in FIG. 6 above. In case of normal tampering detection, a check bit for each data block can be appended using an error detection code or the like. At this time, if an error detection code used is special and secret, no problem is posed since an attacker can manipulate a data block but cannot generate a corresponding check bit. However, if the error correction code used is open to the public, tampering of a data block cannot be found since the attacker can generate a check bit according to the tampered data. Even when the error correction code used is special and secret, replacement or the like of data blocks including check bits cannot be detected since error detection is made for each data block. Hence, the same problem as that for an image discussed in the above embodiments occurs. Therefore, this problem can be solved by the following method which encrypts according to the order of data blocks, and generates check bits for the encrypted blocks.

However, when a plurality of contents are present, and simultaneously undergo encryption using an identical key, if data blocks which form different contents are replaced each other, such tampering cannot be detected. Hence, such problem is solved by the following method that encrypts neighboring data blocks in association with each other, and generate check bits for the encrypted blocks.

FIG. 19 is a flow chart for explaining a process for appending check bits to data blocks according to the ninth embodiment of the present invention.

<Sending Side (FIG. 19)>

In process 1901, pseudo random numbers are generated using a key $k_0$ as an initial value, and are exclusively ORed with respective data blocks D(i) (i indicates the order) which form a contents, thereby generating encrypted blocks C(i) according to the order of data blocks. For last data D(M), D(M+1)=0 is set and C(M+1) represents a data block containing pseudo random numbers alone.

In process 1902, check bits P(i) corresponding to the encrypted data blocks C(i)|C(i+1) are generated using a known error correction code, and are appended to the data blocks D(i).

Figure 20:
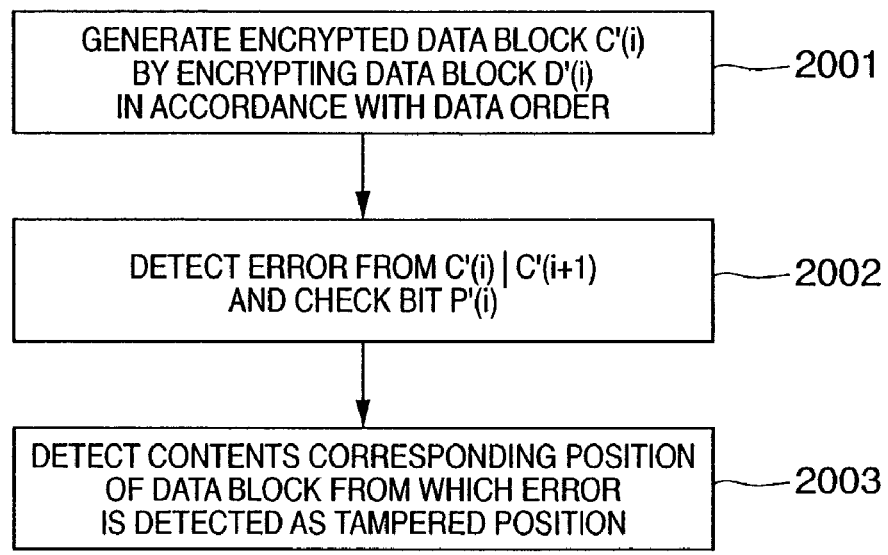
FIG. 20 is a schematic flow chart for explaining a process for extracting a check bit and specifying a tampered position in the ninth embodiment.

FIG. 20 is a flow chart for explaining a process for receiving the data blocks appended with the check bits and detecting tampering of each data block according to the ninth embodiment of the present invention.

<Receiving Side (FIG. 20)>

In process 2001, pseudo random numbers are generated using the key $k_0$ as an initial value, and are exclusively ORed with respective data blocks D'(i) (i indicates the order), thereby generating encrypted data blocks C'(i) according to the order of the received data blocks D'(i). For last data D'(M), D'(M+1)=0 is set and C'(M+1) represents a data block containing pseudo random numbers alone.

In process 2002, errors are detected from the encrypted data blocks C'(i)|C'(i+1) and received check bits P'(i) using the known error detection code used on the sending side. In process 2003, if any error is detected, the position of the contents corresponding to that data block is detected as a tampered position.

As an application example of a single contents formed by a plurality of data blocks, MIDI, SMF, and the like are available, as described above.

Also, the present invention can be applied to a contents consisting of a plurality of data blocks as in JPEG and MPEG.

In the ninth embodiment, the check bits are appended using an error correction code. However, since such check bits can be appended using the aforementioned Hash function or the like, the present invention is not limited to such specific check bits. Furthermore, in this embodiment, the check bits are appended to data blocks. Alternatively, check bits may be embedded in data blocks using known digital watermarking that can be applied to the contents.

[10th Embodiment]

Assume that an original image I(i, j) is an M×N multi-valued image (in which one pixel is expressed by 8 bits). Also, ⊙ indicates EXOR (exclusive OR) as in the above embodiment. Note that processes 2102 to 2104 in FIG. 21 are repeated for respective pixels from i=0 and j=0 to i=M and j=N.

<Embedding Process (FIG. 21)>

Figure 21:
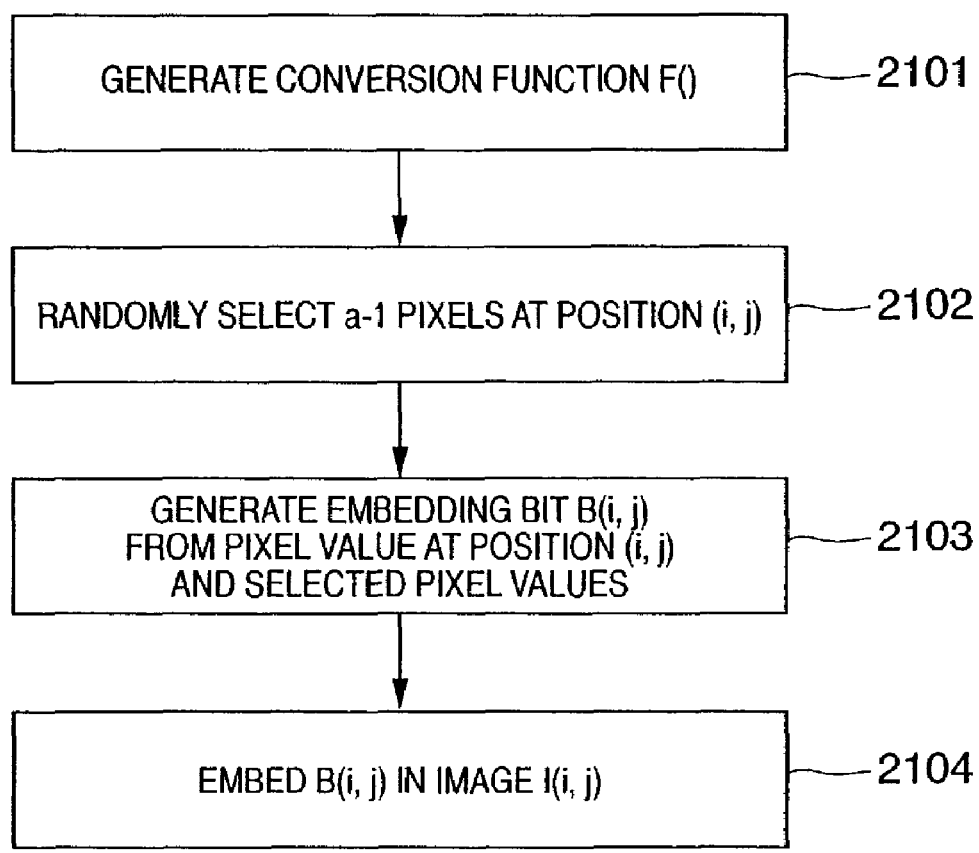
FIG. 21 is a schematic flow chart for explaining an outline of an image embedding process according to the 10th embodiment of the present invention.

FIG. 21 is a flow chart for explaining an image embedding process according to the 10th embodiment of the present invention.

In process 2101 in FIG. 21, an 8-bit input/1-bit output conversion function F( ) is generated. In process 2102, a pixel value except for the LSB of a pixel at a position (i, j) of the original image I(i, j) is expressed by $I_0(i, j)$, and (a−1) pixels other than that position are randomly selected. $I_1(i, j)$, $I_2(i, j)$, . . . , $I_{a-1}(I, j)$ represent pixels selected in this way.

In process 2103, each embedding bit B(i, j)=$F(I_0(i, j)) \odot F(I_1(i, j)) \odot \ldots \odot F(I_{a-1}(i, j))$ is calculated. In process 2104, the LSB of the pixel at the position (i, j) is replaced by B(i, j).

A digitally watermarked image I'(i, j) obtained by this embedding process is an image obtained by embedding the embedding bits B(i, j) in the LSBs of the original image I(i, j) in process 2104. The reason why a digitally watermarked image is formed by changing only the LSBs is to implement embedding that suffers least image quality deterioration, in consideration of the visual characteristics of a human being.

A method of extracting the image embedded in this manner will be explained below. Assume that V(i, j) represents an image to be verified. Also, assume that a verifier possesses (a−1) pixel positions selected at each position of the embedding process or their selection method. Note that processes 2202 to 2204 are repeated for respective pixels from i=0 and j=0 to i=M and j=N.

Figure 22:
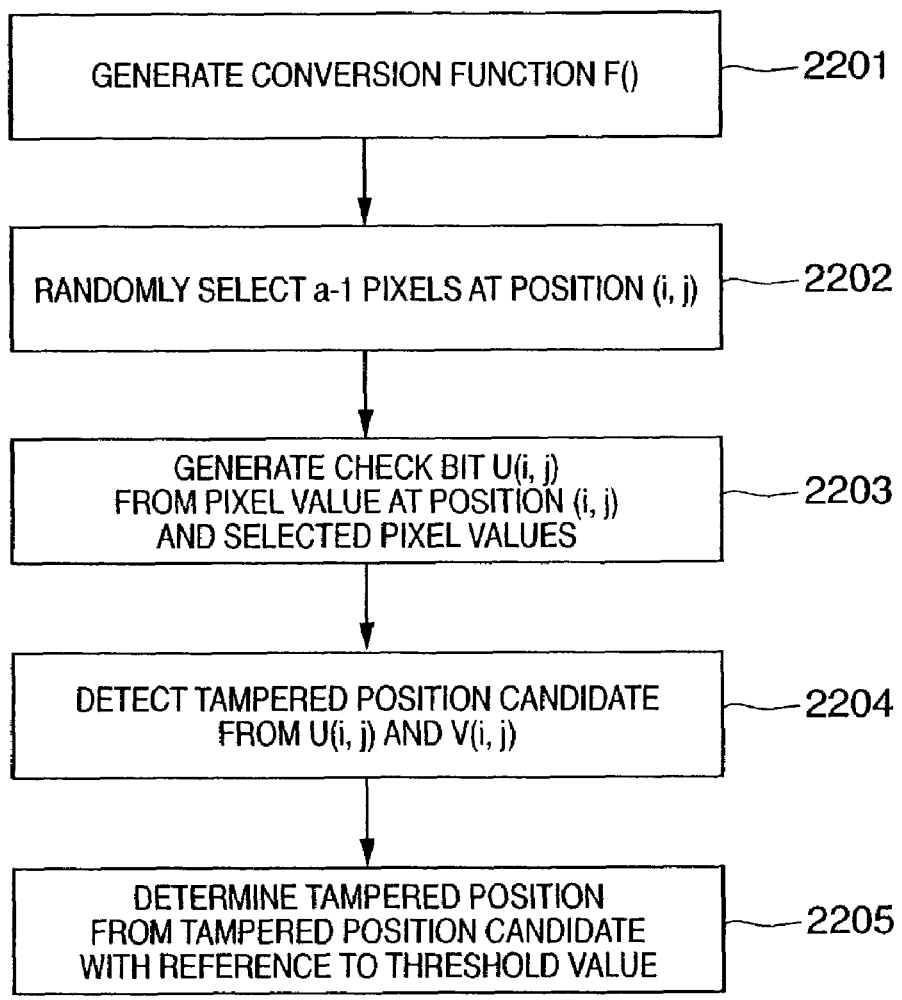
FIG. 22 is a schematic flow chart for explaining a process for extracting an embedded image and specifying a tampered position in the 10th embodiment.

FIG. 22 is a flow chart for explaining a process for extracting an image from the embedded image according to the tenth embodiment.

<Extraction Process (FIG. 22)>

In process 2201, an 8-bit input/1-bit output conversion function F( ) is generated as in the embedding side. In process 2202, a pixel value except for the LSB of a pixel at a position (i, j) of the image V(i, j) to be verified is expressed by $V_0(i, j)$, and (a−1) pixels other than that position are randomly selected. $V_1(i, j), V_2(i, j), \ldots, V_{a-1}(i, j)$ represent pixels selected in this way.

In process 2203, each check bit $U(i, j)=F(V_0(i, j)) \oplus F(V_1(i, j)) \oplus \ldots \oplus F(V_{a-1}(i, j))$ is calculated.

In process 2204, the LSB of the pixel at the position (i, j) of the image V(i, j) to be verified is compared with the check bit U(i, j). If they are equal to each other, it is determined that the corresponding pixel data has not been tampered with; otherwise, a mark x is assigned to pixels at respective positions.

In process 2205, if processes 2202 to 2204 are repeated for all pixels, and the number of marks x at each position is a/2, that position is detected as a tampered position.

In the 10th embodiment, when the image V(i, j) to be verified has not been tampered with, this can be proved since the embedding bit B(i, j) and check bit U(i, j) generated in the embedding and extraction processes are equal to each other.

A case will be examined below wherein only the pixel value at a position (m, n) of the image V(i, j) to be verified has been tampered with. Since *a* pixels including the pixel of interest are selected at each position, pixels at respective positions are selected *a* times on the average. In the extraction process including the position (m, n), the probability that *a* pixels are assigned marks x is ½. However, since the pixel at the position (m, n) is assigned a mark x every time it is selected, the probability that the pixel at the position (m, n) is not assigned marks x equals to or is larger than a/2, i.e., that pixel is free from tampering, is (2−a/2). The remaining (a−1) pixels are assigned marks x only when the position (m, n) is included. However, if pixels are randomly selected in processes 2102 and 2202 above, and M×N as the total number of pixels is sufficiently larger than a, the probability that marks x more than a/2 are assigned is apparently very low.

A case will be examined below wherein the extraction algorithm is known to an attacker. In the method of this embodiment, even when the extraction algorithm (including embedded positions) except for randomly selected pixel positions or their selection methods is open to the public, a pattern to be embedded in the tampered image cannot be generated unless the attacker knows random pixel positions which form the pattern to be embedded.

In the 10th embodiment, the 8-bit input/1-bit output conversion function F( ) is generated in processes 2101 and 2201. Such function can be easily implemented by an 8-bit input/1-bit output lookup table or the like, in which pseudo random numbers generated by a pseudo random number generator using a key $k_0$ as an initial value are set in correspondence with output values bit by bit. The present invention is not limited to the 8-bit input/1-bit output conversion function. For example, an arbitrary multi-bit input/multi-bit output function may be prepared, and the LSB of the output of that function may be selected or the EXOR may be calculated.

In processes 2103 and 2203, the EXOR of the conversion function outputs is calculated. However, the present invention is not limited to this, and a 1-bit or several-bit output conversion function may be used. Furthermore, the conversion function in processes 2101 and 2201 above outputs 1-bit data. However, the present invention is not limited to this, and 1 bit or several bits need only be obtained upon calculations in processes 2103 and 2203.

When the image I(i, j) or V(i, j) is a color image, the image is decomposed into R, G, and B color components, each of which can undergo processes 2102 to 2104, and 2202 to 2205. Alternatively, all converted color components may be used in processes 2103 and 2203 to combine sequences for respective color components into one. Also, color component compatible conversion means such as 24-bit input/1-bit output conversion means may be used in processes 2101 and 2201 to combine sequences for respective color components into one.

Furthermore, as a random pixel position selection method in processes 2102 and 2202, pseudo random numbers may be generated using a key ks as an initial value, and if the values M and N are "512", the pseudo random numbers may be segmented every 9 bits in correspondence with pixel positions (m, n). Alternatively, since this pixel position determination method is secret, specific pixel positions may be determined in advance for each position.

In embedding process 2104 of the 10th embodiment, the embedding method in the LSBs of an image has been explained. However, the present invention is not limited to such specific image. Also, even when the image I(i, j) is a color image formed by R, G, and B components, the present invention can be applied. In such case, the image may be decomposed into R, G, and B components, and the present invention may be applied for respective decomposed color components, or the decomposed pixel values may be combined in processes 2102 and 2202, thus embedding the bit generated in process 2104 in arbitrary one of color components.

Finally, tampering is detected in process 2205 when the number of marks x is equal to or larger than a/2, but an arbitrary threshold value can be used. This threshold value can be changed in accordance with the required precision of tampering position detection.

Note that the image embedding process and extraction process according to the 10th embodiment can be implemented using the image processing apparatus shown in FIG. 3.

As described above, a method which is secure even when the extraction algorithm and embedding algorithm except for selected pixel positions are known to an attacker can be implemented. If pixels are selected using a key, this method is secure even when all algorithms except for that key are open to the public. This method does not require any stamp image, and the key need only be securely held.

[11th Embodiment]

The 10th embodiment has explained a method which combines a pixels to generate digital watermark information, which is used to detect tampering, and detects a tampered position using that information. However, since the method described in the 10th embodiment checks tampering of one pixel from a plurality of pixels, tampering detection precision is poor. For example, even when *a* is about 2, if half the image has been tampered with, such tampering is detected as that of the entire image. When *a* increases, the precision worsens. Hence, in the 11th embodiment, a method which is combined with a method that can assure high precision but cannot apply an identical key to a plurality image so as to complement each other's drawbacks will be explained.

Figure 23:
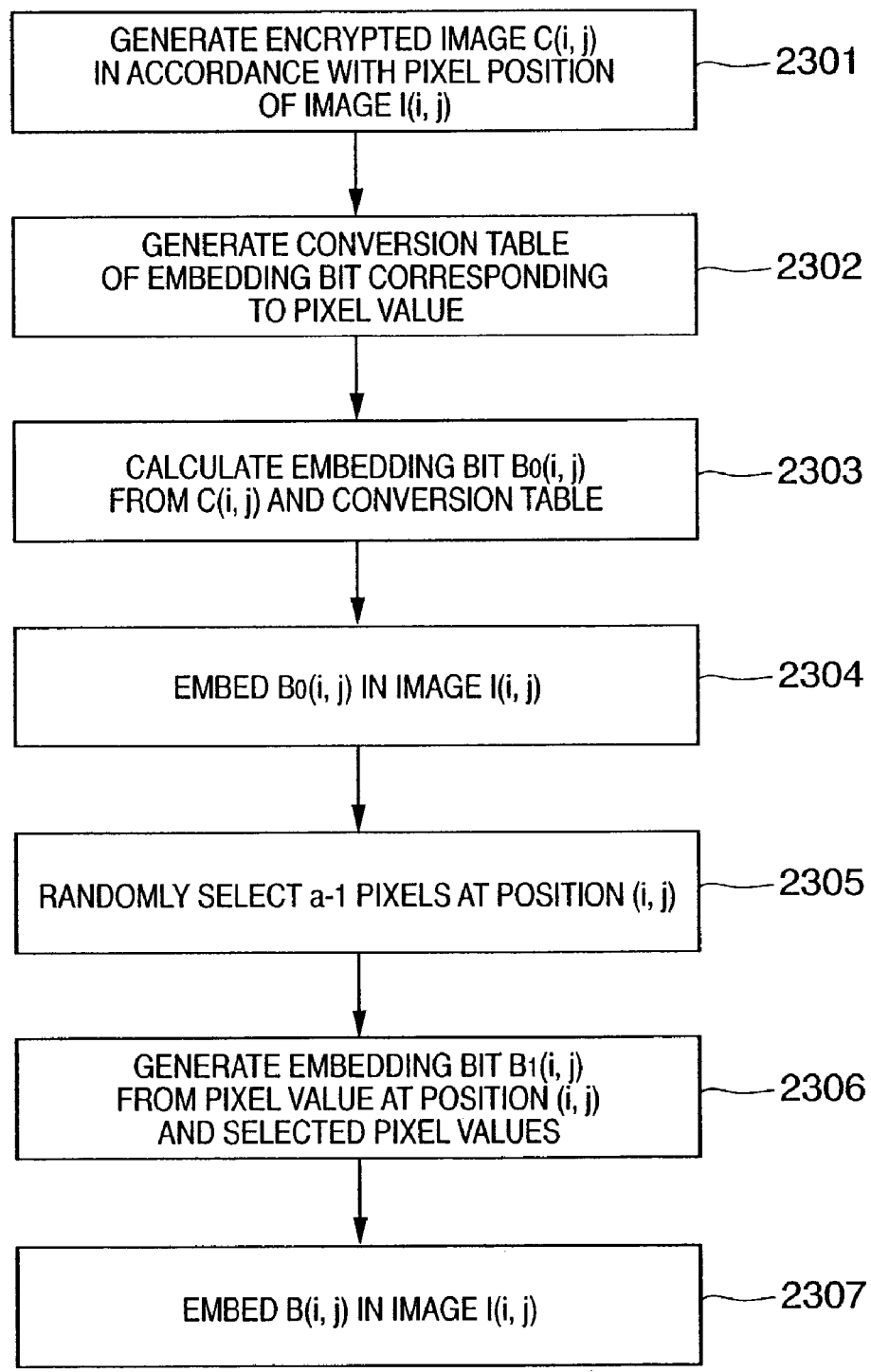
FIG. 23 is a schematic flow chart for explaining an outline of an image embedding process according to the 11th embodiment of the present invention.

FIG. 23 is a flow chart for explaining an image embedding process according to the 11th embodiment of the present invention.

<Embedding Process (FIG. 23)>

In process 2301, an original image I(i, j) is encrypted in accordance with the pixel positions by generating pseudo random numbers using a key $k_o$ as an initial value, and exclusively ORing respective bits except for lower 2 bits of each pixel of the original image I(i, j) and each pseudo random number. C(i, j) represents the image encrypted in this way.

In process 2302, pseudo random numbers are generated using a key k as an initial value to generate three 8-bit input/1-bit output lookup tables LUT( ). These tables are generated by assigning the generated pseudo random numbers bit by bit in the order of addresses of each table.

In process 2303, each embedding bit $B_0(i, j)$=LUT(C(i, j)) is calculated. In process 2304, the embedding bit $B_0(i, j)$ is embedded in the LSB of each B component of the original image I(i, j). In process 2305, a pixel value except for lower 2 bits of the original image I(i, j) is expressed by $I_0(i, j)$, and (a−1) pixels other than that position are randomly selected using pseudo random numbers generated using a key $k_1$ as an initial value. $I_1(i, j)$, $I_2(i, j)$, ..., $I_{a-1}(i, j)$ represent pixels selected in this way.

In process 2306, each embedding bit $B_1(i, j)$=LUT($I_0(i, j)$)⊙LUT($I_1(i, j)$)⊙ ... ⊙LUT($I_{a-1}(i, j)$) is calculated. In process 2307, that embedding bit $B_1(i, j)$ is embedded in the second LSB of the original image I(i, j).

An extraction method will be described below. Assume that V(i, j) represents an image to be verified, and a verifier possesses the keys $k_0$, k, and $k_1$ used in the embedding process. Note that processes 2403 to 2408 are repeated for respective pixels from i=0 and j=0 to i=M and j=N.

Figure 24:
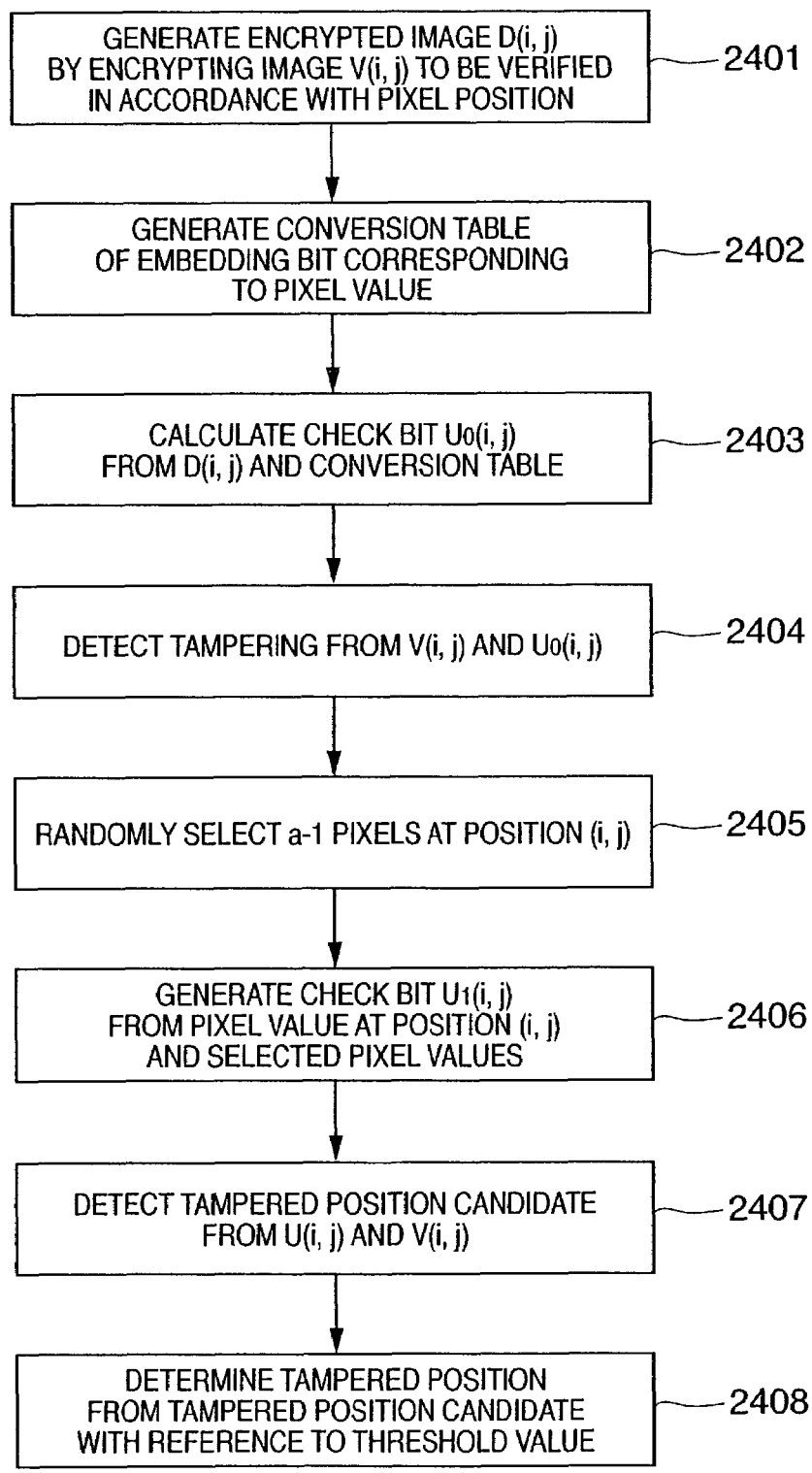
FIG. 24 is a schematic flow chart for explaining a process for extracting an embedded image and specifying a tampered position in the 11th embodiment.

FIG. 24 is a flow chart for explaining an image extraction process according to the 11th embodiment.

<Extraction Process (FIG. 24)>

In process 2401, the image V(i, j) to be verified is encrypted in accordance with the pixel positions by generating pseudo random numbers using the key $k_o$ as an initial value, and exclusively ORing respective bits except for lower 2 bits of each pixel of the image V(i, j) to be verified and each pseudo random number. D(i, j) represents the image encrypted in this way.

In process 2402, pseudo random numbers are generated using the key k as an initial value to generate three 8-bit input/1-bit output lookup tables LUT( ) as in the embedding process. In process 2403, each check bit $U_0(i, j)$=LUT(D(i, j)) is calculated.

In process 2404, if the check bit $U_0(i, j)$=$LSB_{BV}$, it is determined that the corresponding pixel data has not been tampered with; if the check bit U(i, j)≠$LSB_{BV}$, it is determined that the corresponding pixel data has been tampered with, and its position (i, j) is detected as a tampered position. Note that $LSB_{BV}$ is the LSB of the B (blue) component of the image V(i, j) to be verified.

In process 2405, a pixel value except for lower 2 bits of the image V(i, j) to be verified is expressed by $V_0(i, j)$, and (a−1) pixels other than that position are randomly selected using pseudo random numbers generated using a key $k_1$ as an initial value. $V_1(i, j)$, $V_2(i, j)$, ..., $V_{a-1}(i, j)$ represent pixels selected in this way.

In process 2406, each check bit $U_1(i, j)$=LUT($V_0(i, j)$)⊙LUT($V_1(i, j)$)⊙ ... ⊙LUT($V_{a-1}(i, j)$) is calculated. In process 2407, if the second bit from the LSB of a pixel at the position (i, j) of the image V(i, j) to be verified is equal to $U_1(i, j)$, it is determined that the corresponding pixel data has not been tampered with; otherwise, a mark x is assigned to pixels at respective positions. In process 2408, if processes 2405 to 2407 are repeated for all pixels, and the number of marks x at each position is a/2, that position is detected as a tampered position.

In the above process, after the digital watermark embedding/extraction process for tampering detection for each pixel, that for tampering detection using a combination of pixels is done. However, the order of processes may be reversed. A later process may select LSBs which are to undergo tampering detection as well as that settled in an earlier process. In this extraction process, either tampering detection for each pixel or using a combination of pixels may be done.

In the 11th embodiment, the process for encrypting pixels using pseudo random numbers generated using the key $k_0$ as an initial value and detecting a tampered position for each pixel is combined as an example to complement drawbacks of the aforementioned method. However, the present invention is not limited to such specific combination, and the method of the above embodiment may be combined with other known methods such as Japanese Laid-Open Patent No. 2001-24876 and the like.

[12th Embodiment]

In the 10th and 11th embodiments described above, highly secure tampered position detection methods have been explained taking an image as an example. However, the present invention is not limited to an image, and includes all methods that encrypt digital data, and append corresponding check information used to detect a tampered position.

For example, a case will be examined below wherein a contents is expressed by a plurality of data blocks, as shown in FIG. 6 above. In case of normal tampering detection, a check bit for each data block can be appended using an error detection code or the like. If an error detection code used is special and secret, no problem is posed since an attacker can tamper a data block but cannot generate a corresponding check bit. However, if the error correction code used is open to the public, tampering of a data block cannot be found since the attacker can generate a check bit according to the tampered data. Even when the error correction code used is special and secret, replacement or the like of data blocks including check bits cannot be detected since error detection is made for each data block. Hence, the same problem as that for an image discussed in the first embodiment occurs.

However, when a plurality of contents are present, and simultaneously undergo encryption using an identical key, if data blocks which form different contents are replaced with each other, such tampering cannot be detected. Hence, such problem is solved by the following method that randomly selects data blocks for which check bits are generated.

Figure 25:
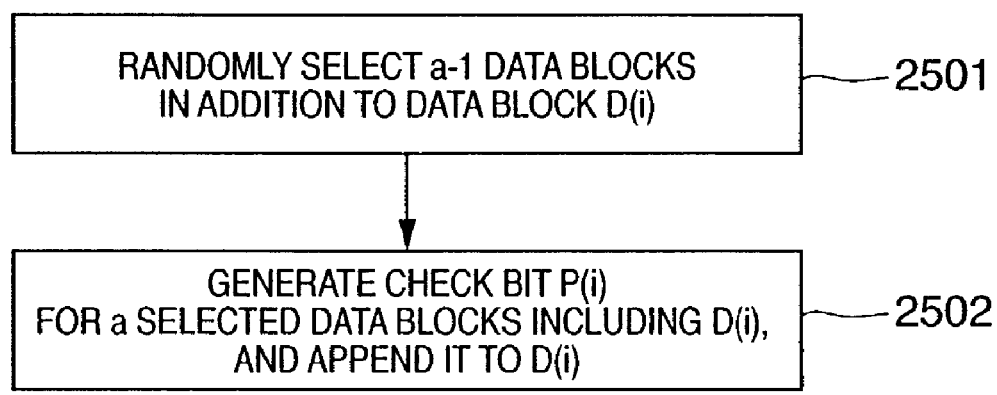
FIG. 25 is a flow chart for explaining a process for embedding a check bit in a data block in the 12th embodiment of the present invention.

FIG. 25 is a flow chart for explaining a sending data generation process according to the 12th embodiment of the present invention.

<Sending Side (FIG. 25)>

In process 2501, (a−1) data blocks other than the position of the i-th data block D(i) are randomly selected. In process 2502, check bits P(i) corresponding to the selected (a−1) data blocks as well as the i-th data block are generated using a known error detection code, and are appended to the data block D(i).

Figure 26:
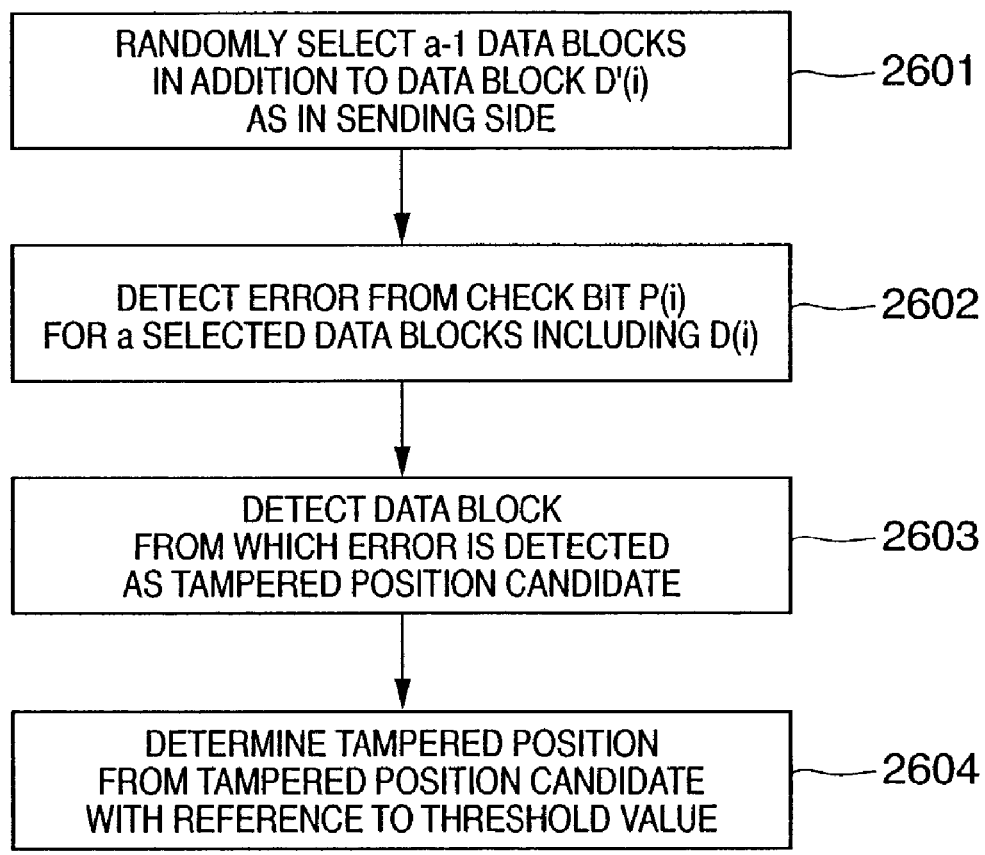
FIG. 26 is a schematic flow chart for explaining a process for extracting a check bit and specifying a tampered position in the 12th embodiment.

<Receiving Side (FIG. 26)>

In process 2601, (a−1) data blocks other than the position of the i-th data block D(i) are randomly selected as in the sending side.

In process 2602, errors are detected from received D'(i) and check bits P'(i) corresponding to selected (a−1) received data blocks using a known error detection code.

In process 2603, if any error is detected, marks x are assigned to the selected data blocks as well as the data block of interest. In process 2604, after completion of processes of all the data blocks, if the number of marks x at each position is equal to or larger than a/2, the position of the contents corresponding to that data block is detected as a tampered position.

As an application example of a single contents formed by a plurality of data blocks, MIDI, SMF, and the like are available, as described above. Also, the present invention can be applied to a contents consisting of a plurality of data blocks in practice as in data streams of JPEG and MPEG.

In the 12th embodiment, the check bits are appended using an error correction code, but can be appended using the aforementioned Hash function or the like. Furthermore, in this embodiment, the check bits are appended to data blocks. However, the present invention is not limited to this, and check bits may be embedded in data blocks using known digital watermarking that can be applied to the contents.

In the 12th embodiment, check bits are generated by randomly combining a plurality of data blocks. Also, as described in the 11th embodiment, check bits generated for each data blocks may be combined to improve precision.

[13th Embodiment]

Figure 31:
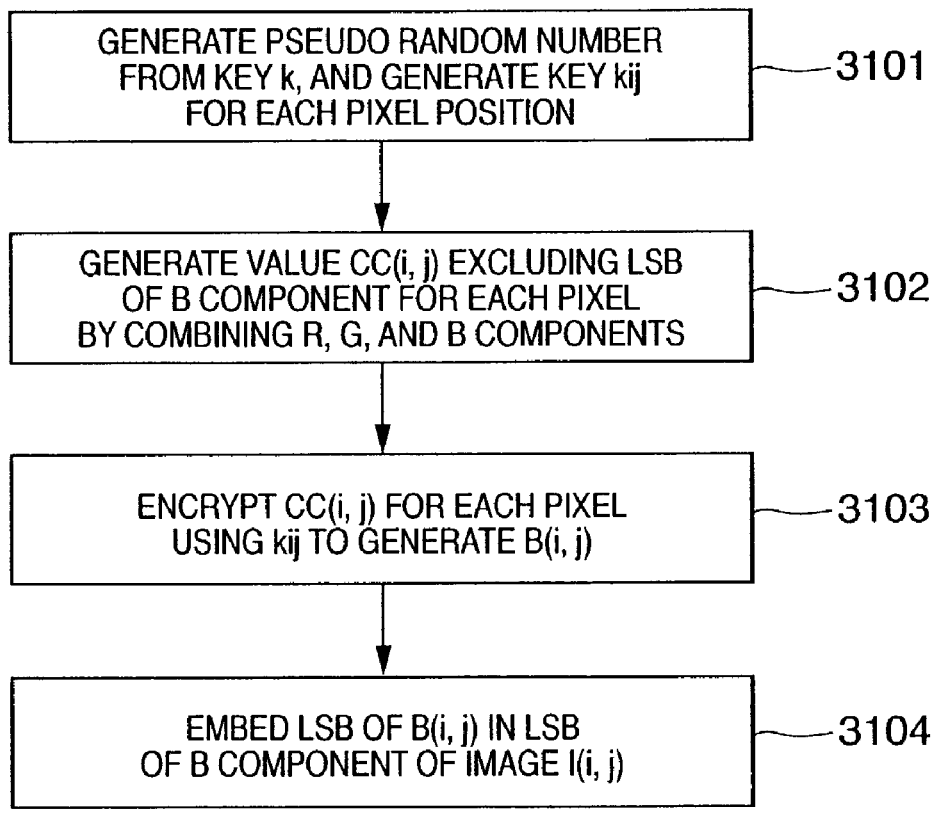
FIG. 31 is a schematic flow chart for explaining an outline of an image embedding process according to the 13th embodiment of the present invention.

FIG. 31 is a schematic flow chart for explaining an image embedding process according to the 13th embodiment of the present invention.

In FIG. 31, assume that an original image I(i, j) is an M×N multi-valued image (in which one pixel is expressed by 8 bits), and $I_R(i, j)$, $I_G(i, j)$, and $I_B(i, j)$ respectively represent images obtained by decomposing the original image I into R, G, and B components. Also, in the following description, ⊙ indicates EXOR (exclusive OR). Note that processes 3103 and 3104 in FIG. 31 are repeated for respective pixels from i=0 and j=0 to i=M and j=N.

<Embedding Process (FIG. 31)>

In process 3101, pseudo random numbers are generated using a key k as an initial value to generate keys $k_{ij}$ corresponding to respective pixel positions of the original image I(i, j) (if the key length is n bits, pseudo random numbers of M×N×n bits are required). In process 3102, R, G, and B components of the original image I(i, j) are combined to generate 23-bit data (except for the LSB of a B component) CC(i, j) for each pixel. In process 3103, CC(i, j) is encrypted using the key $k_{ij}$ for each pixel position and an encryption function to calculate an embedding image B(i, j)=E_$k_{ij}$(CC(i,j)). Note that E_$k_{ij}$( ) indicates the encryption function using $k_{ij}$ as a key. Finally, in process 3104, the LSB of the embedding image B(i, j) is embedded in the LSB of a B component of each pixel data of the original image I(i, j) to generate a digitally watermarked image I'(i, j).

The digitally watermarked image I'(i, j) obtained by the embedding process shown in FIG. 31 is an image obtained by changing the LSBs of the B components of the original image I(i, j) in process 3104. The reason why a digitally watermarked image is formed by changing only the LSBs of B components is to implement the embedding process that suffers least image quality deterioration, in consideration of the visual characteristics of a human being.

An outline of this process will be described below with reference to FIGS. 33 and 34.

Figure 33:
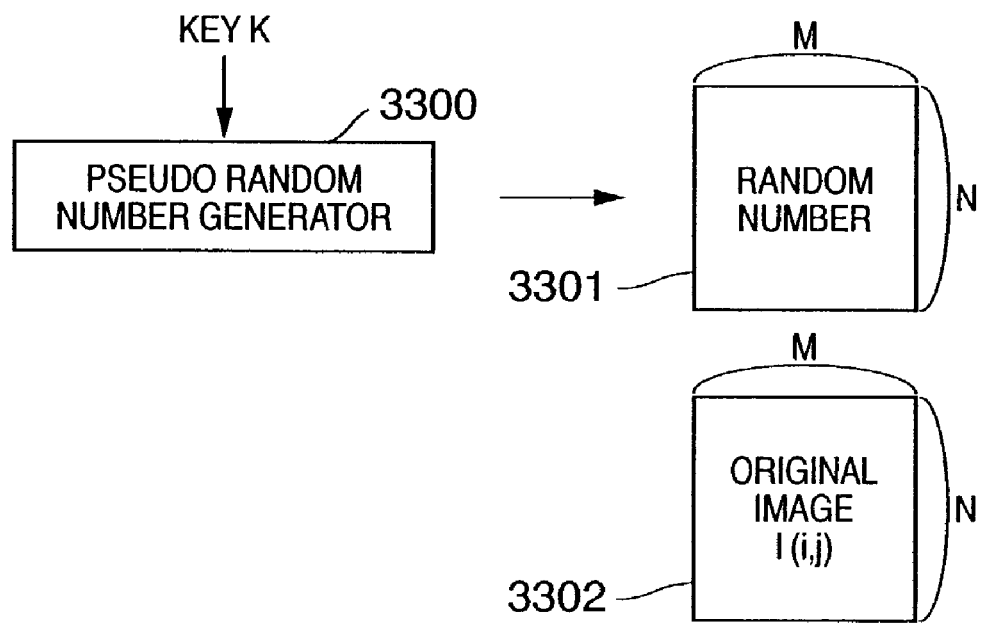
FIG. 33 is a schematic view for explaining the image embedding process according to the 13th embodiment of the present invention.

Referring to FIG. 33, reference numeral 3300 denotes a pseudo random number generator for generating random numbers 3301 of M×N×n bits (n is the key length used in the encryption function) using the key k as an initial value. An n-bit random number located at a position (i, j) of these random numbers 3301 corresponds to a pixel at the position (i, j) of an original image I(i, j) 3302, and is used as a key for the encryption function.

Figure 34:
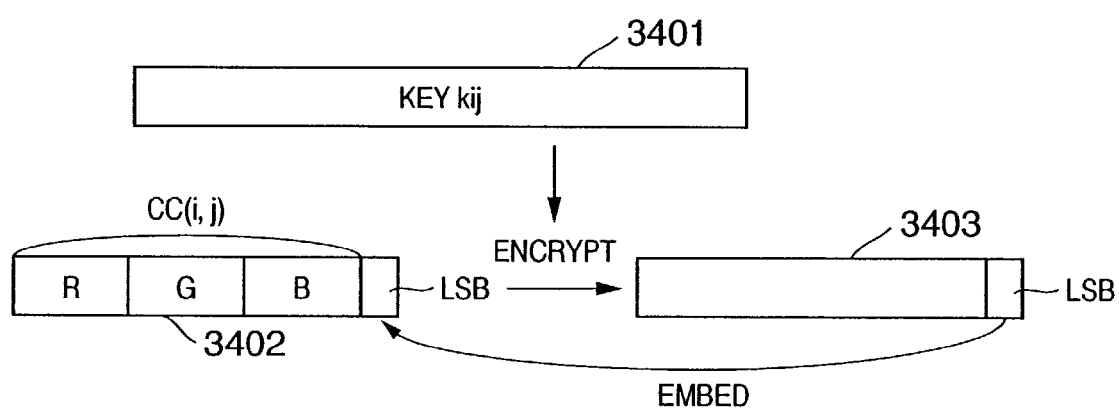
FIG. 34 is a schematic view for explaining the image embedding process according to the 13th embodiment of the present invention.

Referring to FIG. 34, reference numeral 3402 denotes pixel data obtained by combining three, i.e., R, G, and B components which form one pixel of the original image I(i, j), and CC(i, j) is obtained by excluding the LSB of the B component from the pixel data 3402. Reference numeral 3401 denotes a key $k_{ij}$ (one of the random numbers 3301) corresponding to the pixel position of the pixel data 3402. Reference numeral 3403 denotes an encryption result of CC(i, j) using the key $k_{ij}$ 3401, and the LSB of the result 3403 is embedded in the LSB of the pixel data 3402. With such process, the digitally watermarked image I'(i, j) obtained by replacing the LSBs of the B components of the original image 3302 (FIG. 33) is obtained.

An extraction method for extracting the image embedded in this way will be explained below with reference to FIG. 32.

Figure 32:
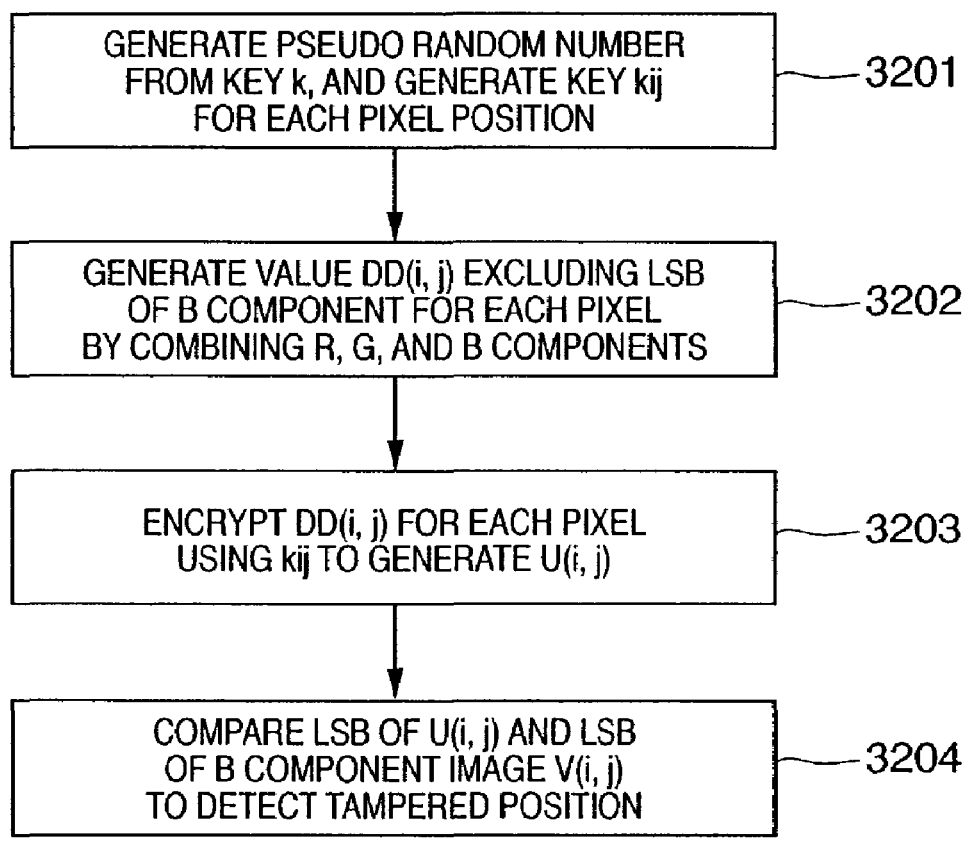
FIG. 32 is a schematic flow chart for explaining a process for extracting an embedded image and specifying a tampered position in the 13th embodiment.

FIG. 32 is a schematic flow chart for explaining a process for extracting the embedded image according to the 13th embodiment.

Assume that V(i, j) represents an image to be verified, and $V_R(i, j)$, $V_G(i, j)$, and $V_B(i, j)$ represent images obtained by decomposing that image into R, G, and B components. Also, assume that a verifier possesses the key k used in the embedding process. Note that processes 3203 and 3204 in FIG. 32 are repeated for respective pixels from i=0 and j=0 to i=M and j=N.

<Extraction Process (FIG. 32)>

In process 3201, pseudo random numbers are generated using the key k as an initial value to generate keys $k_{ij}$ corresponding to respective pixel positions of the image V(i, j) to be verified (if the key length is n bits, pseudo random numbers of M×N×n bits are required). In process 3202, R, G, and B components of the image V(i, j) to be verified are combined to generate 23-bit data (except for the LSB of a B component) DD(i, j) for each pixel. In process 3203, DD(i, j) is encrypted using the key $k_{ij}$ for each pixel position and an encryption function to calculate a check image U(i, j)=E_$k_{ij}$(DD(i,j)). Note that E_$k_{ij}$( ) indicates the encryption function using $k_{ij}$ as a key. Finally, if the LSB of this check image U(i, j) is equal to that of the B component of V(i, j), it is determined that the corresponding pixel data has not been tampered with; if they are not equal to each other, it is determined that the corresponding pixel data has been tampered with, and (i, j) at that time is detected as a tampered position.

Note that an outline of this extraction process can be understood with reference to FIGS. 33 and 34 above, and its explanatory views will be omitted.

In the 13th embodiment, keys of M×N×n bits are generated based on pseudo random numbers in correspondence with respective pixels. Alternatively, keys of L×n bits equal to or smaller than M×N×n bits may be generated, and these L keys may be set in correspondence with the pixel positions by a predetermined method (e.g., randomly selected pixel positions or pixel positions in increments of several pixels), thus achieving a simpler and faster pseudo random number generation process. Note that L is smaller than M×N, and each key may be set in correspondence with either one or a plurality of pixels.

Also, the encryption function to be used is not particularly limited, and may be selected from various known public key cryptography methods such as DES, MISTY, and the like.

The aforementioned image embedding process and extraction process can be implemented using the image processing apparatus shown in FIG. 3.

As described above, according to the 13th embodiment, the image embedding and extraction methods which are secure even when the extraction algorithm and embedding algorithm except for the key are known to an attacker as long as pseudo random numbers generated using the key as an initial value and the encryption function used are secure can be implemented.

[14th Embodiment]

Figure 35:
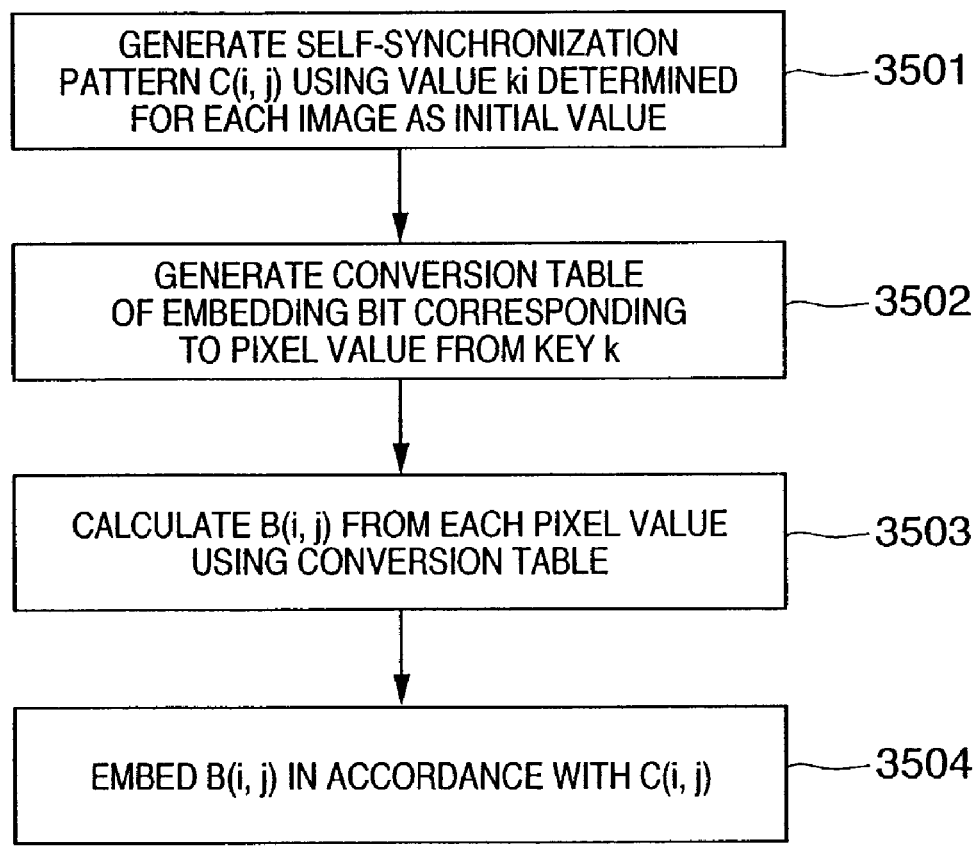
FIG. 35 is a schematic flow chart for explaining an outline of an image embedding process according to the 14th embodiment of the present invention.

FIG. 35 is a schematic flow chart for explaining an image embedding process according to the 14th embodiment of the present invention.

Assume that an original image I(i, j) is an M×N multi-valued image (in which one pixel is expressed by 8 bits). Also, in the following description, ⊙ indicates EXOR (exclusive OR). Note that processes 3503 and 3504 in FIG. 35 are repeated for respective pixels from i=0 and j=0 to i=M−1 and j=N−1.

<Embedding Process (FIG. 35)>

In process 3501, a self-synchronization pattern C(i, j) is generated using values $k_i$ determined for respective pixels as initial values.

In process 3502, pseudo random numbers are generated using a key k as an initial value to generate a lookup table LUT( ) that receives 8-bit data and outputs 1-bit data. The table is generated by assigning the generated pseudo random numbers bit by bit in the order of addresses of the table.

In process 3503, each embedding bit B(i, j)=LUT($I_7$(i, j)) is calculated from an image $I_7$(i, j) obtained by excluding the LSBs of the original image I(i, j). Note that LUT($I_7$(i, j)) indicates a 1-bit random number value output in response to the image $I_7$(i, j) input to the lookup table LUT( ).

In process 3504, the arithmetic result of {B(i, j)⊙C(i, j)} is embedded in each LSB of the original image I(i, j) to generate a digitally watermarked image I'(i, j).

The digitally watermarked image I'(i, j) obtained by this digital watermark embedding process is an image obtained by embedding {B(i, j)⊙C(i, j)} in the LSB of each B component of the original image I(i, j) in process 3504. The reason why a digitally watermarked image is formed by changing only the LSBs of B components is to implement the embedding process that suffers least image quality deterioration, in consideration of the visual characteristics of a human being.

A method of extracting the digital watermark embedded in this way will be explained below. Assume that V(i, j) represents an image to be verified. Also, a verifier possesses the key k used in the embedding process.

Figure 40:
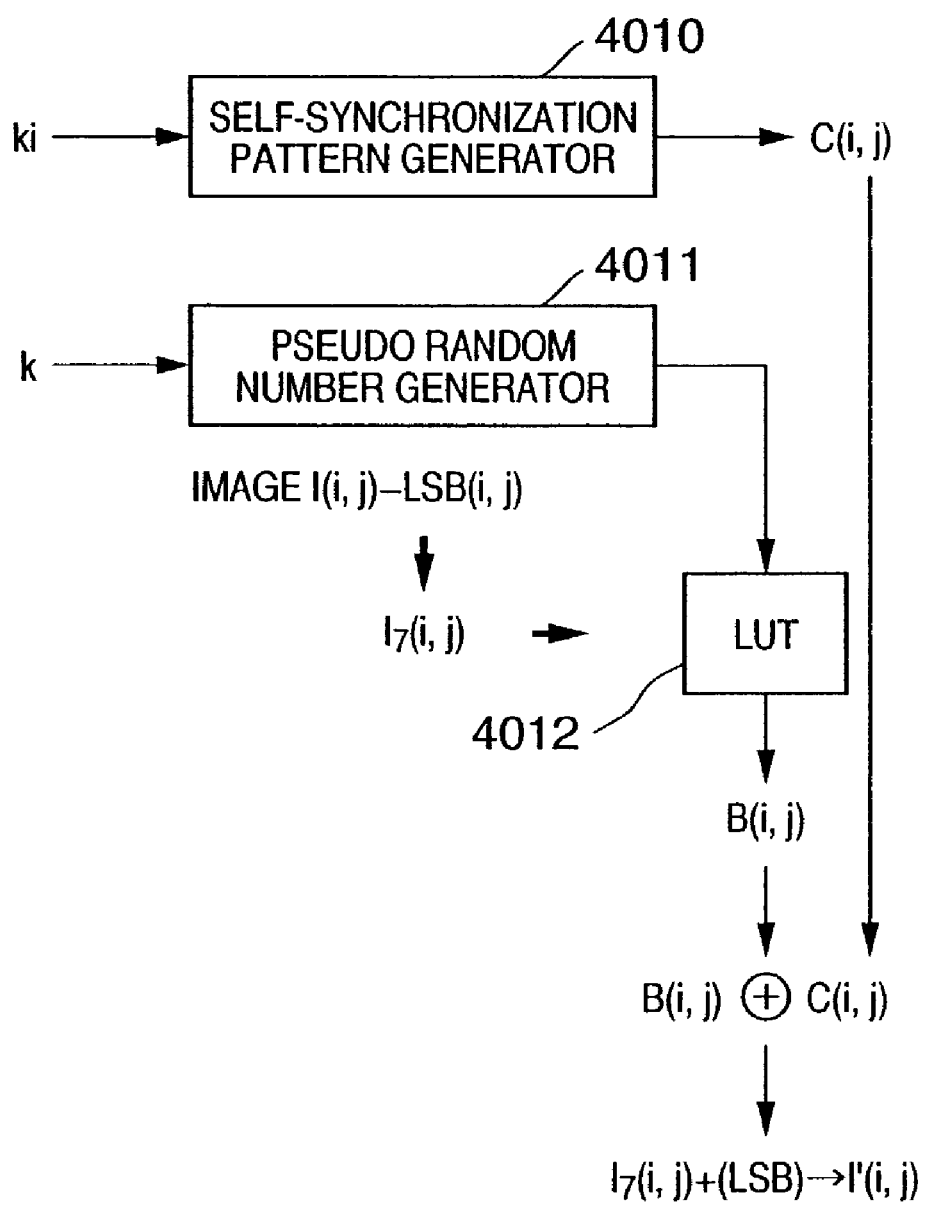
FIG. 40 is a schematic diagram for explaining the image embedding process according to the 14th embodiment of the present invention.

For the sake of better understanding of this embedding process, FIG. 40 shows the flow of this process.

Referring to FIG. 40, reference numeral 4010 denotes a self-synchronization pattern generator which generates the self-synchronization pattern C(i, j) using $k_i$ as an initial value. Reference numeral 4011 denotes a pseudo random number generator for generating pseudo random numbers using the value k as an initial value, which are stored in the order of addresses of a lookup table LUT 4012. This LUT 4012 receives an image $I_7$(i, j) obtained by excluding the LSB of the original image I(i, j), and outputs a 1-bit embedding bit B(i, j) in correspondence with that image. B(i, j) and the self-synchronization pattern C(i, j) are exclusively ORed, and the EXOR is inserted in each LSB of the original image I(i, j), thus generating the digitally watermarked image I'(i, j).

<Extraction Process (FIG. 36)>

Figure 36:
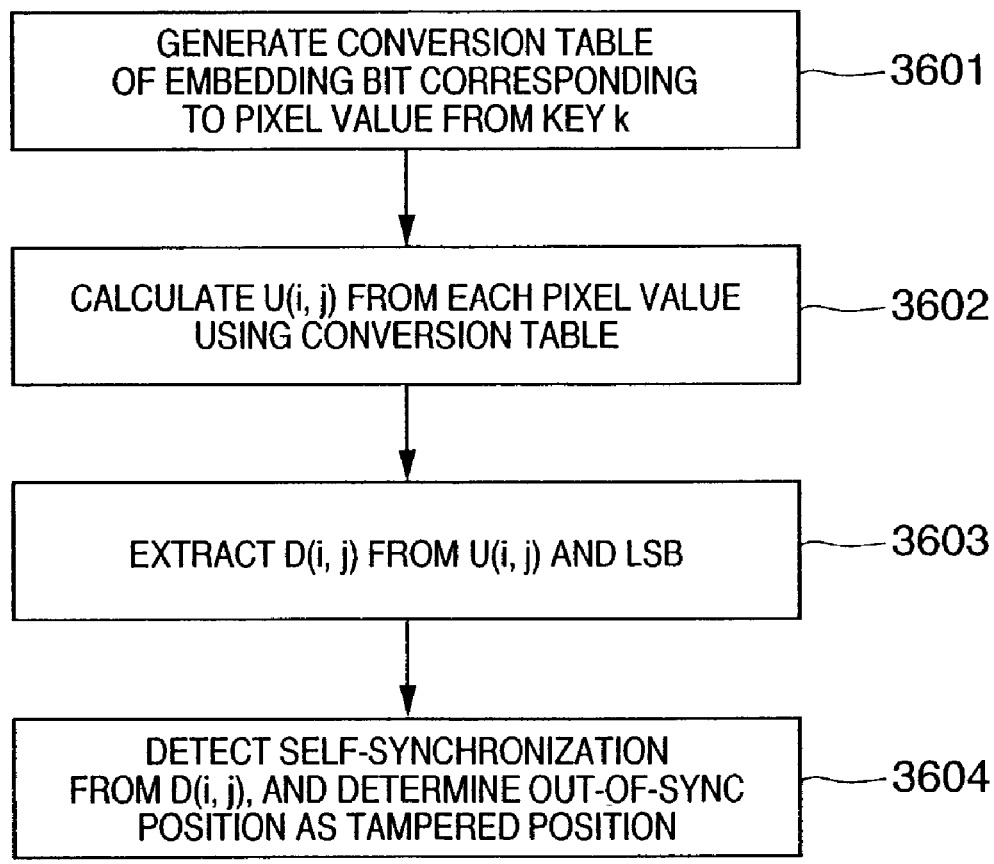
FIG. 36 is a schematic flow chart for explaining a process for extracting an embedded image and specifying a tampered position in the 14th embodiment.

FIG. 36 is a flow chart for explaining a process for extracting a digital watermark from the digitally watermarked image, and detecting a tampered position.

In process 3601, pseudo random numbers are generated using the key k as an initial value to generate an 8-bit input/1-bit output lookup table LUT( ). The lookup table generated in this way is the same as the lookup table 4012 shown in FIG. 40.

In process 3602, an image $V_7$(i, j) obtained by excluding each LSB of the image V(i, j) to be verified is input to the LUT to obtain a check bit U(i, j)=LUT ($V_7$ (i, j)). Note that U(i, j) indicates a 1-bit random number which is output in response to the image $V_7$(i, j) input to the lookup table LUT( ).

In process 3603, if U(i, j)=$LSB_V$, D(i, j)=0 is set; if U(i, j)≠$LSB_V$, D(i, j)=1 is set. Note that $LSB_V$ is the LSB of the image V(i, j) to be verified.

In process 3604, self-synchronization is detected from the output result D(i, j) in process 3603, and an out-of-sync position is detected as a tampered position.

Note that the self-synchronization pattern C(i, j) is a bit sequence which has a long period and strong autocorrelation and, for example, a bit sequence called an M-sequence is known. The M-sequence is a cyclic code having an information length m and a code length n=$2^m$−1, and a bit sequence having a period of a maximum length can be easily generated using m shift registers.

Figure 37:
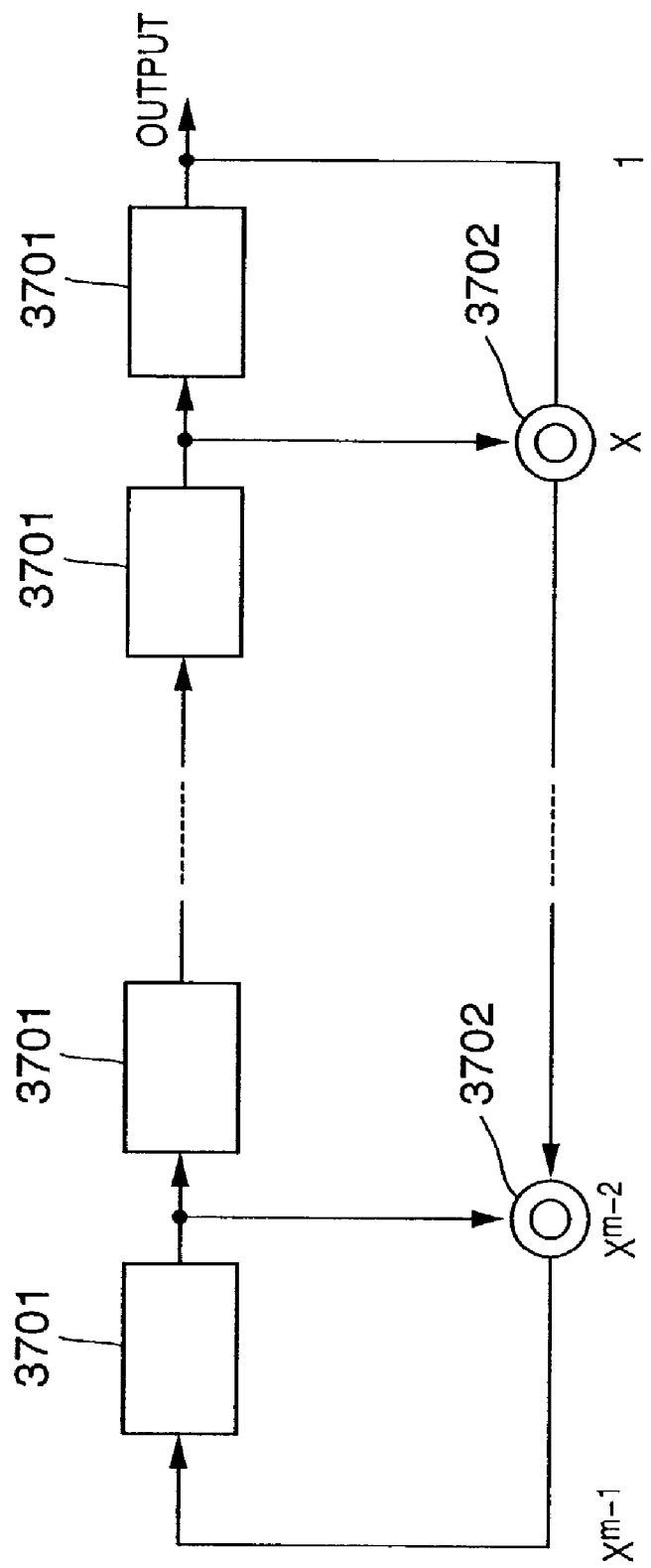
FIG. 37 is a block diagram showing the arrangement of a self-synchronization pattern generator according to the 14th embodiment of the present invention.

FIG. 37 is a block diagram showing the arrangement of an M-sequence generator using equation (1) below. In FIG. 37, reference numeral 3701 denotes shift registers; and 3702, adders (EXOR).

$$H(x) = h_{m-1} \cdot x^{m-1} + h_{m-2} \cdot x^{m-2} + \ldots + h_1 \cdot x + h_0 \quad (1)$$

The self-synchronization pattern generation process executed in process 3501 in FIG. 35 is executed as follows.

That is, $k_1$ are set as initial values $c_1, \ldots, c_m$ of a plurality of shift registers 3701 in FIG. 37 to calculate an output result $c_{m+1}$. This output result $c_{m+1}$ is fed back to the first shift register 3701 to repeat an arithmetic operation, thereby generating a self-synchronization pattern C(i, j)=[$c_1, \ldots, c_{M \times N}$] having a length of M×N. The values of the respective shift registers 3701 and their output value $c_{m+1}$ have a relationship given by:

$$c_{i+m} = c_{i+m-1} \cdot x^{m-1} + c_{i+m-2} \cdot x^{m-2} + \ldots + c_{i+1} \cdot x + C_i \quad (2)$$

Self-synchronization is detected in process 3604 in FIG. 36 as follows.

Figure 38:
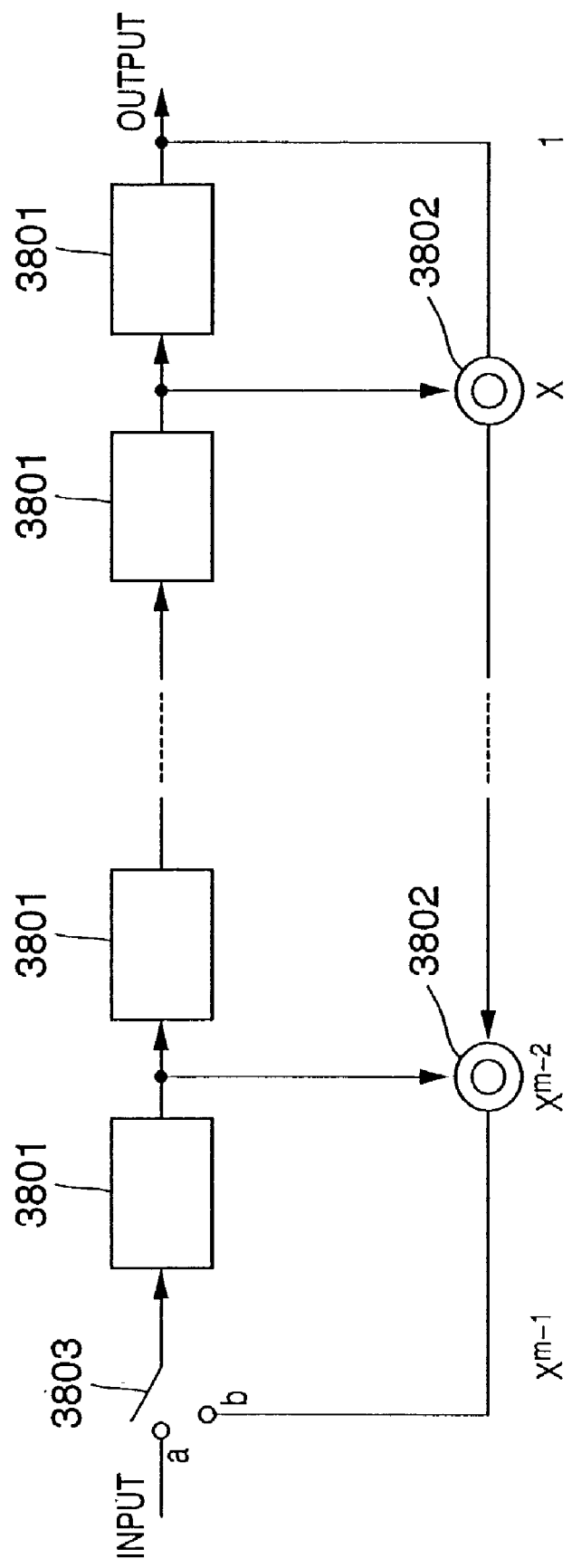
FIG. 38 is a block diagram showing the arrangement of a self-synchronization pattern calculator according to the 14th embodiment of the present invention.

FIG. 38 is a block diagram showing the arrangement of an M-sequence calculator used to check an M-sequence. Referring to FIG. 38, reference numeral 3801 denotes shift registers; numeral 3802 denotes adders (EXOR); and numeral 3803 denotes a switch.

Referring to FIG. 38, when the switch 3803 is connected to the input side (terminal a), an extracted bit sequence is input. On the other hand, when the switch 3803 is connected to the feedback side (terminal b), the calculator shown in FIG. 38 serves as a normal M-sequence data generator, as shown in FIG. 37.

A case will be examined first wherein a bit sequence free from tampering is input.

When the switch 3803 is connected to the input side (terminal a), and $[d_1, \ldots, dm]$ as the first bit sequence of the extracted bit sequences $D(i, j)$ is input to the M-sequence generator, since the relationship given by equation (2) above is established, $c_{m+1}$ is calculated. Since the calculated value $c_{m+1}$ matches $d_{m+1}$ as the next bit of the extracted bit sequences $D(i, j)$, it is determined that synchronization is detected. After that, since all bits match after the arithmetic operation is repeated up to M×N, it is determined that the bit sequences are free from tampering.

When synchronization is detected until $d_1, \ldots, d_i$, and out of synchronization is detected at $d_{i+1}$, i.e., $c_{i+1} \neq d_{i+1}$, it is determined that $d_{i+1}$ is the tampered position. After that, when the calculation is continued while the switch 3803 is kept connected to the input side (terminal a), the calculated values c and extracted values d of the subsequent m bits do not match due to the influence of $d_{i+1}$.

Hence, upon detection of tampering, the switch 3803 is connected to the feedback side (terminal b), and the calculated value $c_{i+1}$ is input to the M-sequence generator in place of the extracted value $d_{i+1}$ as the tampered value to continue the calculation. At this time, if the extracted value $d_{i+1}$ alone corresponds to the tampered position, since the calculation is continued based on correct $c_{i+1}$ in place of $d_{i+1}$, values after $d_{i+2}$ match. However, since $c_{i+2}$ and $d_{i+2}$ often accidentally match, it is determined that synchronization is detected, i.e., values after $d_{i+2}$ are free from tampering, only if t or more matches are successively detected.

Also, when tampered positions are concentrated after $d_{i+1}$, if t or more matches are successively detected, it is determined that values have not been tampered with when synchronization is detected after retracing to t. If t is set to be large, since the probability of t successive accidental matches is $2^{-t}$, the probability of accidental matches can be very small.

In an initial state, if even 1 bit of the first sequence $[d_1, \ldots, d_m]$ has been tampered with, since equation (2) does not hold, the calculated bit and extracted bit $d_{m+1}$ do not match from the beginning, and out of synchronization is detected. In this case, since no correct calculation value $c_{m+1}$ is obtained, the switch 3803 is connected to the input side (terminal a) until equation (2) holds, and the calculation is continued until synchronization is detected. If the synchronized state is successively detected t times, it is determined that synchronization is detected, and the same process as in an out-of-sync state from the middle of sequences is executed.

The self-synchronization pattern is not limited to a linear arithmetic operation like M-sequences. For example, shift register values may be calculated using a nonlinear function, or a plurality of M-sequence patterns may be calculated using a nonlinear function.

In this manner, even when an image has been shifted or has undergone partial deletion or insertion, it can be detected since out of synchronization is detected in that portion, and a tampered position can be detected.

A case will be examined below wherein an attack that cuts and pastes images which have undergone the embedding process using an identical key, as has been described in the background of the invention. Assume that other kinds of tampering have not been made for the sake of simplicity.

Synchronization begins to be detected from the self-synchronization pattern of the first image. In this embodiment, in embedding process 3501 in FIG. 35, different self-synchronization patterns are embedded using initial values $k_1$, which are different for respective images. Hence, out of synchronization is detected in a portion where different images are cut and pasted. When all different images are combined, synchronization cannot be recovered even when the switch 3803 is connected to the feedback side (terminal b) to check pattern matches, and a portion other than the first image is detected as the tampered portion. Since this embodiment does not use any predetermined stamp image, and uses self-synchronism detected from an extracted pattern, a self-synchronism difference, i.e., image difference can be detected.

In order to verify attacks such as cut-and-paste more strictly, a state wherein the switch 3803 is connected to the feedback (b) side to calculate (state 1), and a state wherein the switch 3803 is connected to the input (a) side to calculate (state 2) may be parallelly set. For example, when the calculation is continued while connecting the switch 3803 to the input side after detection of out of synchronization, synchronization is recovered m bits after the cut-and-paste portion. This is because the embedded pattern is another self-synchronization pattern, and self-synchronization begins to be detected from the pattern of the next pattern after the influence of the previous image disappears. Hence, by making calculations in "state 1" and "state 2" parallelly, a combination of different images can be identified. This method is also effective when an image is shifted, or a line of an image is inserted or deleted.

Figure 39:
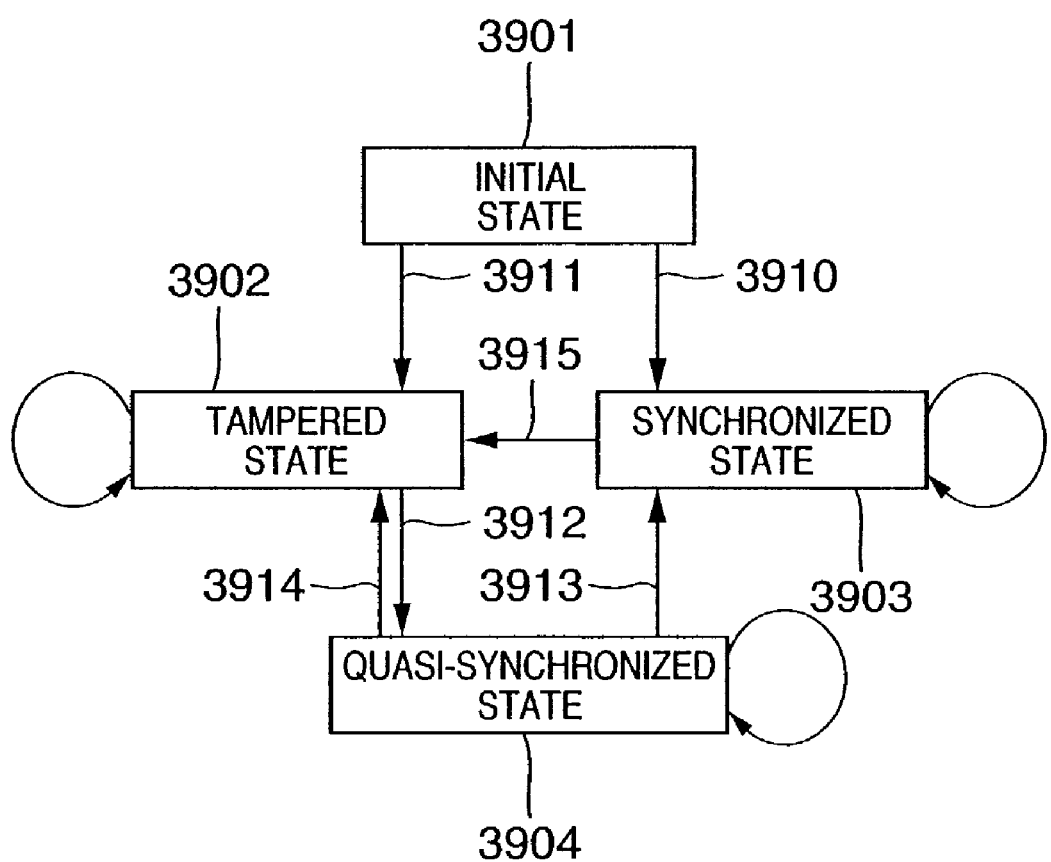
FIG. 39 is a view for explaining status transition for self-synchronization according to the 14th embodiment of the present invention.

The aforementioned tampered position discrimination process executed in process 3604 in FIG. 36 can be expressed by a status transition chart shown in FIG. 39. When an attack is to be verified more strictly, "state 1" and "state 2" are parallelly present in a tampered state 3902 and quasi-synchronized state 3904.

An initial state 3901 corresponds to a processing start state. In this state, the switch 3803 is connected to the input side, the first extracted pattern values $d_1$ to $d_m$ are set as the initial values of the shift register 3801 to calculate $c_{m+1}$, and the calculation result is compared with the extracted $d_{m+1}$. If $c_{m+1} = d_{m+1}$, the control transits to a synchronized state 3903 (3910); if $c_{m+1} \neq d_{m+1}$, the control transits to a tampered state 3902 (3911).

The tampered state 3902 is a state in which the position in the previous state has been tampered with. In this case, the switch 3803 is connected to the feedback side (terminal b) to continue the calculation (state 1), and the calculated value $c_{m+1}$ and extracted value $d_{m+1}$ are compared. If these values match, the control transits to a quasi-synchronized state 3904. At the same time, the calculation (state 2) is continued while connecting the switch 3803 to the input side, and the calculated value $c_{m+1}$ and extracted value $d_{m+1}$ are compared. If these values match, the control transits to the quasi-synchronized state 3904 (3912).

In the quasi-synchronized state 3904, the results of "state 1" and "state 2" do not match. In this state, the calculations of "state 1" and "state 2" are continued, and when $t_1$ results of "state 1" successively match, or when $t_2$ results of "state 2" successively match, no tampering is determined, and the control transits to the synchronized state 3903 (3913); otherwise, the control transits to the tampered state 3902 (3914).

In the synchronized state 3903, the switch 3803 is connected to the input side (terminal a) to calculate a value $c_{i+m}$ from extracted values $d_i$ to $d_{i+m-1}$, and $c_{i+m} = d_{i+m}$. In this state, if these values do not match, the control transits to the tampered state 3902 (3915).

Since the aforementioned image embedding process and extraction process can be implemented using the image processing apparatus shown in FIG. 3, a detailed description of the arrangement of that apparatus will be omitted.

As described above, according to the 14th embodiment, a method which can obviate the need for saving a stamp image, and is secure even when different images undergo an embedding process using an identical key can be implemented. This method is secure even when all algorithms except for the key are open to the public, as long as a conversion table generated by a pseudo random number generation method using that key as an initial value is secure.

[15th Embodiment]

In the 14th embodiment described above, when respective pixels of the original image I(i, j) have identical pixel values $I_7$(i, j) except for their LSBs, identical embedding bits B(i, j) are generated, and such image is readily analyzed. Hence, a method of making analysis difficult by converting using random numbers in accordance with the pixel positions will be explained below.

Figure 41:
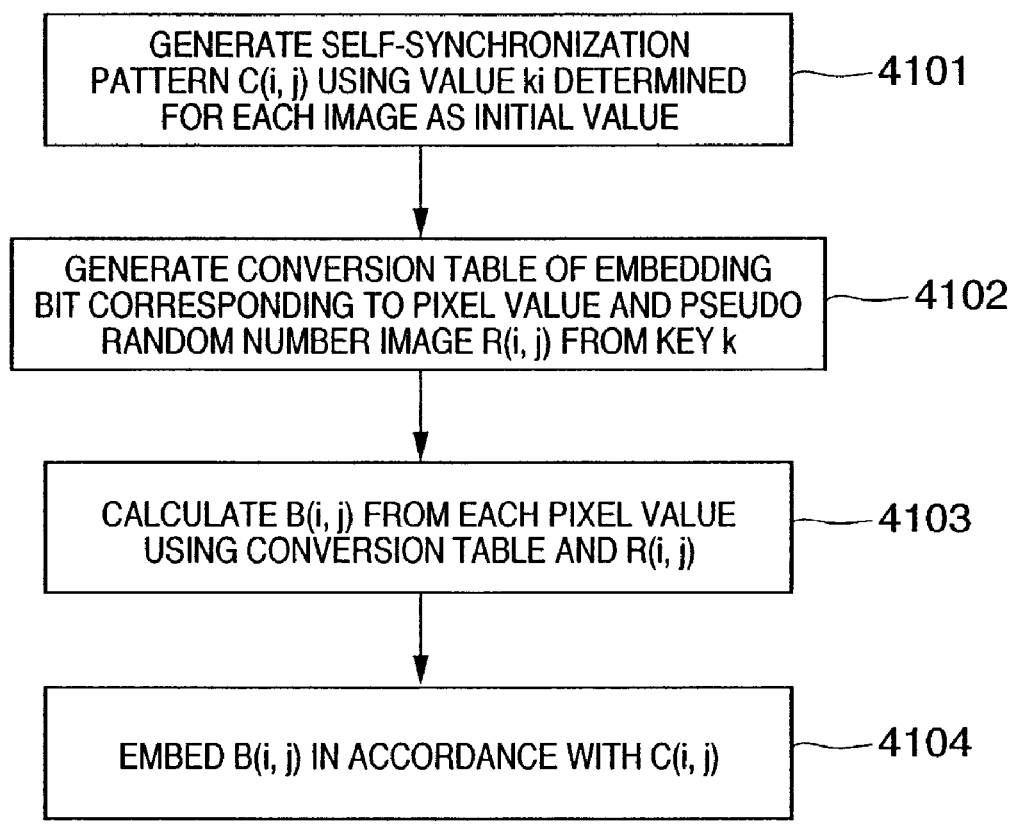
FIG. 41 is a schematic flow chart for explaining an outline of an image embedding process according to the 15th embodiment of the present invention.

FIG. 41 is a schematic flow chart for explaining a digital watermark embedding process according to the 15th embodiment of the present invention.

<Embedding Process (FIG. 41)>

In process 4101, a self-synchronization pattern C(i, j) is generated using values $k_i$ determined for respective pixels as initial values.

In process 4102, pseudo random numbers are generated using a key k as an initial value to generate a lookup table LUT( ) that receives 8-bit data and outputs 1-bit data. The table is generated by assigning the generated pseudo random numbers bit by bit in the order of addresses of the table. Furthermore, the pseudo random numbers are kept generated to generate an M×N binary pseudo random number image R(i, j).

The flow advances to process 4103 to calculate each embedding bit B(i, j)=LUT($I_7$(i, j))⊕R(i, j) from an image $I_7$(i, j) obtained by excluding the LSBs of the original image I(i, j). Note that LUT($I_7$(i, j)) indicates a 1-bit random number value output in response to the image $I_7$(i, j) input to the lookup table LUT( ).

The flow advances to process 4104, and the arithmetic result of {B(i, j)⊕C(i, j)} is embedded in each LSB of the original image I(i, j) to generate a digitally watermarked image I'(i, j).

The difference from the 14th embodiment described above is that the embedding bit B(i, j) is not merely 1-bit data (LUT($I_7$(i, j))) corresponding to the image $I_7$(i, j) but is the EXOR of that 1-bit data and the M×N binary pseudo random number image R(i, j), i.e., the random number value according to a pixel position.

Figure 43:
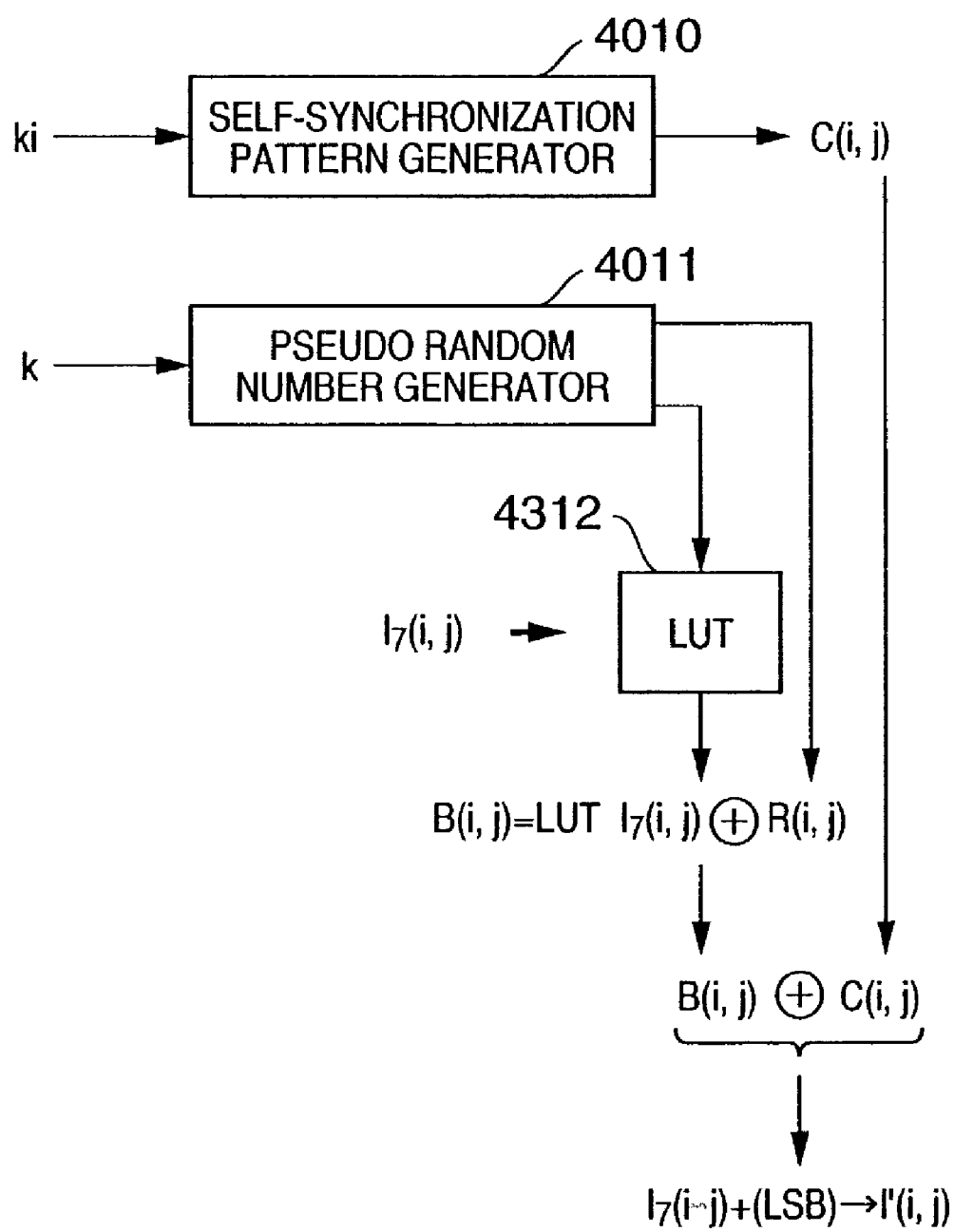
FIG. 43 is a schematic diagram for explaining the image embedding process according to the 15th embodiment of the present invention.

FIG. 43 shows an outline of the embedding process according to the 15th embodiment. Note that the same reference numerals in FIG. 43 denote the same parts as in FIG. 40, and a description thereof will be omitted.

FIG. 43 is characterized in that the EXOR of the output (LUT($I_7$(i, j))) from a lookup table 4312 and each of pseudo random numbers R(i, j) which are generated using the key k as an initial value in correspondence with pixels of the original image I(i, j) is inserted in each LSB of the original image I(i, <Extraction Process (FIG. 42)>

Figure 42:
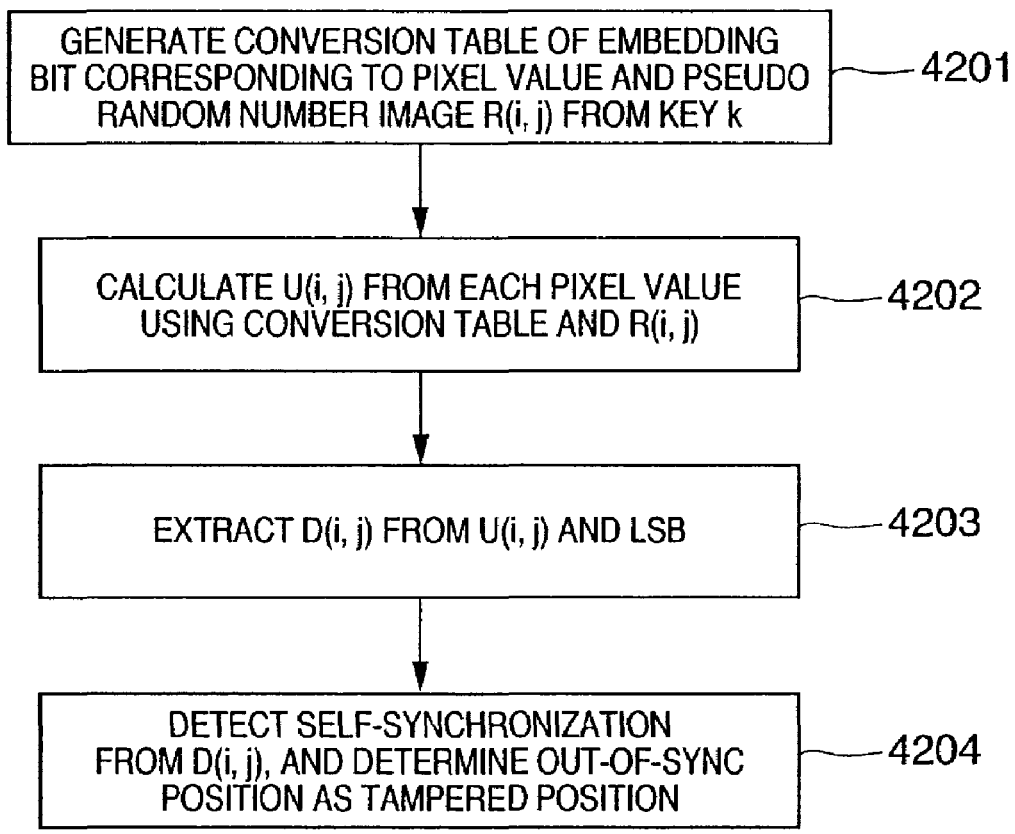
FIG. 42 is a schematic flow chart for explaining a process for extracting an embedded image and specifying a tampered position in the 15th embodiment.

FIG. 42 is a flow chart for explaining a process for extracting a digital watermark from the digitally watermarked image, and detecting a tampered position according to the 15th embodiment of the present invention.

In process 4201, pseudo random numbers are generated using the key k as an initial value to generate an 8-bit input/1-bit output lookup table LUT( ), as in the embedding process shown in FIG. 41. Furthermore, the pseudo random numbers are kept generated to generate an M×N binary pseudo random number image R(i, j).

In process 4202, a check bit U(i, j)=LUT($V_7$(i, j))⊕R(i, j) is calculated from an image $V_7$(i, j) obtained by excluding each LSB of the image V(i, j) to be verified. Note that LUT($V_7$(i, j)) indicates the lookup table output upon inputting the image $V_7$(i, j).

In process 4203, if U(i, j)=$LSB_V$, D(i, j)=0 is set; if U(i, j)≠$LSB_V$, D(i, j)=1 is set. Note that $LSB_V$ is the LSB of the image V(i, j) to be verified.

In process 4204, self-synchronization is detected from the output result D(i, j) in process 4203, and an out-of-sync position is detected as a tampered position.

In the 15th embodiment, since the EXOR of the output value (LUT($I_7$(i, j)) or LUT($V_7$(i, j))) which depends only on the pixel value but is independent from the pixel position, and a pseudo random number R(i, j) generated in the process 4102 (FIG. 41) or 4202 (FIG. 42) is calculated (process 4103 or 4203), different B(i, j) or U(i, j) can be output if the pixel value remains the same, thus making analysis difficult. Note that the EXOR of the pseudo random number R(i, j) and the self-synchronization pattern C(i, j), extracted pattern D(i, j), or image I(i, j) or V(i, j) may be calculated, and the same effect is obtained in either case.

[16th Embodiment]

In the conventional tampered position detection method that saves a stamp image, when an image has undergone enlargement/reduction, rotation, cut, or the like, enlargement/reduction, rotation, or cut of a tampered image can be corrected with reference to the shape of the saved stamp image.

By contrast, the 16th embodiment cannot refer to the shape of the stamp image since no stamp image is saved. Hence, measures against enlargement/reduction, rotation, and cut are taken by the following means.

1) When digitally watermarked image I'(i, j) has undergone global tampering such as enlargement/reduction, rotation, or the like Depending on the definition of tampering, if enlargement/reduction or rotation is considered as tampering, when the extraction process is executed regardless of a change in image size or shape, the image V(i, j) to be verified is different from the embedded image I'(i, j) at most of identical pixel positions, and is different from corresponding pseudo random numbers, thus detecting tampering of the entire image. Hence, in such case, no means is required.

Figure 44:
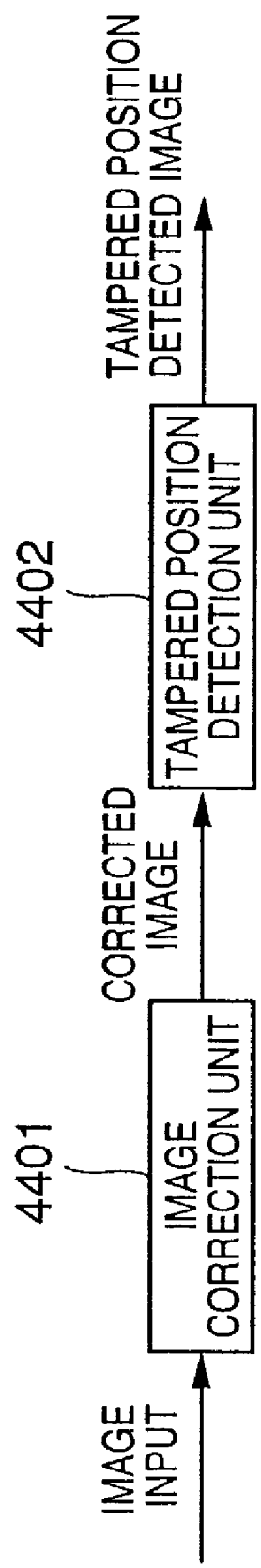
FIG. 44 is a schematic diagram for explaining an outline of an extraction process according to the 16th embodiment of the present invention.

However, if enlargement/reduction or rotation is not considered as tampering, a registration signal (to be described later) is embedded in advance. After enlargement/reduction or rotation is corrected, a tampered position detection process is executed. In such case, a restorable change such as enlargement/reduction, rotation, or the like is not considered as tampering. Hence, in such case, as shown in FIG. 44, after an image correction unit 4401 executes image correction based on a registration signal, a tampered position detection unit 4402 which has the functions of the 14th and 15th embodiments described above executes verification and tampered position detection processes.

2) When embedded image I'(i, j) has been partially cut

The self-synchronization pattern C(i, j) is generated in process 3501 in FIG. 35 in correspondence with, e.g., positions from i=0 and j=0 to i=M by setting i=i+1, and then positions from j=j+1 and i=0 to i=M and j=N. That is, when the self-synchronization pattern C(i, j) is generated in correspondence with the upper lines of an image in turn, and only a lower portion of the embedded image I'(i, j) is cut, U(i, j)=$LSB_V$ is determined at all positions, and no tampering is detected. Hence, correspondence between the self-synchronization pattern C(i, j) and pixel positions must be determined alternately in vertical and horizontal lines or randomly so as to make the original image I(i, j) difficult to cut. Or the self-synchronization pattern may be changed in correspondence with an image size.

In the above embodiments, only a multi-valued image has been exemplified. However, even in case of a color image, the present invention can be practiced by decomposing that image into R, G, and B components. In such case, the process of the present invention may be executed independently for R, G, and B components, or after results of the R, G, and B components are combined.

In the 16th embodiment, the self-synchronization pattern has been exemplified. However, the present invention is not limited to such specific pattern, as long as a pattern difference can be easily identified. For example, a normal image may be inserted in place of the self-synchronization pattern while changing the density for each color component, and a tampered position may be detected by color identification.

Also, since the autocorrelation operation can be achieved by frequency transformation, self-synchronization detection is not limited to the arrangement shown in FIG. 38.

Furthermore, t for synchronization detection may be changed between when the control transits from the initial state 3901 to the synchronized state 3903, and when the control transits from the tampered state 3902 to the synchronized state 3903. In general, t for synchronization detection from the initial state 3901 should be larger than t for synchronization detection from the tampered state 3902. When the value t for synchronization detection from the tampered state 3902 is set to be "1", since status transition is made without the intervention of the quasi-synchronized state 3904, the status transition chart in FIG. 39 is variable depending on the value t. Hence, status transition in the 16th embodiment is not limited to FIG. 39.

As the self-synchronization pattern, an M-sequence has been exemplified for the sake of simplicity. However, since pseudo random numbers normally have self-synchronism, a pseudo random number generator can be used. For example, the M-sequence generator shown in FIG. 37 is replaced by a conversion table that receives m bits and outputs 1 bit. Hence, a pseudo random number may be generated based on a given initial value $k_1$ to obtain a new m-bit input corresponding to the output from a 1-bit output lookup table.

A pseudo random number is generated using a key $k_0$ as an initial value, and is exclusively ORed with respective bits except for the LSB of each B component of an original image I(i, j) to encrypt the original image I(i, j) in correspondence with the pixel positions, thus generating an embedding pattern in the LSBs in place of the image I(i, j). At this time, the extraction process encrypts an image V(i, j) using pseudo random numbers generated from the identical key $k_0$ to execute the same process.

[Registration Signal]

A digital watermark may suffer various attacks. Such attacks include irreversible compression such as JPEG or the like, geometric conversion such as enlargement/reduction, rotation, or the like, and so forth. The registration signal is embedded to correct geometric distortion produced by such attacks. In a registration process, a specific signal (registration signal) is appended to an image upon embedding a digital watermark, and extraction of the appended information is aided using the registration signal before the appended information is extracted upon extracting the digital watermark.

As a method using the registration signal, a method proposed by U.S. Pat. No. 5,636,292 is known. With this method, geometric conversion applied to an image is automatically converted using a geometric pattern embedded in advance. Also, a method using a two-dimensional wave having no symmetric axis, as proposed by Japanese Patent Laid-Open No. 11-355547 is known.

[17th Embodiment]

In the 14th to 16th embodiments described above, highly secure tampered position detection methods have been explained taking an image as an example. However, the present invention is not limited to an image, and includes all cases wherein digital data is broken up into blocks, and corresponding check information used to detect a tampered position is appended to the block.

For example, a case will be examined below wherein one contents is expressed by a plurality of data blocks, as shown in FIG. 6 above. In case of normal tampering detection, a check bit for each data block can be appended using an error detection code or the like. If an error detection code used is special and secret, no problem is posed since an attacker can tamper a data block but cannot generate a corresponding check bit. However, if the error correction code used is open to the public, tampering of a data block cannot be found since the attacker can generate a check bit according to the tampered data. Even when the error correction code used is special and secret, replacement or the like of data blocks including check bits cannot be detected since error detection is made for each data block. Hence, the same problem as that for an image discussed in the above embodiments occurs. Therefore, this problem can be solved by making encryption according to the order of data blocks, and generating check bits for the encrypted blocks.

However, when a plurality of contents are present, and simultaneously undergo encryption using an identical key, if data blocks which form different contents are replaced with each other, such tampering cannot be detected. Hence, an example in which such problem is solved by embedding patterns which are different for respective contents and continuously have self-synchronism in data blocks as a digital watermark will be explained.

Figure 45:
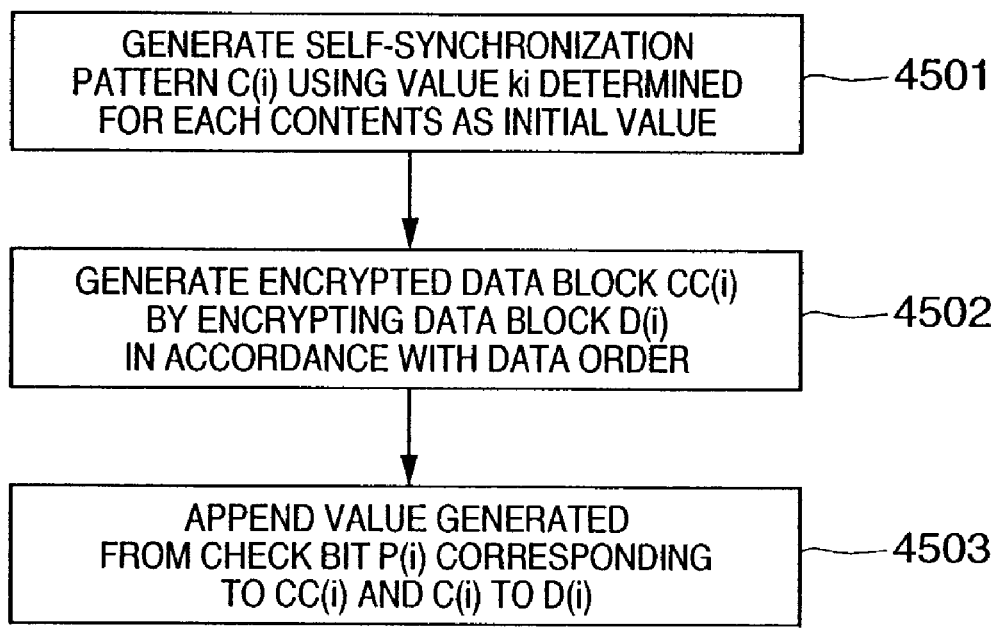
FIG. 45 is a flow chart for explaining a process for embedding a check bit in a data block on the sending side according to the 17th embodiment of the present invention.

FIG. 45 is a flow chart for explaining a process for embedding check bits in data blocks on the sending side according to the 17th embodiment of the present invention.

<Sending Side (FIG. 45)>

In process 4501, a pattern C(i) having self-synchronism is generated using a value $k_i$ determined for each contents as an initial value.

In process 4502, pseudo random numbers are generated using a key k as an initial value, and are exclusively ORed in turn with data blocks D(i) (i indicates the order) that form a contents, thus generating encrypted blocks CC(i) according to the order of data blocks.

In process 4503, check bits P(i) corresponding to the encrypted data blocks CC(i) are generated using a known error detection code, and the EXOR of P(i) and C(i) is appended to each data block D(i).

Figure 47:
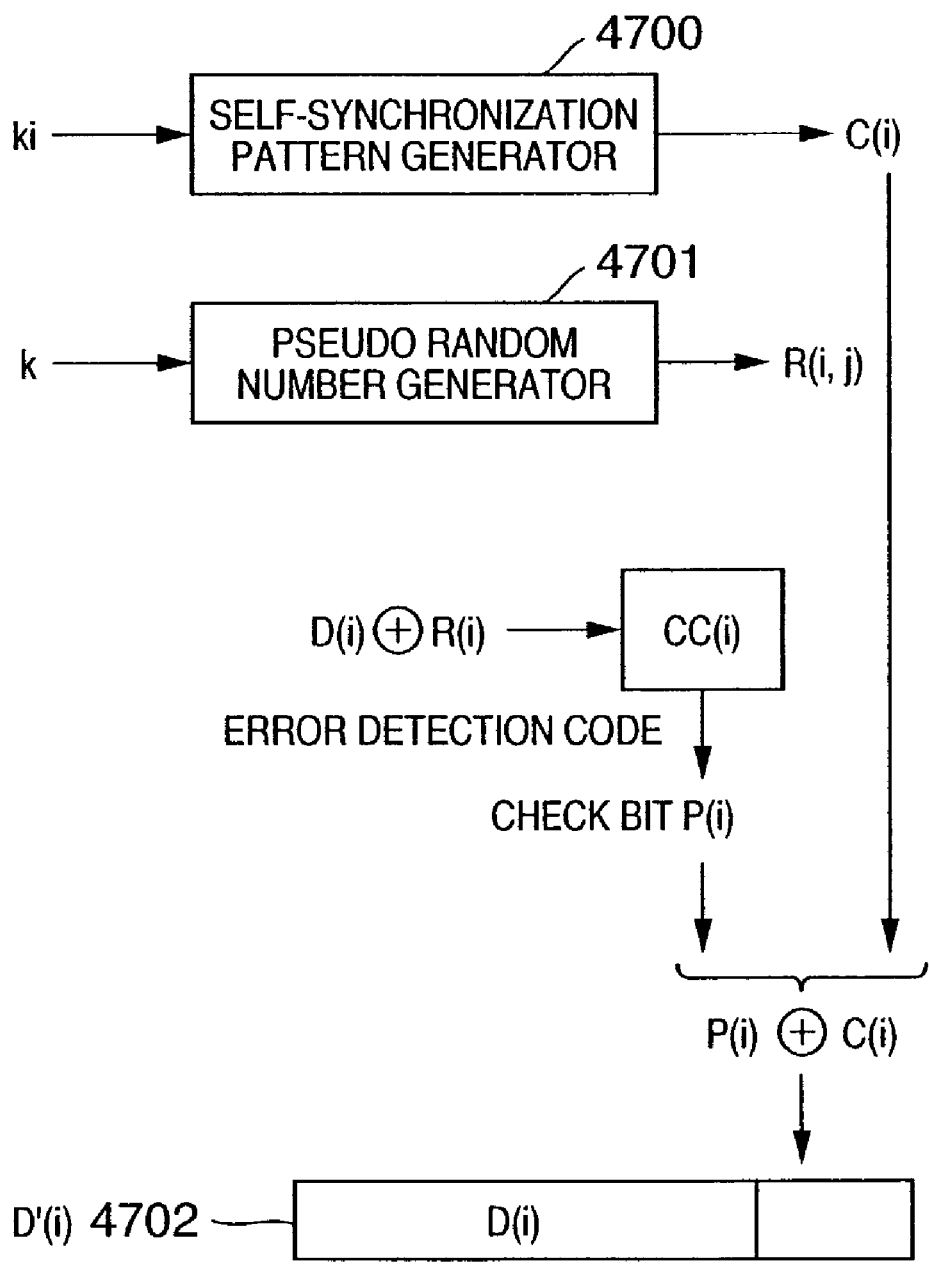
FIG. 47 is a schematic diagram for explaining a process for embedding data in a data block according to the 17th embodiment of the present invention.

FIG. 47 plainly illustrates the process for embedding check bits in data blocks on the sending side according to the 17th embodiment. A self-synchronization pattern generator 4700 generates a pattern C(i) having self-synchronism, using a value $k_i$ determined for each contents as an initial value. A pseudo random number generator 4701 generates a pseudo random number R(i) using the key k as an initial value. Each encrypted block CC(i) is obtained by exclusively ORing the pseudo random number R(i) and data block D(i), and a check bit P(i) is obtained by applying an error correction code to that encrypted block CC(i). A bit to be appended to each data block D(i) is calculated by exclusively ORing this check bit P(i) and self-synchronization pattern C(i), and is appended to that data block D(i), thus generating a data block D'(i) 1502 embedded with the check bit.

Figure 46:
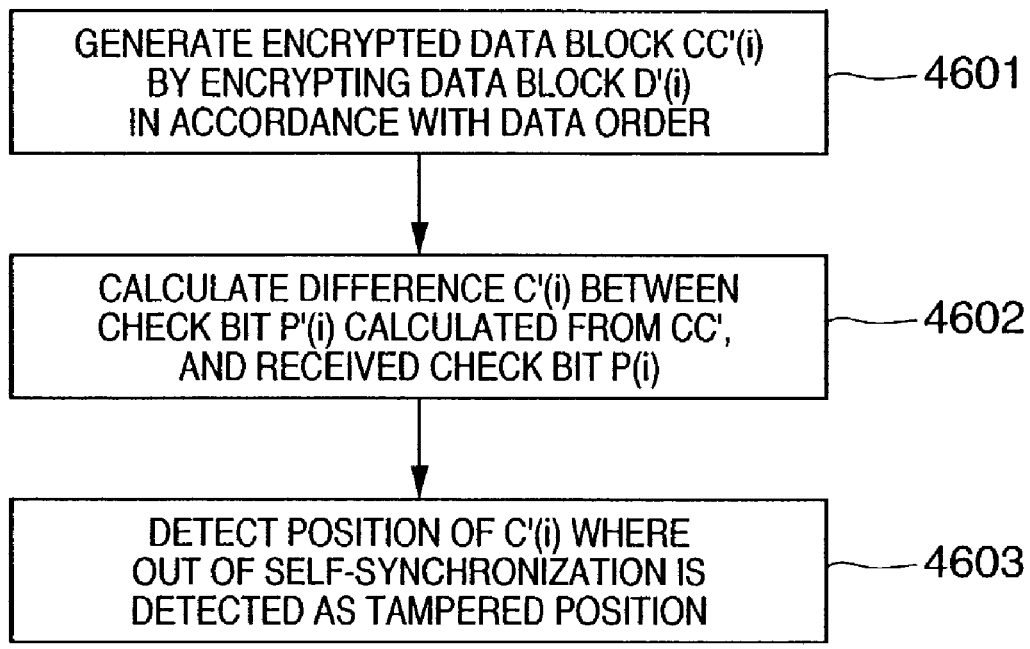
FIG. 46 is a flow chart for explaining a process for detecting a tampered position in a data block on the receiving side according to the 17th embodiment of the present invention.

FIG. 46 is a flow chart for explaining a process for detecting a tampered position in the data block D'(i) on the receiving side according to the 17th embodiment of the present invention.

<Receiving Side (FIG. 46)>

In process 4601, pseudo random numbers are generated using the key k as an initial value, and are exclusively ORed with data blocks D'(i) that form a contents in turn, thus generating encrypted blocks CC'(i) according to the order of data blocks.

In process 4602, a check bit P'(i) is calculated from each encrypted data block CC'(i) using the known error detection code used on the sending side, and a difference C'(i) between P'(i) and the received check bit P(i) is calculated.

In process 4603, self-synchronism of the difference C'(i) is checked, and the contents position corresponding to an out-of-sync block is detected as a tampered position.

As an application example of one contents which is formed by a plurality of data blocks, MIDI that has been prevalently used as music information to be delivered in the Internet or the like in recent years, SMF (Standard Midi File) as a standard format of a music play data file, and the like are available. Such music information is sent while being broken up into a plurality of blocks, and the receiving side combines the plurality of received blocks to play it back as one music information. Hence, the method of the 17th embodiment can be applied to detect a tampered block.

On the other hand, JPEG, MPEG, or the like is formed as a single data stream in appearance, but can be broken up into 8×8 pixel data blocks or data blocks for respective frames, and a series of these blocks form a single contents. FIG. 6 illustrates separate data blocks for the sake of simplicity. However, the present invention can be applied to a contents which looks a single data stream but is formed by a plurality of data blocks in practice.

In the 17th embodiment, the check bits are appended using an error correction code. However, since such check bits can be appended using a known Hash function or the like, the present invention is not limited to such specific check bits. Furthermore, in the 17th embodiment, the check bits are appended to data blocks. However, the present invention is not limited to this, and check bits may be embedded in data blocks using known digital watermarking that can be applied to the contents.

[18th Embodiment]

Figure 48:
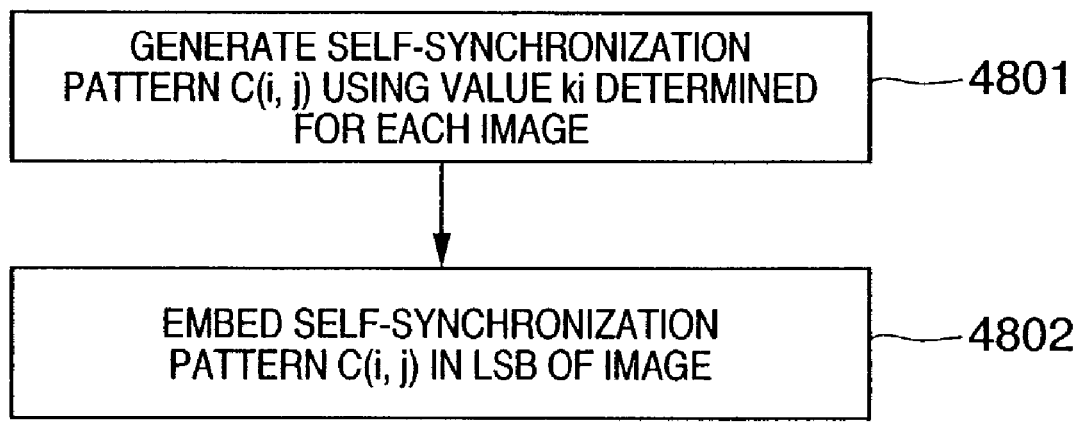
FIG. 48 is a schematic flow chart for explaining an outline of an image embedding process according to the 18th embodiment of the present invention.

FIG. 48 is a schematic flow chart for explaining an image embedding process according to the 18th embodiment of the present invention. In the 18th and subsequent embodiments, since the arrangements of the image processing apparatus, M-sequence generator, and M-sequence calculator are the same as those that have been described above with reference to FIG. 3 and FIGS. 37 and 38, a description thereof will be omitted.

Assume that an original image I(i, j) is an M×N multi-valued image (in which one pixel is expressed by 8 bits).

<Embedding Process (FIG. 48)>

In process 4801, a self-synchronization pattern C(i, j) is generated using a value $k_i$ determined for each image as an initial value. In process 4802, the generated self-synchronization pattern C(i, j) is embedded in each LSB of the original image I(i, j) to generate a digitally watermarked image I'(i, j).

The digitally watermarked image I'(i, j) obtained by this digital watermark embedding process is an image obtained by changing each LSB of the original image I(i, j) to the self-synchronization pattern C(i, j) in process 4802. When the original image I(i, j) is a color image, the LSB of each B component is changed. This is to implement embedding that suffers least image quality deterioration, in consideration of the visual characteristics of a human being.

A method of extracting the digital watermark embedded in this manner will be explained below. Note that V(i, j) represents an image to be verified.

<Extraction Process (FIG. 49)>

Figure 49:
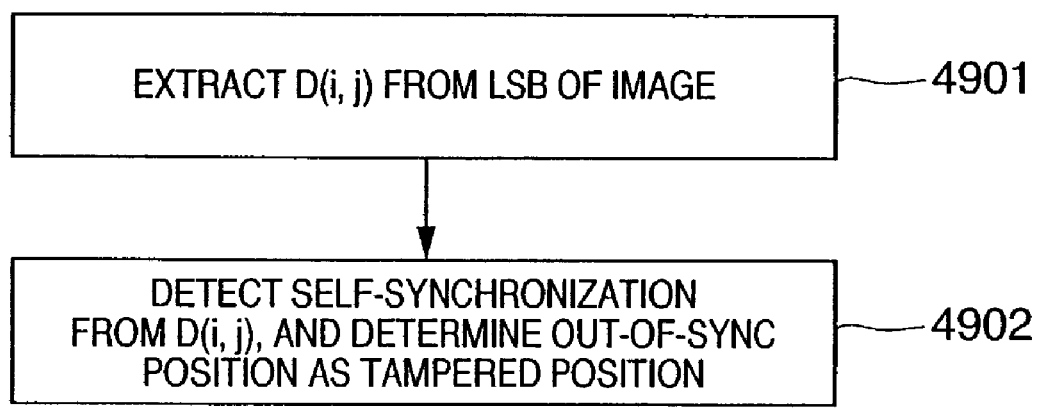
FIG. 49 is a schematic flow chart for explaining a process for extracting an embedded image and specifying a tampered position in the 18th embodiment.

FIG. 49 is a flow chart for explaining a process for extracting a digital watermark from an digitally watermarked image V(i, j), and detecting a tampered position.

In process 4901, the LSBs of respective pixel data of the image V(i, j) to be verified are extracted as D(i, j). In process 4902, self-synchronization is detected from the output result D(i, j) in process 4901, and an out-of-sync position is detected as a tampered position.

Note that the self-synchronization pattern C(i, j) is a bit sequence which has a long period and strong autocorrelation and, for example, a bit sequence called an M-sequence is known. The M-sequence is a cyclic code having an information length m and a code length $n=2^m-1$, and a bit sequence having a period of a maximum length can be easily generated using m shift registers.

Since the arrangements of such M-sequence generator and M-sequence calculator have been explained with reference to FIGS. 37 and 38 above, a description thereof will be omitted.

In this manner, even when an image has been shifted or has undergone partial deletion or insertion, it can be detected since out of synchronization is detected in that portion, and the tampered position can be detected. The aforementioned image embedding process and extraction process can be implemented using the image processing apparatus shown in FIG. 3.

As described above, according to the 18th embodiment, the need for saving a stamp image can be obviated, and even when an image has suffered a shift, insertion, or deletion for several patterns, a tampered position can be detected by detecting self-synchronization.

[19th Embodiment]

In the 18th embodiment, the self-synchronization pattern is directly embedded in the LSB of each pixel data of the original image I(i, j). However, in this state, an image is readily analyzed. Hence, the self-synchronization pattern may be combined with another pattern or may be further converted. The 19th embodiment will exemplify a case wherein the self-synchronization pattern is further converted using a pseudo random number generated based on another key as an initial value so as to make analysis difficult.

Figure 50:
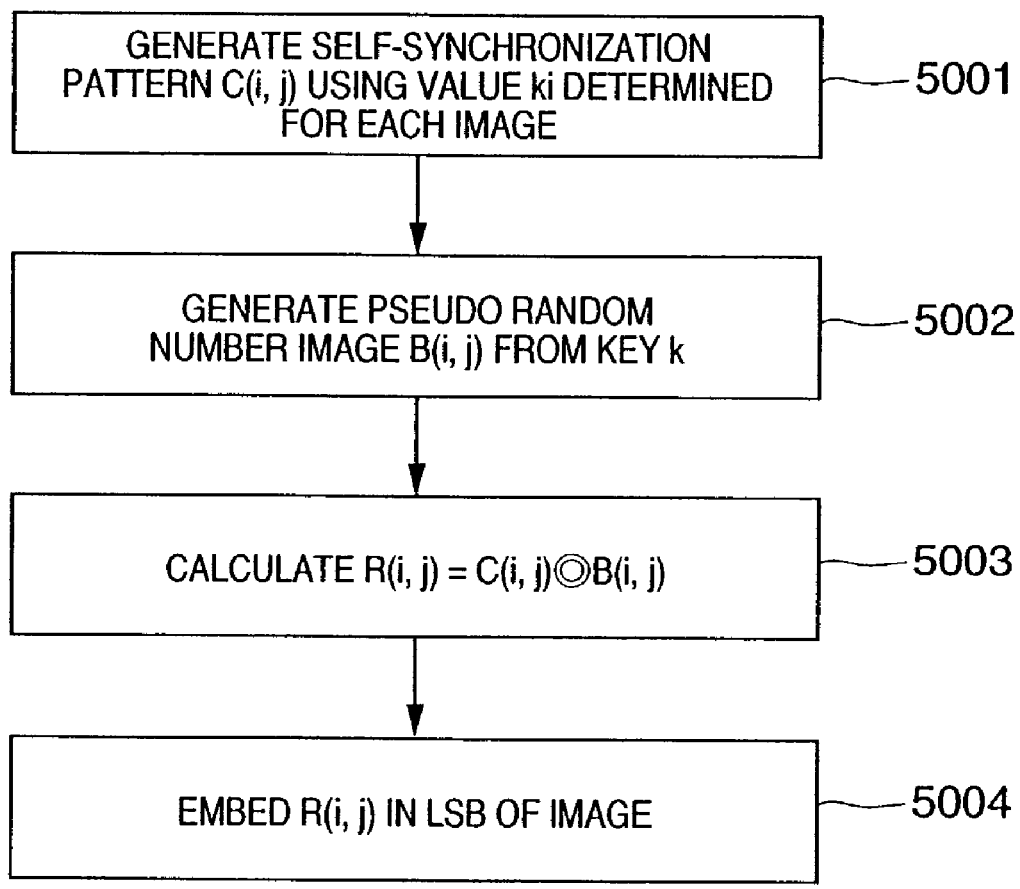
FIG. 50 is a schematic flow chart for explaining an outline of an image embedding process according to the 19th embodiment of the present invention.

FIG. 50 is a flow chart for explaining a digital watermark embedding process according to the 19th embodiment of the present invention.

<Embedding Process (FIG. 50)>

In process 5001, a self-synchronization pattern C(i, j) is generated using a value $k_i$ determined for each image as an initial value. In process 5002, a pseudo random number B(i, j) having the same length as the self-synchronization pattern is generated using a key k as an initial value. The flow advances to process 5003 to calculate B(i, j)⊙C(i, j). Note that ⊙ indicates an arithmetic operation of EXOR (exclusive OR). The flow advances to process 5004, and the arithmetic result $\{B(i, j)\odot C(i, j)\}$ is embedded in the LSB of each pixel data of the original image $I(i, j)$ to generate a digitally watermarked image $I'(i, j)$.

Unlike in the 18th embodiment, the self-synchronization pattern $C(i, j)$ is stream-encrypted by the pseudo random number $B(i, j)$. Hence, a third party who does not know the key k hardly analyzes the self-synchronization pattern.

Furthermore, an embedding position other than LSB may be selected based on a random number generated using the key k. For example, a generated pseudo random number may be segmented every 2 bits, and may be used as an embedding position. That is, "00" may be embedded in the LSB, "01" in the next upper bit of the LSB, and "10" and "11" in further upper bits.

<Extraction Process (FIG. 51)>

Figure 51:
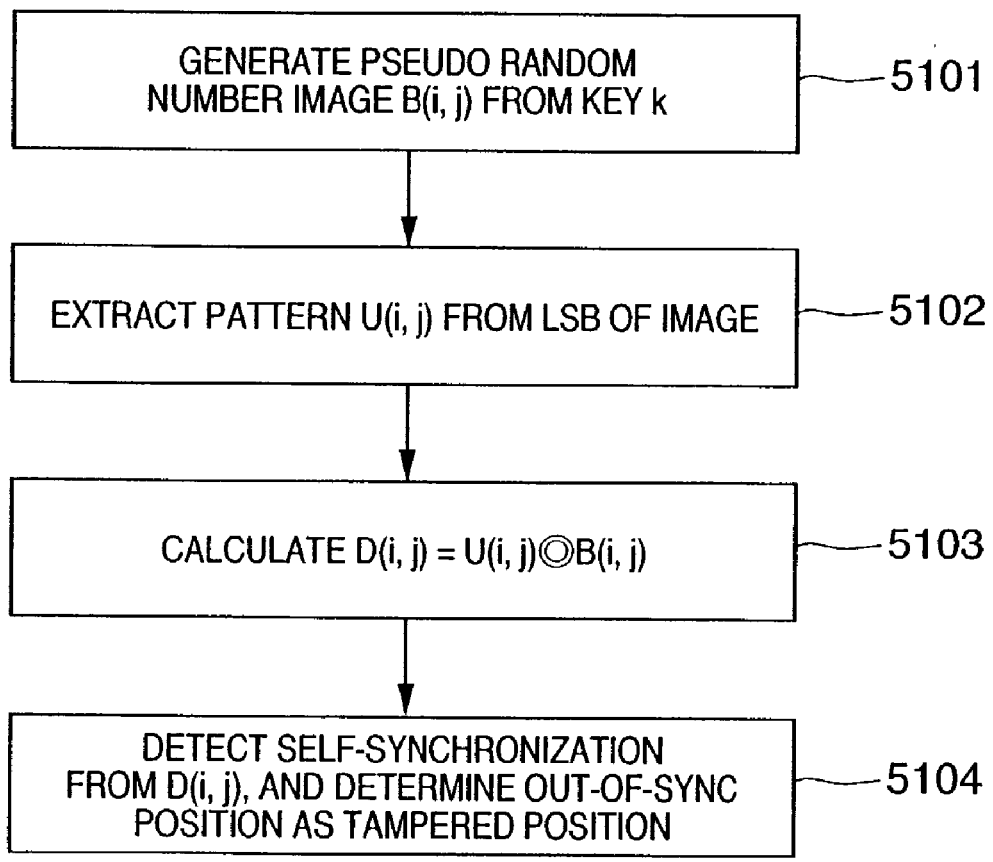
FIG. 51 is a schematic flow chart for explaining a process for extracting an embedded image and specifying a tampered position in the 19th embodiment.

FIG. 51 is a flow chart for explaining a process for extracting a digital watermark and detecting a tampered position according to the 19th embodiment of the present invention.

In process 5101, a pseudo random number image $B(i, j)$ is generated using the key k as an initial value. In process 5102, the LSBs of respective pixel data of the image $V(i, j)$ to be verified are extracted to obtain a check pattern $U(i, j)$. In process 5103, $D(i, j)=U(i, j)\odot B(i, j)$ is calculated. In process 5104, self-synchronization is detected from $D(i, j)$, and an out-of-sync position is detected as a tampered position.

In the conventional tampered position detection method that saves a stamp image, when an image has undergone enlargement/reduction, rotation, cut, or the like, enlargement/reduction, rotation, or cut of a tampered image can be corrected with reference to the shape of the saved stamp image. By contrast, this embodiment cannot refer to the shape of the stamp image since no stamp image is saved. Hence, measures against enlargement/reduction, rotation, and cut are taken by the means that has been explained with reference to FIG. 44 above.

In this embodiment, the self-synchronization pattern has been exemplified. However, the present invention is not limited to such specific pattern, as long as a pattern difference can be easily identified. For example, a normal image may be inserted in place of the self-synchronization pattern while changing the density for each color component, and a tampered position may be detected by color identification.

Also, since the autocorrelation operation can be achieved by frequency transformation, self-synchronization detection is not limited to the arrangement shown in FIG. 38.

In the above embodiments, a tampered position detection method has been explained taking an image as an example. However, the present invention is not limited to an image, and includes all methods that encrypt digital data, and append corresponding check information used to detect a tampered position. For example, the present invention can be similarly applied to a case wherein one contents is expressed by a plurality of data blocks, as shown in FIG. 6 above. Therefore, if pixels explained in the above embodiments are considered as data blocks, tampered position detection for each data block of an arbitrary contents can be made. More specifically, a plurality of pixels may be considered as data blocks, and time-serial information such as music information can undergo tampered position detection. Furthermore, even when a contents is broken up into data blocks upon packet communications, a tampered position in each packet can be detected.

On the other hand, JPEG, MPEG, or the like is formed as a single data stream in appearance, but can be broken up into 8×8 pixel data blocks or data blocks for respective frames, and a series of these blocks form a single contents. FIG. 6 illustrates separate data blocks for the sake of simplicity. However, the present invention can be applied to a contents which looks a single data stream but is formed by a plurality of data blocks in practice.

The present invention is not limited to the apparatuses and methods for implementing the aforementioned embodiments and methods as combinations of the methods described in the embodiments, but the scope of the present invention includes a case wherein the above embodiments are achieved by supplying a program code of software that can implement the functions of the above-mentioned embodiments to a computer (or a CPU or MPU) in a system or apparatus, and making the computer control various devices in the system or apparatus.

In this case, the program code itself read out from the storage medium implements the functions of the above-mentioned embodiments, and the program code itself, and means for supplying the program code to the computer (i.e., a storage medium which stores the program code) are included in the scope of the present invention.

As the storage medium for storing such program code, for example, a floppy disk, hard disk, optical disk, magneto-optical disk, CD-ROM, magnetic tape, nonvolatile memory card, ROM, and the like may be used.

The program code is included in the scope of the embodiments not only when the functions of the above embodiments are implemented by controlling various devices according to the supplied program code alone but also when the functions of the embodiments are implemented by collaboration of the program code and an OS (operating system) or another application software running on the computer.

Furthermore, the scope of the present invention includes a case wherein the functions of the above-mentioned embodiments are implemented by some or all of actual processing operations executed by a CPU or the like arranged in a function extension board or a function extension unit, which is inserted in or connected to the computer, after the supplied program code is written in a memory of the extension board or unit.

As described above, according to the present invention, a tampered position detection method based on a digital watermark, which cannot be achieved in the prior art, and makes forgery difficult, i.e., is secure even when the embedding algorithm and extraction algorithm except for a key are known to a third party or open to the public, can be implemented. Furthermore, the present invention is efficient since no stamp image is required, and the key need only be kept secret.

Also, according to the present invention, a tampered position detection method based on a digital watermark, which cannot be achieved in the prior art, and makes forgery difficult, i.e., is secure even when the embedding algorithm and extraction algorithm except for a key are known to a third party or open to the public, can be implemented. Furthermore, the present invention is efficient since no stamp image is required, and the key need only be kept secret. Also, even when different contents are processed using an identical key, their replacement can be detected.

Furthermore, according to the present invention, a tampered position detection method based on a digital watermark, which cannot be achieved in the prior art, and is secure even when different images undergo an embedding process using an identical key, can be implemented.

Furthermore, the present invention is efficient since no stamp image is required, and the key need only be kept secret.

Moreover, according to the present invention, only a tampered portion such as shift or insertion/deletion of digital contents, which cannot be detected by the prior art, can be detected.

The present invention is not limited to the above embodiments and various changes and modifications can be made within the spirit and scope of the present invention. Therefore, to apprise the public of the scope of the present invention, the following claims are made.

What is claimed is:

1. A data processing apparatus comprising:
   check bit generation means for generating first check bits on the basis of pseudo random number values corresponding to data block positions of a digital contents which is formed by a plurality of data blocks, and of the data blocks; and
   means for multiplexing the first check bits in the corresponding data blocks,
   wherein said check bit generation means comprises means for generating encrypted blocks by exclusively ORing the pseudo random number values and the data blocks, and means for generating the first check bits on the basis of error detection codes of the encrypted blocks.

2. A data processing apparatus comprising:
   demultiplexing means for demultiplexing first check bits multiplexed in a digital contents;
   check bit generation means for generating second check bits on the basis of pseudo random number values corresponding to data block positions of a digital contents which is formed by a plurality of data blocks, and of the data blocks; and
   comparison means for comparing the first and second check bits,
   wherein said check bit generation means comprises means for generating encrypted blocks by exclusively ORing the pseudo random number values and the data blocks, and means for generating the second check bits on the basis of error detection codes of the encrypted blocks.

3. A data processing apparatus comprising:
   first pattern generation means for generating first patterns having self-synchronism for a digital contents, which is formed by a plurality of data blocks in a given order;
   second pattern generation means for generating second patterns depending on an image;
   embedding pattern generation means for generating embedding patterns on the basis of the first and second patterns; and
   pattern embedding means for embedding the embedding patterns in the data blocks,
   wherein said second pattern generation means comprises pseudo random number generation means for generating pseudo random numbers on the basis of an initial value, and generates the second patterns on the basis of the pseudo random numbers and data block values of the digital contents.

4. The apparatus according to claim 3, wherein said second pattern generation means comprises pseudo random number generation means for generating pseudo random numbers on the basis of an initial value, and generates the second patterns on the basis of the pseudo random numbers, data block values of the digital contents, and pseudo random number values generated by said pseudo random number generation means in correspondence with data block positions of the digital contents.

5. The apparatus according to claim 3, wherein said first pattern generation means generates the first patterns on the basis of initial values corresponding to the respective data blocks.

6. The apparatus according to claim 3, wherein said second pattern generation means comprises a table that stores pseudo random numbers generated by said pseudo random number generation means in an order of addresses, and generates the second patterns on the basis of outputs from said table in response to the data block values input to said table.

7. A data processing apparatus comprising:
   first pattern generation means for generating first patterns having self-synchronism for a digital contents, which is formed by a plurality of data blocks in a given order;
   pseudo random number generation means for generating pseudo random numbers on the basis of an initial value;
   encrypted block generation means for generating encrypted data blocks on the pseudo random numbers and the plurality of data blocks;
   check bit generation means for generating check bits by applying an error detection code to the encrypted data blocks;
   embedding pattern generation means for generating an embedding pattern on the basis of the check bits and the first patterns; and
   pattern embedding means for embedding the embedding patterns in the corresponding data blocks.

8. The apparatus according to claim 7, wherein each of the plurality of data blocks is encrypted according to an order of the data block.

9. The apparatus according to claim 7, wherein the digital contents is a digital image, and the data blocks are pixels.

10. A data processing apparatus comprising:
    third pattern extraction means for extracting third patterns corresponding to a plurality of data blocks which have a given order;
    fourth pattern generation means for generating fourth patterns on the basis of an image to be verified;
    fifth pattern generation means for generating fifth patterns on the basis of the fourth and third patterns; and
    check means for checking self-synchronism of the fifth patterns.

11. The apparatus according to claim 10, wherein said fourth pattern generation means comprises pseudo random number generation means for generating pseudo random numbers on the basis of an initial value, and generates the fourth patterns on the basis of the pseudo random numbers and data block values of a digital contents to be verified.

12. The apparatus according to claim 11, wherein said fourth pattern generation means comprises a table that stores pseudo random numbers generated by said pseudo random number generation means in an order of addresses, and generates the fourth patterns on the basis of outputs from said table in response to the data block values input to said table.

13. The apparatus according to claim 10, wherein said fourth pattern generation means comprises pseudo random number generation means for generating pseudo random numbers on the basis of an initial value, and generates the fourth patterns on the basis of the pseudo random numbers, data block values of a digital contents to be verified, and pseudo random number values generated by said pseudo random number generation means in correspondence with data block positions of the digital contents to be verified.

14. The apparatus according to claim 10, wherein said self-synchronism check generation means generates self-synchronization patterns on the basis of initial values corresponding to the data blocks.

15. The apparatus according to claim 10, further comprising means for correcting enlargement/reduction and rotation of a digital contents.

16. The apparatus according to claim 10, wherein a pattern is used to detect if a digital contents is partially cut, and has an order which is alternately determined in vertical and horizontal directions, or is randomly determined, or is predetermined.

17. A data processing apparatus comprising:
pseudo random number generation means for generating pseudo random numbers on the basis of an initial value;
encrypted block generation means for generating encrypted blocks from a plurality of data blocks to be verified, which have a given order, and the pseudo random numbers;
check bit generation means for generating check bits by applying an error detection code to the encrypted data blocks;
means for calculating differences between the check bits and check bits contained in the respective data blocks; and
check means for checking self-synchronism of the differences.

18. The apparatus according to claim 17, wherein each of the plurality of data blocks to be verified is encrypted according to an order of the data block.

19. A data processing apparatus comprising:
first pattern generation means for generating first patterns having self-synchronism for a digital contents, which is formed by a plurality of data blocks in a given order;
embedding pattern generation means for generating embedding patterns from the first patterns generated by said first pattern generation means;
pattern embedding means for embedding the embedding pattern generated by said embedding pattern generation means in the respective data blocks;
third pattern extraction means for extracting third patterns from the plurality of data blocks which have the given order; and
check means for checking self-synchronism of the third patterns extracted by said third pattern extraction means.

20. The apparatus according to claim 19, wherein said check means generates self-synchronization pattern on the basis of initial values corresponding to respective data blocks, and checks the self-synchronism.

21. The apparatus according to claim 19, further comprising means for correcting enlargement/reduction and rotation of the digital contents.

22. A data processing method comprising:
a check bit generation step of generating first check bits on the basis of pseudo random number values corresponding to data block positions of a digital contents which is formed by a plurality of data blocks, and of the data blocks; and
a step of multiplexing the first check bits in the corresponding data blocks,
wherein said check bit generation step comprises a step of generating encrypted blocks by exclusively ORing the pseudo random number values and the data blocks, and a step of generating the first check bits on the basis of error detection codes of the encrypted blocks.

23. A data processing method comprising:
a demultiplexing step of demultiplexing first check bits multiplexed in a digital contents;
a check bit generation step of generating second check bits on the basis of pseudo random number values corresponding to data block positions of a digital contents which is formed by a plurality of data blocks, and of the data blocks; and
a comparison step of comparing the first and second check bits,
wherein said check bit generation step comprises a step of generating encrypted blocks by exclusively ORing the pseudo random number values and the data blocks, and a step of generating the second check bits on the basis of error detection codes of the encrypted blocks.

24. A data processing method comprising:
a first pattern generation step of generating first patterns having self-synchronism for a digital contents, which is formed by a plurality of data blocks in a given order;
a second pattern generation step of generating second patterns depending on an image;
an embedding pattern generation step of generating embedding patterns on the basis of the first and second patterns; and
a pattern embedding step of embedding the embedding patterns in the data blocks,
wherein said second pattern generation step comprises a pseudo random number generation step of generating pseudo random numbers on the basis of an initial value, and includes a step of generating the second patterns on the basis of the pseudo random numbers and data block values of the digital contents.

25. The method according to claim 24, wherein said second pattern generation step comprises a pseudo random number generation step of generating pseudo random numbers on the basis of an initial value, and includes a step of generating the second patterns on the basis of the pseudo random numbers, data block values of the digital contents, and pseudo random number values generated at said pseudo random number generation step in correspondence with data block positions of the digital contents.

26. The method according to claim 24, wherein said first pattern generation step generates the first patterns on the basis of initial values corresponding to the respective data blocks.

27. The method according to claim 24, wherein said second pattern generation step comprises a table that stores pseudo random numbers generated at said pseudo random number generation step in an order of addresses, and includes a step of generating the second patterns on the basis of outputs from said table in response to the data block values input to said table.

28. The method according to claim 24, wherein each of the plurality of data blocks is encrypted in accordance with an order of the data block.

29. A data processing method comprising:
a first pattern generation step of generating first patterns having self-synchronism for a digital contents, which is formed by a plurality of data blocks in a given order;
a pseudo random number generation step of generating pseudo random numbers on the basis of an initial value;
an encrypted block generation step of generating encrypted data blocks on the pseudo random numbers and the plurality of data blocks;
a check bit generation step of generating check bits by applying an error detection code to the encrypted data blocks;
an embedding pattern generation step of generating an embedding pattern on the basis of the check bits and the first patterns; and a pattern embedding step of embedding the embedding patterns in the corresponding data blocks.

30. A data processing method comprising:
a third pattern extraction step of extracting third patterns corresponding to a plurality of data blocks which have a given order;
a fourth pattern generation step of generating fourth patterns on the basis of an image to be verified, and the third patterns;
a fifth pattern generation step of generating fifth patterns on the basis of the fourth patterns and the image to be verified; and
a check step of checking self-synchronism of the fifth patterns.

31. The method according to claim 30, wherein said third pattern generation step comprises a pseudo random number generation step of generating pseudo random numbers on the basis of an initial value, and
said fourth pattern generation step includes a step of generating the fourth patterns on the basis of the pseudo random numbers and data block values of a digital contents to be verified.

32. The method according to claim 30, wherein said third pattern generation step comprises a pseudo random number generation step of generating pseudo random numbers on the basis of an initial value, and
said fourth pattern generation step includes a step of generating the fourth patterns on the basis of the pseudo random numbers, data block values of a digital contents to be verified, and pseudo random number values generated at said pseudo random number generation step in correspondence with data block positions of the digital contents to be verified.

33. The method according to claim 32, wherein said fourth pattern generation step comprises a table that stores pseudo random numbers generated at said pseudo random number generation step in an order of addresses, and includes a step of generating the fourth patterns on the basis of outputs from said table in response to the data block values input to said table.

34. The method according to claim 30, wherein said third pattern generation step includes a step of generating the third patterns on the basis of initial values corresponding to the data blocks.

35. The method according to claim 30, further comprising a step of correcting enlargement/reduction and rotation of a digital contents.

36. The method according to claim 30, wherein a pattern is used to detect if a digital contents is partially cut, and has an order which is alternately determined in vertical and horizontal directions, or is randomly determined, or is predetermined.

37. The method according to claim 30, wherein the digital contents is a digital image, and the data blocks are pixels.

38. A data processing method comprising:
a pseudo random number generation step of generating pseudo random numbers on the basis of an initial value;
an encrypted block generation step of generating encrypted blocks from a plurality of data blocks to be verified, which have a given order, and the pseudo random numbers;
a check bit generation step of generating check bits by applying an error detection code to the encrypted data blocks;
a step of calculating differences between the check bits and check bits contained in the respective data blocks; and
a check step of checking self-synchronism of the differences.

39. The method according to claim 38, wherein each of the plurality of data blocks to be verified is encrypted according to an order of the data block.

40. A data processing method comprising:
a first pattern generation step of generating first patterns having self-synchronism for a digital contents, which is formed by a plurality of data blocks in a given order;
an embedding pattern generation step of generating embedding patterns from the first patterns generated at said first pattern generation step;
a pattern embedding step of embedding the embedding pattern generated at said embedding pattern generation step in the respective data blocks;
a third pattern generation step of generating third patterns corresponding to a plurality of data blocks which have a given order; and
a check step of checking self-synchronism of the third patterns.

41. The method according to claim 40, wherein said first pattern generation step includes a step of generating the first patterns on the basis of initial values corresponding to the respective data blocks.

42. The method according to claim 40, wherein said check step includes a step of generating self-synchronization patterns on the basis of initial values corresponding to respective data blocks, and checking the self-synchronism on the basis of the self-synchronization patterns.

43. The method according to claim 40, further comprising a step of correcting enlargement/reduction and rotation of the digital contents.

* * * * *

UNITED STATES PATENT AND TRADEMARK OFFICE
CERTIFICATE OF CORRECTION

PATENT NO. : 7,072,488 B2
APPLICATION NO. : 10/188870
DATED : July 4, 2006
INVENTOR(S) : Keiichi Iwamura It is certified that error appears in the above-identified patent and that said Letters Patent is hereby corrected as shown below:

ON THE TITLE PAGE, AT ITEM (56), RC:
 U.S. Patent Documents:

"6,389,152 B1" should read --6,389,152 B2--;
"6,898,297 B1" should read --6,898,297 B2--; and
"6,577,748 B1" should read --6,577,748 B2--.

COLUMN 1:
Line 30, "signature" should read --signature by--.

COLUMN 2:
Line 24, "attach," should read --attack,--.

COLUMN 6:
Line 54, "$LUT_B(C_B(i, j)))$" should read --$LUT_B(C_B(i, j)))$.--.

COLUMN 7:
Line 8, "ko" should read --$k_o$--.
Line 39, "ko" should read --$k_o$--.

COLUMN 9:
Line 31, "later)" should read --later,--.

COLUMN 16:
Line 60, "ko" should read --$k_o$--.

COLUMN 17:
Line 15, "the" should be deleted.

COLUMN 22:
Line 54, "ko" should read --$k_o$--.

COLUMN 23:
Line 52, "are" should read --have--.

COLUMN 24:
Line 53, "$I_{a-1}(I, j)$" should read  --$I_{a-1}(i,j)$--.

COLUMN 26:
Line 60, "a" should be deleted.

UNITED STATES PATENT AND TRADEMARK OFFICE
CERTIFICATE OF CORRECTION

PATENT NO. : 7,072,488 B2
APPLICATION NO. : 10/188870
DATED : July 4, 2006
INVENTOR(S) : Keiichi Iwamura It is certified that error appears in the above-identified patent and that said Letters Patent is hereby corrected as shown below:

COLUMN 32:
Line 43, "$k_1$" should read --$k_i$--

COLUMN 33:
Line 11, "$d_1,...,d_1,$" should read --$d_1,...,d_i,$--.
Line 66, "$k_1,$" should read --$k_i,$--.

COLUMN 35:
Line 58, "I(i," should read --I(i,j).--.

COLUMN 36:
Line 38, "Depending" should read --¶ Depending--.

COLUMN 39:
Line 38, "looks" should read --looks like--.

COLUMN 40:
Line 14, "an" should read --a--.

COLUMN 41:
Line 36, "has" should read --have--.

COLUMN 42:
Line 4, "looks" should read --looks like--.

UNITED STATES PATENT AND TRADEMARK OFFICE
CERTIFICATE OF CORRECTION

PATENT NO. : 7,072,488 B2
APPLICATION NO. : 10/188870
DATED : July 4, 2006
INVENTOR(S) : Keiichi Iwamura It is certified that error appears in the above-identified patent and that said Letters Patent is hereby corrected as shown below:

COLUMN 45:
Line 46, "generates" should read --generates a--.

Signed and Sealed this

First Day of May, 2007

JON W. DUDAS
*Director of the United States Patent and Trademark Office*